United States Patent
Burke et al.

(10) Patent No.: US 9,834,330 B2
(45) Date of Patent: Dec. 5, 2017

(54) SHRINK-WRAP LABELLING OF CRUSTACEAN CLAWS

(75) Inventors: Timothy Andrew Burke, Halifax (CA); Ben Garvey, Halifax (CA); Lee Babin, Halifax (CA); Gleb Sekretta, Halifax (CA); Louis-Phillipe Frederick Manuge, Hammonds Plains (CA); Sean O'Leary, Fletchers Lake (CA)

(73) Assignee: CLEARWATER SEAFOODS LIMITED PARTNERSHIP, Bedford (CA)

( * ) Notice: Subject to any disclaimer, the term of this patent is extended or adjusted under 35 U.S.C. 154(b) by 1091 days.

(21) Appl. No.: 13/994,550

(22) PCT Filed: Dec. 16, 2011

(86) PCT No.: PCT/CA2011/050778
§ 371 (c)(1),
(2), (4) Date: Nov. 1, 2013

(87) PCT Pub. No.: WO2012/079176
PCT Pub. Date: Jun. 21, 2012

(65) Prior Publication Data
US 2014/0178533 A1    Jun. 26, 2014

Related U.S. Application Data

(60) Provisional application No. 61/424,296, filed on Dec. 17, 2010.

(51) Int. Cl.
*B65B 53/02* (2006.01)
*B65B 53/06* (2006.01)
(Continued)

(52) U.S. Cl.
CPC .............. *B65B 53/02* (2013.01); *A22C 29/02* (2013.01); *A23L 17/40* (2016.08); *B65B 53/06* (2013.01); *B65C 3/00* (2013.01)

(58) Field of Classification Search
CPC ... B65B 53/02; B65B 53/06; Y10T 156/1057; Y10T 156/1062
See application file for complete search history.

(56) References Cited

U.S. PATENT DOCUMENTS 4,806,187 A * 2/1989 Fujisawa ................... B65B 9/14
156/521
4,923,557 A    5/1990 Dickey
(Continued)

FOREIGN PATENT DOCUMENTS

WO    WO 2008/076718 A1    6/2008

OTHER PUBLICATIONS

International Search Report and Written Opinion for Applicatin No. PCT/CA2011/050778 dated Mar. 6, 2012.

*Primary Examiner* — Mark A Osele
*Assistant Examiner* — Christopher C Caillouet
(74) *Attorney, Agent, or Firm* — Alston & Bird LLP

(57) ABSTRACT

A labelling system includes a dispensing apparatus to present respective cut and opened sleeves of shrink-wrap label stock material for insertion of claws of crustaceans, and a heating apparatus to apply heat to the sleeves to shrink the sleeves around the claws. A related method includes inserting a claw of a crustacean into a sleeve of shrink-wrap label stock material, and applying heat to the sleeve to shrink the sleeve around the claw. Another method involves providing a dispensing apparatus to present respective cut and opened sleeves of shrink-wrap label stock material to receive claws of crustaceans, and providing a heating apparatus to apply heat to the sleeves to shrink the sleeves around the claws. A
(Continued)

seafood product may include a crustacean having a claw, the claw carrying a shrink-wrap label.

22 Claims, 51 Drawing Sheets

(51) Int. Cl.
*A22C 29/02* (2006.01)
*B65C 3/00* (2006.01)
*A23L 17/40* (2016.01)

(56) References Cited

U.S. PATENT DOCUMENTS

| | | |
|---|---|---|
| 5,566,527 A | 10/1996 | Drewitz |
| 5,992,492 A | 11/1999 | Huang et al. |
| 2001/0002614 A1 | 6/2001 | Menayan |
| 2010/0293901 A1* | 11/2010 | Malthouse ................ B65C 9/00 53/557 |

* cited by examiner

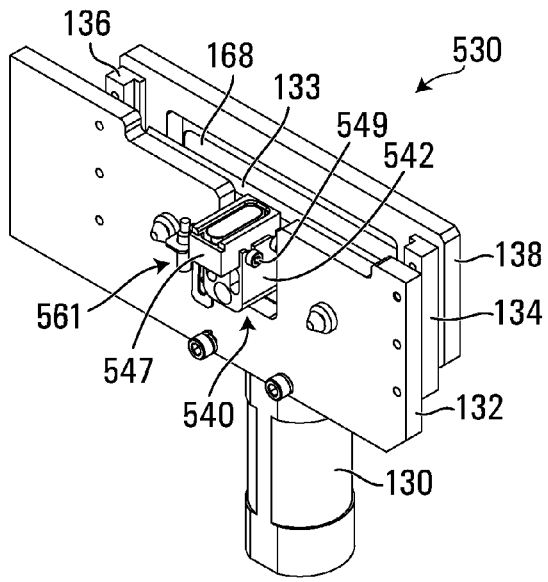
FIG. 35
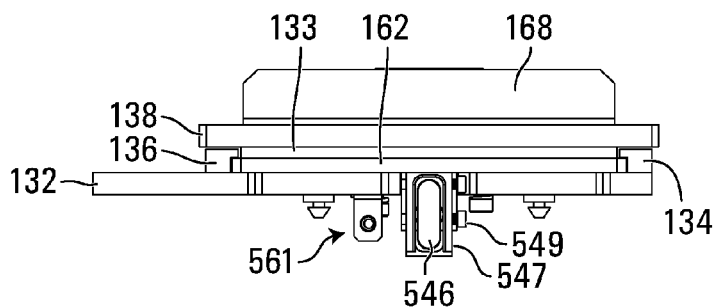
FIG. 38
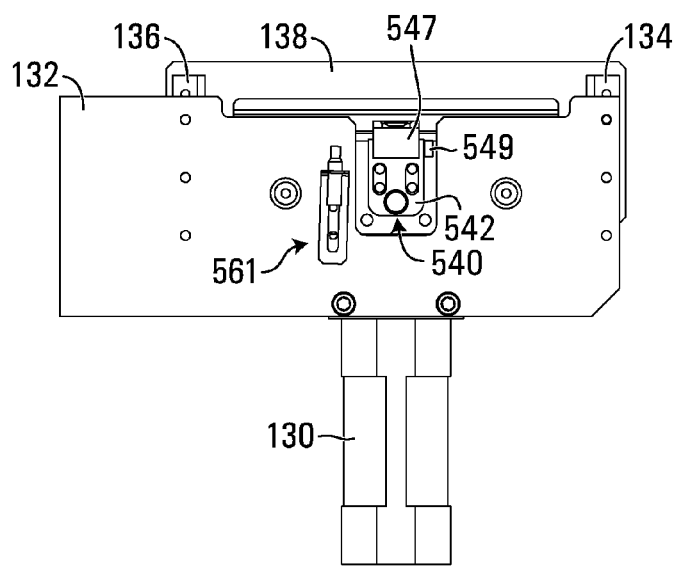
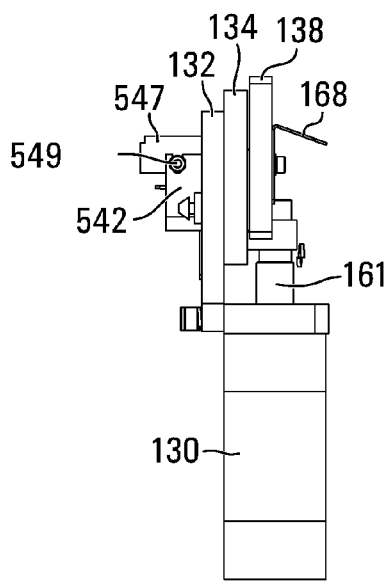
FIG. 36
FIG. 37

SHRINK-WRAP LABELLING OF CRUSTACEAN CLAWS

CROSS-REFERENCE TO RELATED-APPLICATIONS

This application claims the benefit of U.S. Provisional Patent Application Ser. No. 61/424,296, entitled "SHRINK-WRAP LABELLING OF CRUSTACEAN CLAWS", and filed on Dec. 17, 2010, the entire contents of which are incorporated herein by reference. This application is also a National Phase application of, and claims the benefit of, International (PCT) Application Serial No. PCT/CA2011/050778, filed on Dec. 16, 2011, the entire contents of which are incorporated herein by reference.

FIELD OF THE INVENTION

This invention relates generally to product labelling and, in particular, to shrink-wrap labelling of crustaceans.

BACKGROUND

Shrink-wrap labelling is used for labelling a multitude of products. Currently available shrink-wrap labelling machines work well for labelling products that have regular shapes and fixed sizes and can be reliably positioned at an appropriate location for application of labels. In a bottling factory, for example, bottles can generally be oriented in any of various positions for application of shrinkable sleeve material and heating to shrink that material. Products that are shrink-wrapped also tend to be "robust", in the sense of not being prone to damage from handling and heating during the shrink-wrapping process.

Certain industries and/or products, however, can present challenges in terms of applying such labels. In the seafood industry, for example, equipment in processing or packing plants is subject to water from seafood that is being processed, frequent washdowns, and cold temperatures. Typical production line shrink-wrapping machines are not suitable for deployment in such harsh conditions. Crustaceans and other seafood are also of irregular shapes and varying sizes, and can be sensitive to heating and handling. Although some species such as oysters are less sensitive than crustaceans and have been labelled using shrink-wrap material, their irregular shape can lead to uneven shrinkage and/or wrinkling of label material, and thereby degrade label quality.

SUMMARY

According to one aspect of the invention, a labelling system comprises: a dispensing apparatus to present respective cut and opened sleeves of shrink-wrap label stock material for insertion of claws of crustaceans; and a heating apparatus to apply heat to the sleeves to shrink the sleeves around the claws.

In one embodiment, the dispensing apparatus comprises: a spool to hold a roll of flattened shrink-wrap label stock material; and an opening assembly to open the flattened shrink-wrap label stock material.

The dispensing apparatus may include a cutting assembly to cut the sleeves of shrink-wrap label stock material, with the cutting assembly comprising: a cutting blade; a plate along which the cutting blade travels; and a variable pressure mount to provide a variable pressure between the plate and the cutting blade.

A cutting assembly to cut the sleeves of shrink-wrap label stock material, in some embodiments, comprises: a cutting blade to cut the sleeves from the shrink-wrap label stock material; and a cut sleeve holder to hold and open the cut sleeves. The cutting assembly could also include a movable plate, with the cutting blade being mounted to a first surface of the movable plate, and the cut sleeve holder could comprise: a block mounted to a second surface of the movable plate opposite the first surface; a suction cup, carried by the block, to hold the sleeves; and a bending block mounted to the block, the bending block being adjustable to deflect edges of the suction cup.

In some embodiments, the dispensing apparatus comprises a cutting assembly to cut the sleeves of shrink-wrap label stock material, the cutting assembly comprising: a cutting blade; a plate along which the cutting blade travels; and a backing plate mounted to the plate, to apply a force to the plate to reduce deflection of the plate away from the cutting blade.

The heating apparatus may provide a heated air stream for applying heat to the sleeve at a bottom of the claw and to the sleeve at a top of the claw. In some embodiments, the heating apparatus includes a blower to direct air through a heater, an outlet passage, and an inlet passage, with the heated air stream flowing between the outlet passage and the inlet passage. The inlet passage could be larger than the outlet passage.

In the labelling system the heating apparatus could be mounted to the dispensing apparatus. For example, the dispensing apparatus could comprise a housing having an opening in which the sleeves are presented, and the heating apparatus could be mounted to position an air flow path for heated air above the opening.

According to another aspect of the invention, a method comprises: inserting a claw of a crustacean into a sleeve of shrink-wrap label stock material; and applying heat to the sleeve to shrink the sleeve around the claw.

The method could also involve: opening flattened shrink-wrap label stock material; and cutting the sleeve from the opened shrink-wrap label stock material.

In some embodiments, the method involves: controlling a pressure between a cutting blade and a plate along which the cutting blade travels; and cutting the sleeve from the shrink-wrap label stock material between the cutting blade and the plate. The method could then also include applying a force to the plate to reduce deflection of the plate away from the cutting blade.

The operation of applying heat could involve applying heat to the cut sleeve at a bottom of the claw and to the cut sleeve at a top of the claw.

A method according to another aspect of the invention comprises: providing a dispensing apparatus to present respective cut and opened sleeves of shrink-wrap label stock material for insertion of claws of crustaceans; and providing a heating apparatus to apply heat to the sleeves to shrink the sleeves around the claws.

A seafood product is also provided, and comprises a crustacean having a claw, the claw carrying a shrink-wrap label. The shrink-wrap label could be a label applied in a labelling system as defined above, in accordance with a method involving inserting a claw and applying heat as defined above, and/or in a labelling system constructed according to a method involving providing a dispensing apparatus and providing a heating apparatus as defined above.

A further aspect of the invention provides a shrink-wrap label dispensing apparatus comprising: an opening assembly to open flattened shrink-wrap label stock material; a feeding assembly to feed the opened shrink-wrap label stock material from the opening assembly; a cutting assembly to receive and cut the opened shrink-wrap label stock material from the feeding assembly into sleeves, and to present the sleeves for insertion of respective claws of crustaceans.

Also provided is a shrink-wrap label heating apparatus comprising: a blower; a duct to direct air from the blower to a heater; a duct to direct air from the heater to an air outlet passage and toward an air inlet passage; and a duct to direct air from the air inlet passage to the heater, airflow between the air outlet passage and the air inlet passage providing a heated air stream for applying heat to shrink sleeves of shrink-wrap label material around claws of crustaceans.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

FIGS. 35 to 38 are views of another example cutting assembly.

DETAILED DESCRIPTION

Figure 1:
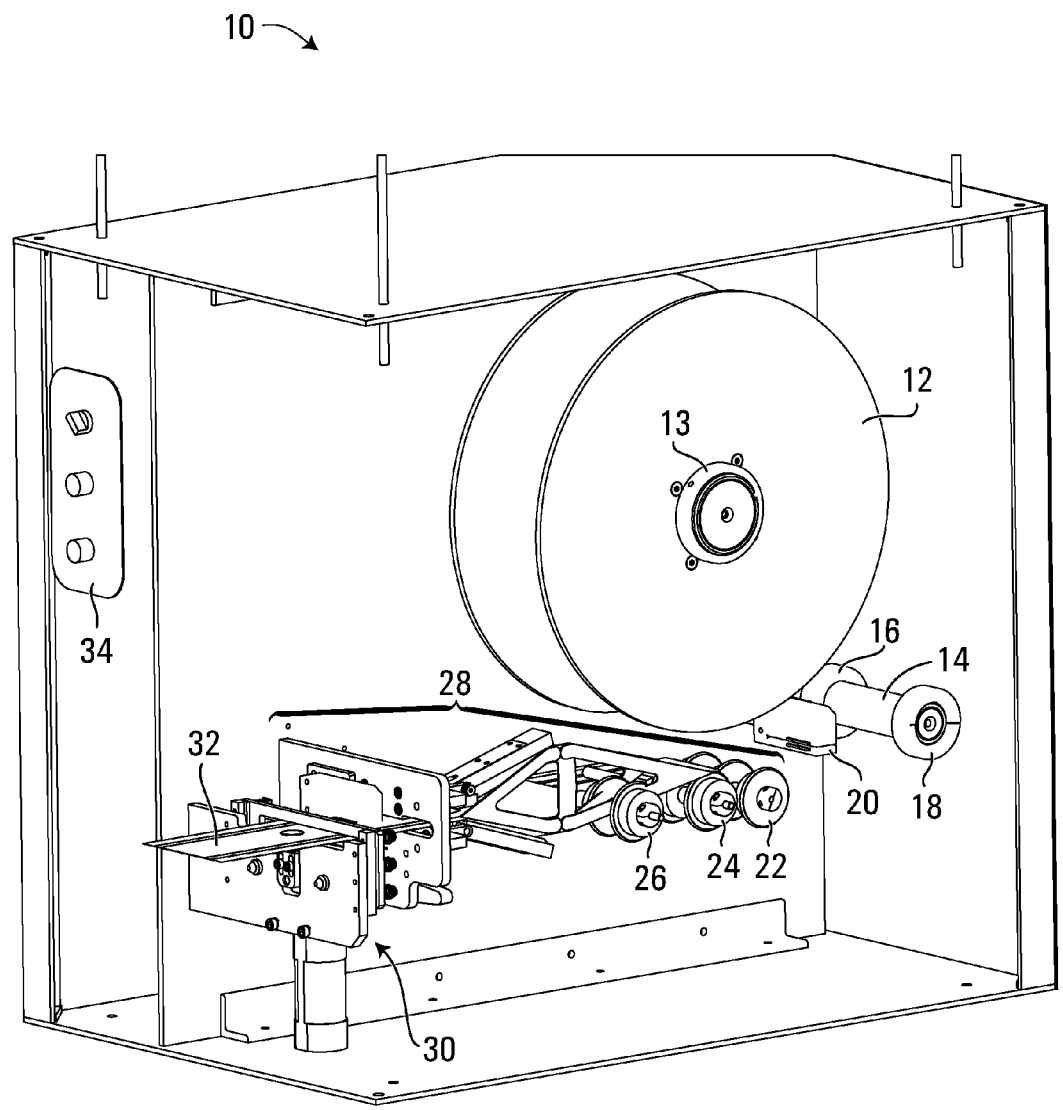
FIGS. 1 to 6 are views of an example shrink-wrap label stock dispensing apparatus.
Figure 2:
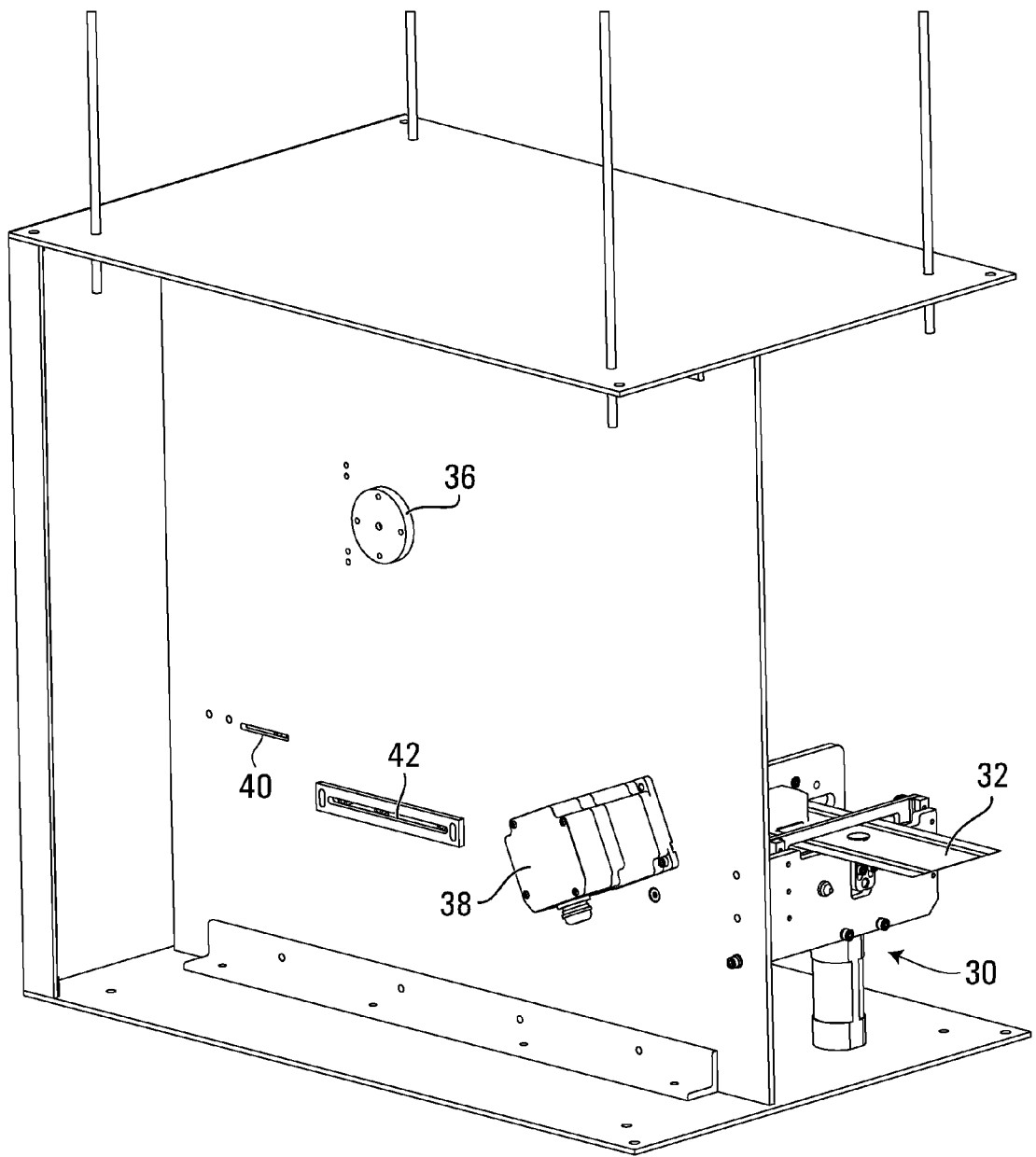
Figure 3:
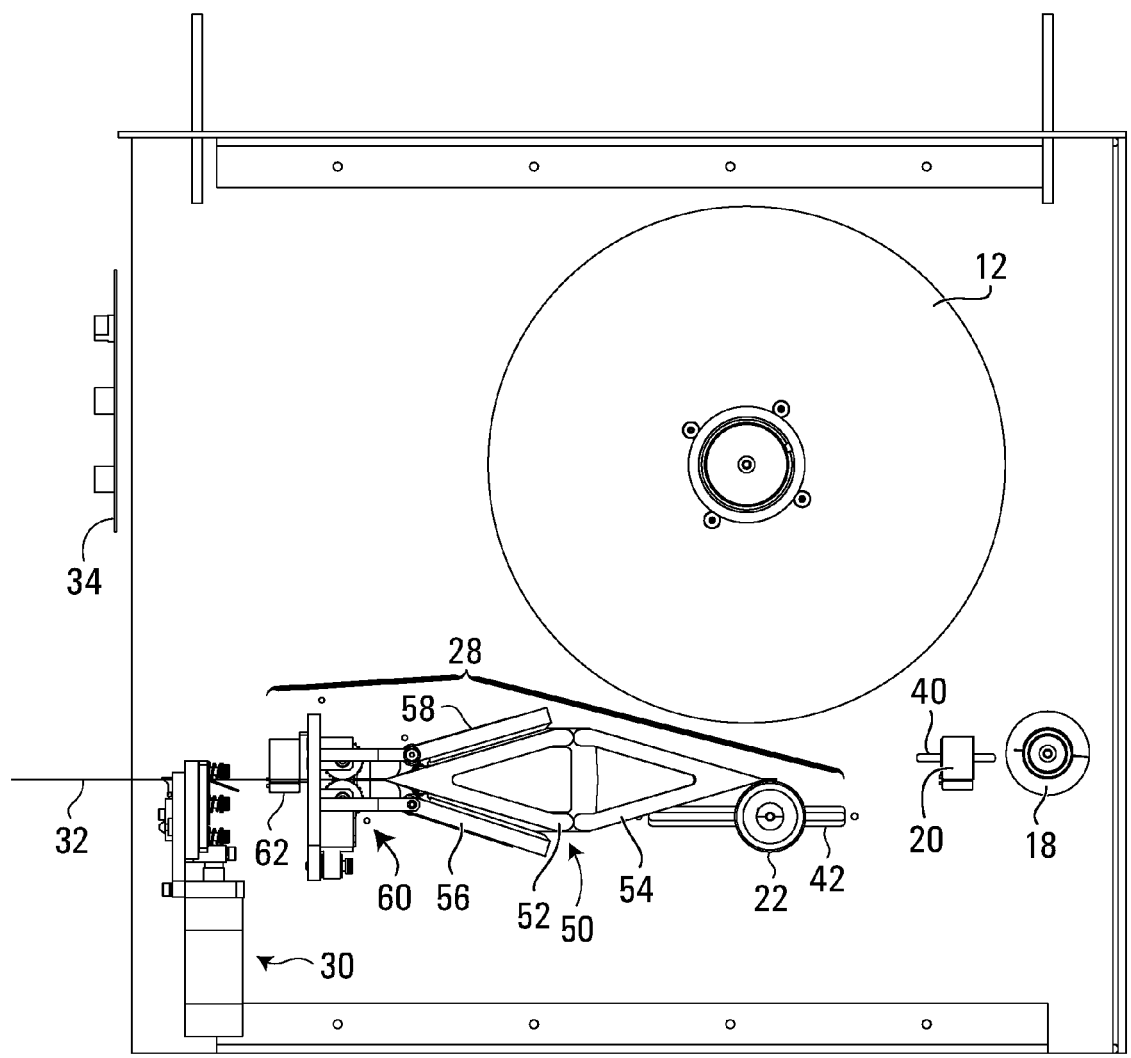
Figure 4:
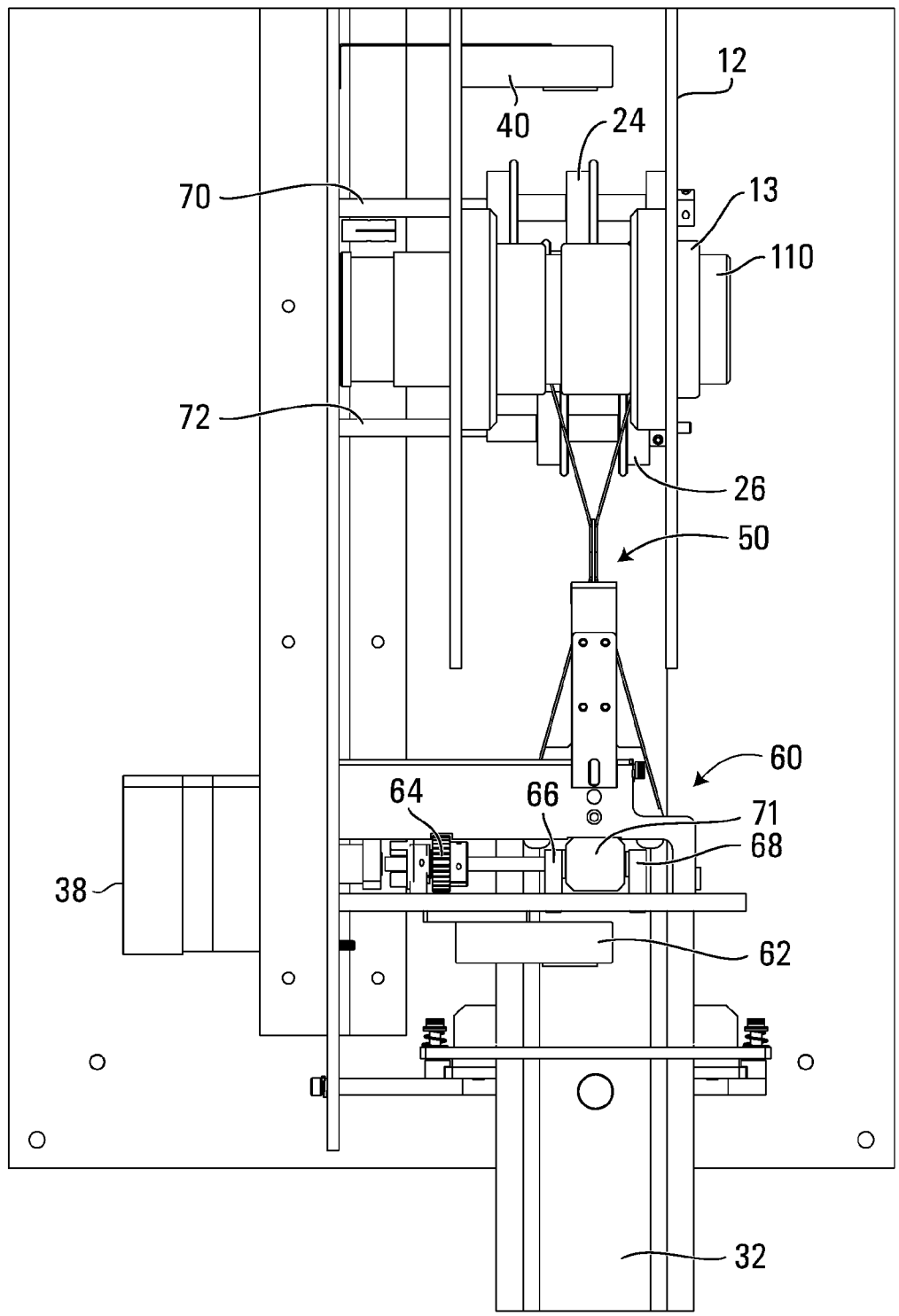
Figure 5:
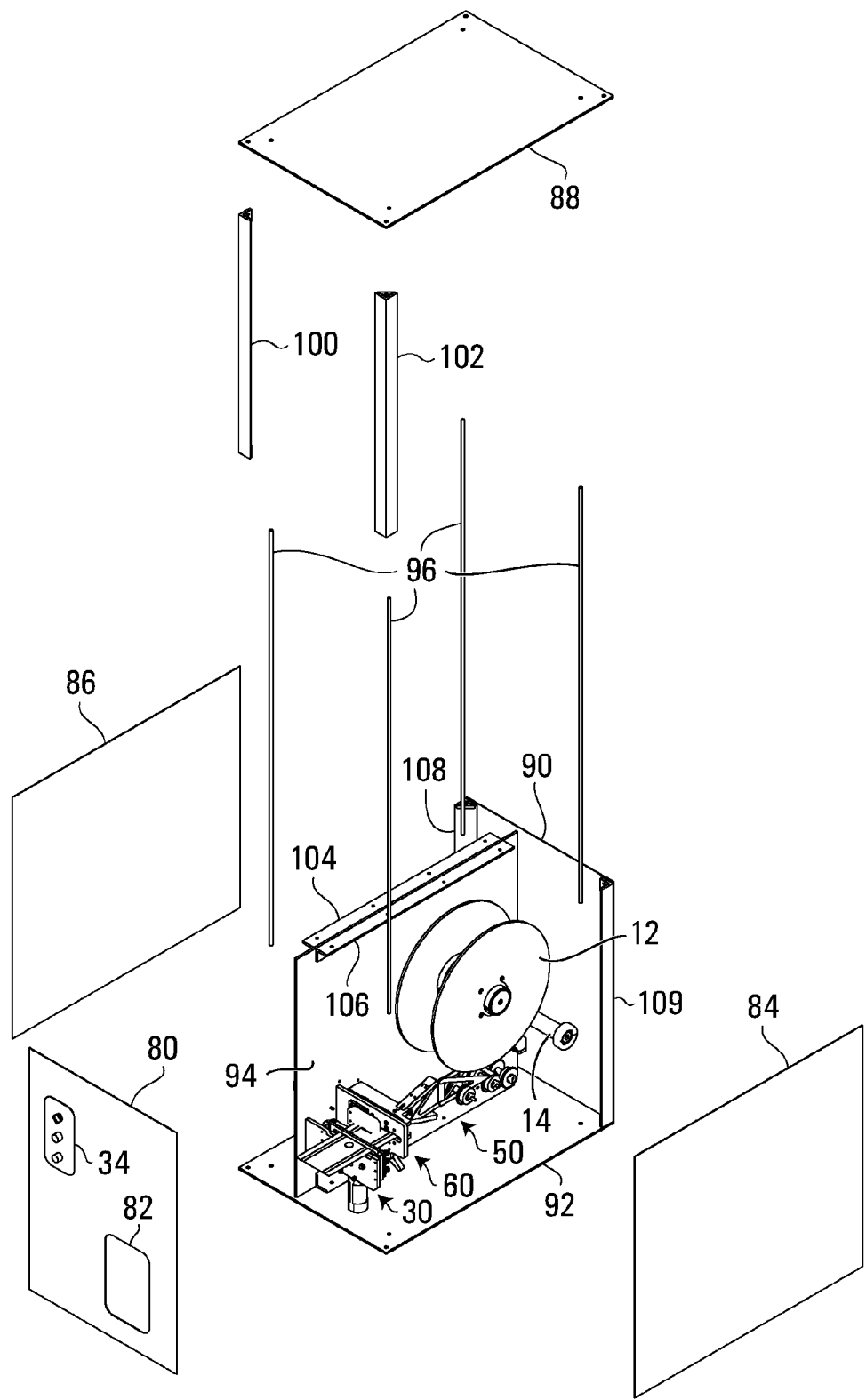
Figure 6:
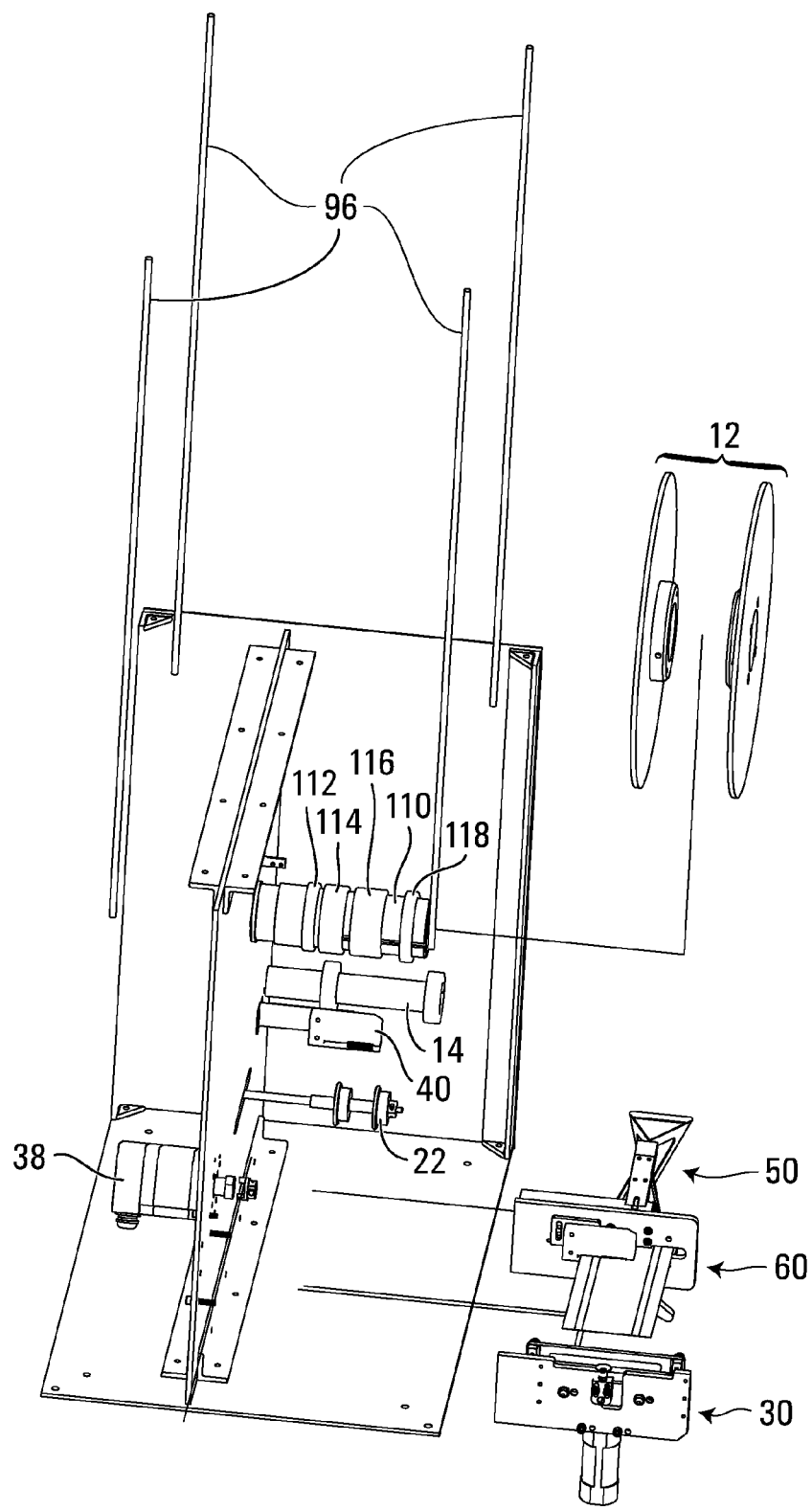

FIGS. 1 to 6 are views of an example shrink-wrap label stock dispensing apparatus. FIGS. 1 and 2 are left and right side isometric views, respectively, FIG. 3 is a right side plan view, FIG. 4 is a top plan view, FIG. 5 is an exploded view showing housing components, and FIG. 6 is an exploded view showing internal apparatus components.

In the example dispensing apparatus 10, shrink-wrap label stock material in the form of a continuous flattened tube or sleeve, is fed from a spool 12, which is installed on a spindle or axle 110 using a collar 13. The spindle 110 is attached to a support member or wall 94 through a bearing assembly shown at 36. The bearing assembly 36 is adjustable in some embodiments to control tension that is applied to the stock material by the spool 12.

The spool 12 turns counter-clockwise in the view shown in FIG. 1. The stock material is fed around an idler roller 14, in the form of a roller having collars 16, 18 in the example shown, and in one embodiment through a detector or sensor 20, which controls cutting of the stock material as described below. The sensor 20 is mounted in a slot 40 in the support wall 94, which provides for adjustable positioning of the sensor.

The stock material then passes through opening and feeding assemblies, generally designated as 28. These assemblies 28 include support rollers 22, 24, 26 for supporting the stock material and/or the opening assembly 50. Three support rollers 22, 24, 26 are shown in FIG. 1, but only one support roller 22 is shown in FIG. 6, for example. This illustrates that different embodiments might include different numbers of support rollers. Each support roller 22, 24, 26 could be similar in structure to the idler roller 14, including a roller with collars or rings for preventing the stock material from wandering off the roller. Adjustment of the position(s) of the support roller(s) 22, 24, 26 is provided by mounting the support roller(s) in a slot 42 in the support wall 94.

An opening assembly 50 is also provided. The opening assembly 50 includes two sections 52, 54, for opening the flat sleeve of stock material in two perpendicular directions. This both opens the sleeve of stock material and removes or reduces creases that might have formed as a result of flattening the sleeve of stock material during loading onto the spool 12. Clamps 56, 58 hold the opening assembly 50 in position, but allow the opener to be removed during initial feeding of stock material from the spool 12 through the dispensing apparatus 10. The support roller 22 provides additional support for the opening assembly 50 in the embodiment shown in FIG. 6. The opening assembly 50 is described in further detail below.

A feeding assembly 60 is driven by a stepper motor 38, which drives gears (one of which is shown at 64 in FIG. 4), which in turn drive gear shafts on which pinch rollers are mounted. The axles rotate in bushing blocks (two of which are shown at 66, 68 for a top axle in FIG. 4), and the top pinch roller is shown at 71. In one embodiment, the stepper motor 38 is directly coupled to one of the gear shafts. The top pinch roller 71 and a corresponding pinch roller aligned below the top pinch roller, advance the stock material in the dispensing apparatus 10. Stock material is pulled from the spool 12, over the idler roller 14, past the support roller(s) 22, 24, 26, and through the sensor 20 and the opening assembly 50, and pushed toward a cutting assembly 30.

Between the feeding assembly 60 and the cutting assembly 30, another sensor 62 is shown. It should be appreciated, however, that the cutting assembly 30 could be controlled from a single sensor 20, 62. Thus, the sensors shown at 20, 62 might represent alternate positions for a sensor. Only one sensor, at one of the positions shown at 20, 62, or possibly another position, could be used to control cutting of the stock material by the cutting assembly 30. A length of stock material shown at 32 is cut from the sleeve of stock material by the cutting assembly 30. In order to avoid overly complicating the drawings, stock material is not shown over its full path of travel through the dispensing apparatus 10.

Manual controls for the dispensing apparatus 10 are shown at 34.

In some embodiments, the dispensing apparatus 10 can handle stock material of different widths, to provide cut sleeves of different sizes. This can be particularly useful where products of different shapes and/or sizes are to be labelled. For an application in processing crustaceans such as lobster, for example, this would enable different sleeve sizes to be used in labelling claws of different sizes of lobster. With reference to FIG. 4, the positions of one or both of the collars or rings on each of the support rollers 24, 26 on roller shafts 70, 72 could be adjustable to accommodate sleeves of different sizes. The positions of one or both of the collars or sleeves on shafts of each of the idler roller 14 and the other support roller 22 could be similarly adjustable. In the case of the spool 12, one or both end plates of the spool could be positioned using spacers 112, 114, 116, 118 on the spool spindle 110 (see FIG. 6) so that the stock material is centred in a feed path of the dispensing apparatus 10.

As noted above, the operating environment in certain industries such as seafood processing can be harsh. For applications in such an environment, a housing could be provided for the dispensing apparatus 10. With reference to FIG. 5, housing sections 80, 84, 86, 88, 90, 92 are provided in one embodiment, and are fastened together using support members 100, 102, 104, 106, 108, 109 (and additional members corresponding to 104, 106 at the bottom of the support wall 94) and screws or other fasteners (not shown). Threaded rods 96 and nuts (not shown) could be used in some embodiments to suspend the dispensing apparatus 10. The controls 34 are mounted to a front housing section or panel 80, which also includes a cutout or opening 82 through which cut stock material can be removed. The housing protects the dispensing apparatus, and the support wall 94 provides both support for elements of the apparatus and separate internal compartments. Apart from the actual control buttons, the control panel 34 and the motor 38 are within a separate compartment from other components of the dispensing apparatus, and the opening 82 does not open into this separate compartment in this embodiment.

Additional measures to prevent contamination/corrosion from occurring inside the apparatus when operating in a harsh environment may include, for example, the use of positive pressure inside the enclosure, thereby preventing the ingress of contaminants; and the use of a 'background heater' inside the enclosure, preventing the accumulation of condensation on the equipment over a wide range of temperature and humidity conditions.

Figure 7:
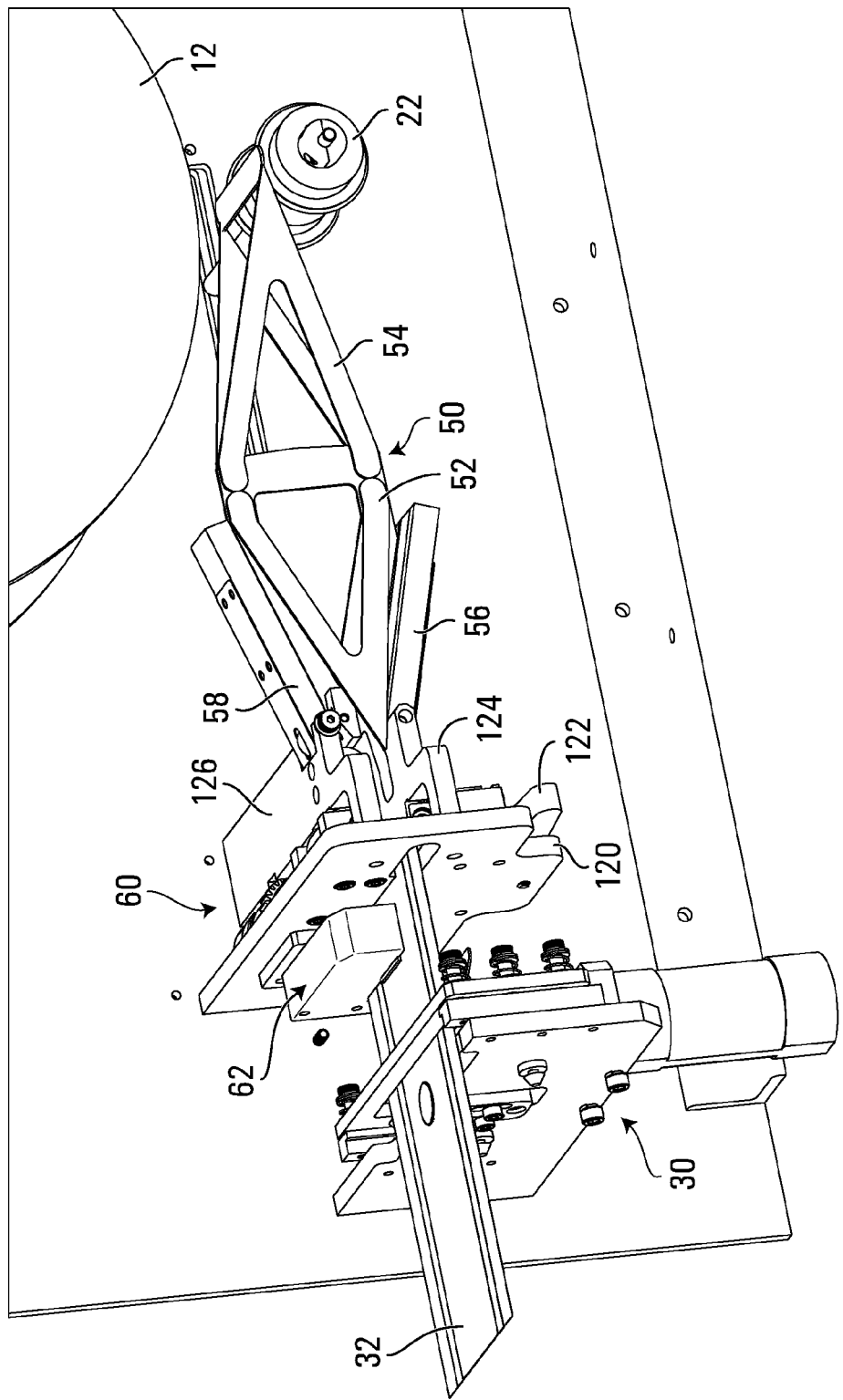
FIG. 7 is an isometric view of an example shrink-wrap label stock opening, feeding, and cutting arrangement.
Figure 8:
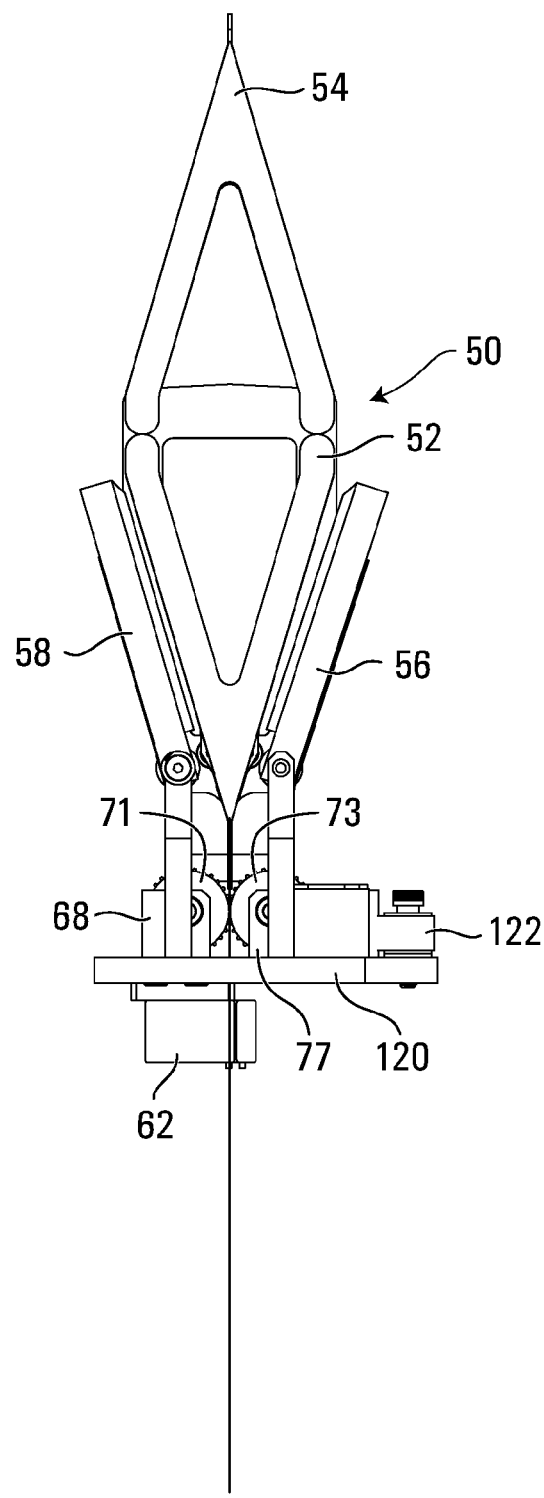
FIGS. 8 to 13 are views of example label stock opening and feeding assemblies.

FIG. 7 is an isometric view of the example shrink-wrap label stock opening, feeding, and cutting arrangement of the dispensing apparatus 10. This arrangement includes the opening assembly 50, the feeding assembly 60, and the cutting assembly 30, each of which is described in detail below.

Figure 12:
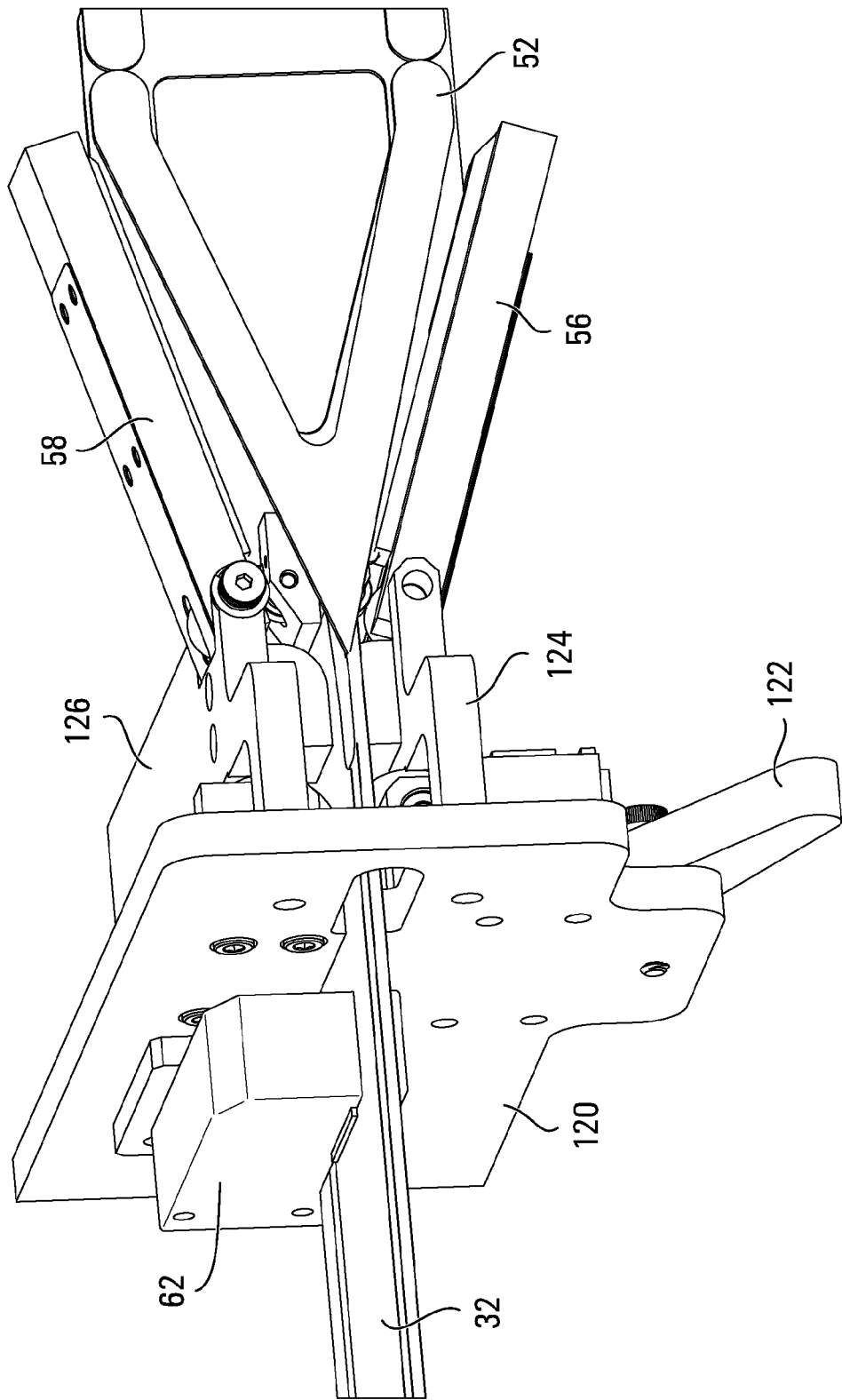
Figure 13:
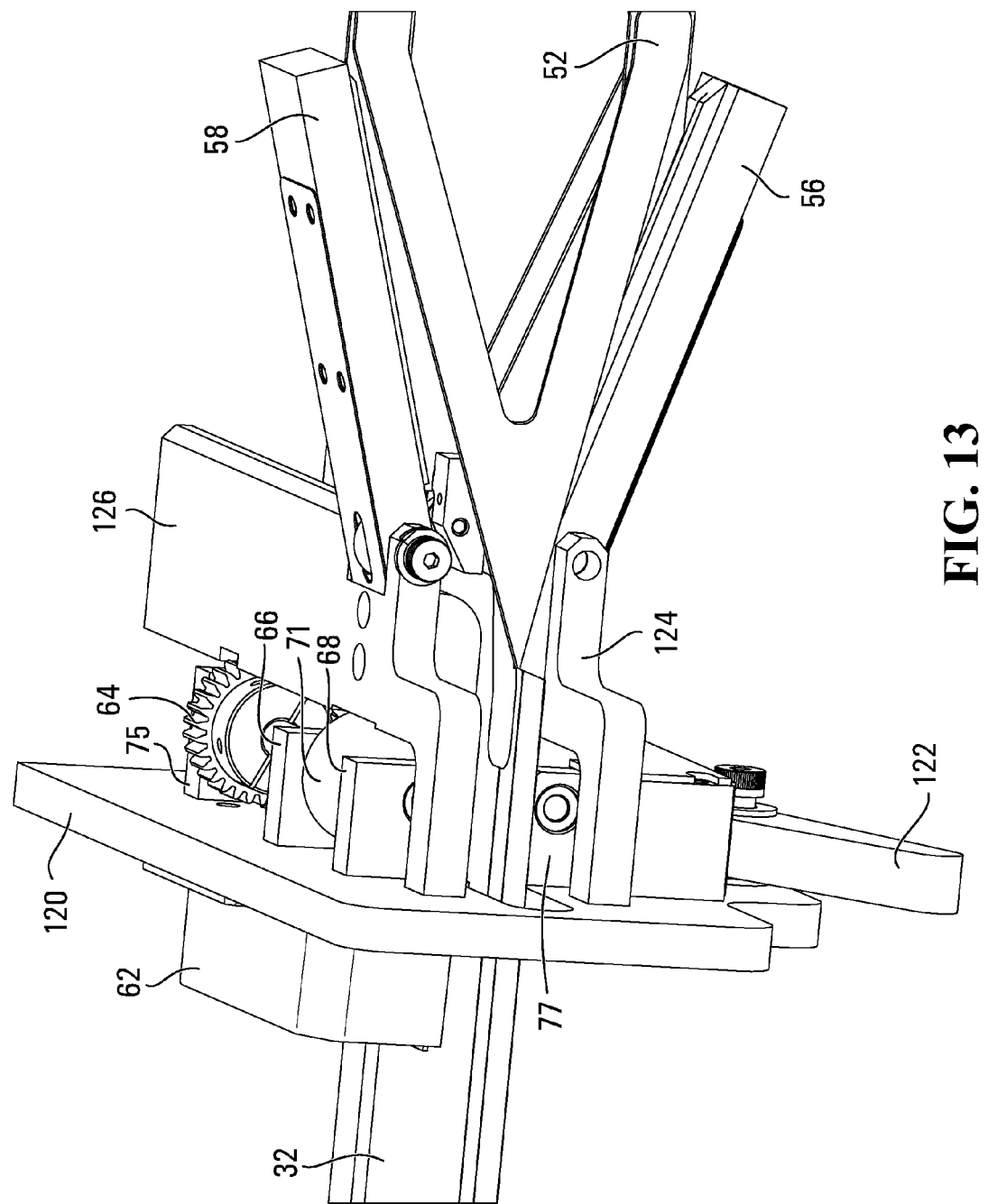
Figure 14:
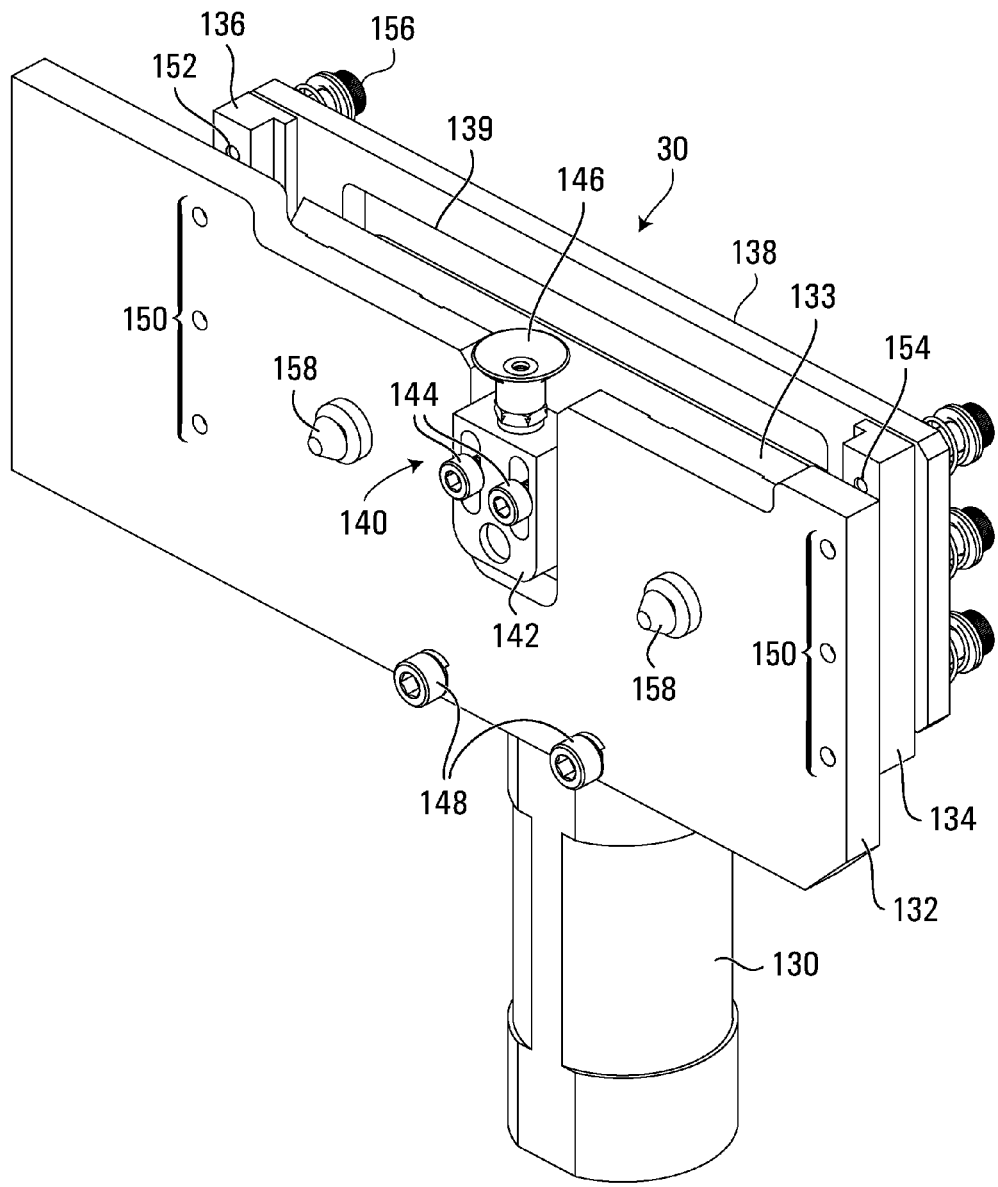
FIGS. 14 to 17 are views of an example cutting assembly.

FIGS. 8 to 13 are additional views of the opening and feeding assemblies 50, 60. FIGS. 8 to 11 are side, top, rear, and front plan views, and FIGS. 12 and 13 are right-front and right-rear isometric views.

Considering first the opening assembly 50, during initial feeding of the stock material, the opening assembly 50 could be released from the clamps 56, 58 so that the sleeve of stock material can be fed over the sections 54, 52, which are joined together at the front edge of the rear section 54 and the rear edge of the front section 52. After the sleeve of stock material is fed past the rear edge of the section 54, it travels along that section and is opened in a vertical direction, perpendicular to the feed path and the plane of the flat stock material. The stock material then passes the rear edge of the front section 52, and is opened in the horizontal direction.

In one existing machine design, the spool 12 is mounted horizontally, and only one opener section is used. The plane of the flat stock material is vertical, and in this case the front opener section 52 is used to open the flat stock material. According to an embodiment of the invention, however, labels are printed or otherwise applied on both the top and bottom surfaces of the flat stock material, and those labels are to appear at the top and bottom of lobster claws. The vertical mounting of the spool 12 and the rear section 54 of the opening assembly 50 allow the spool 12 to be loaded with stock material such that the labels are not creased during loading of the spool, and the proper orientation of the labels can be maintained for lobster claws to be held horizontally during labelling. This type of orientation challenge is not typically of concern in many shrink-wrap labelling applications, since products to be labelled can often be positioned in any orientation as an alternative to controlling orientation of the labels.

The clamps 56, 58 are mounted to plates 124, 126, which are in turn mounted to both a plate 120 and the support wall 94. The clamps 56, 58 releasably hold the front section 52 of the opening assembly in some embodiments, so that the assembly can be removed during initial feeding of the stock material.

Figure 9:
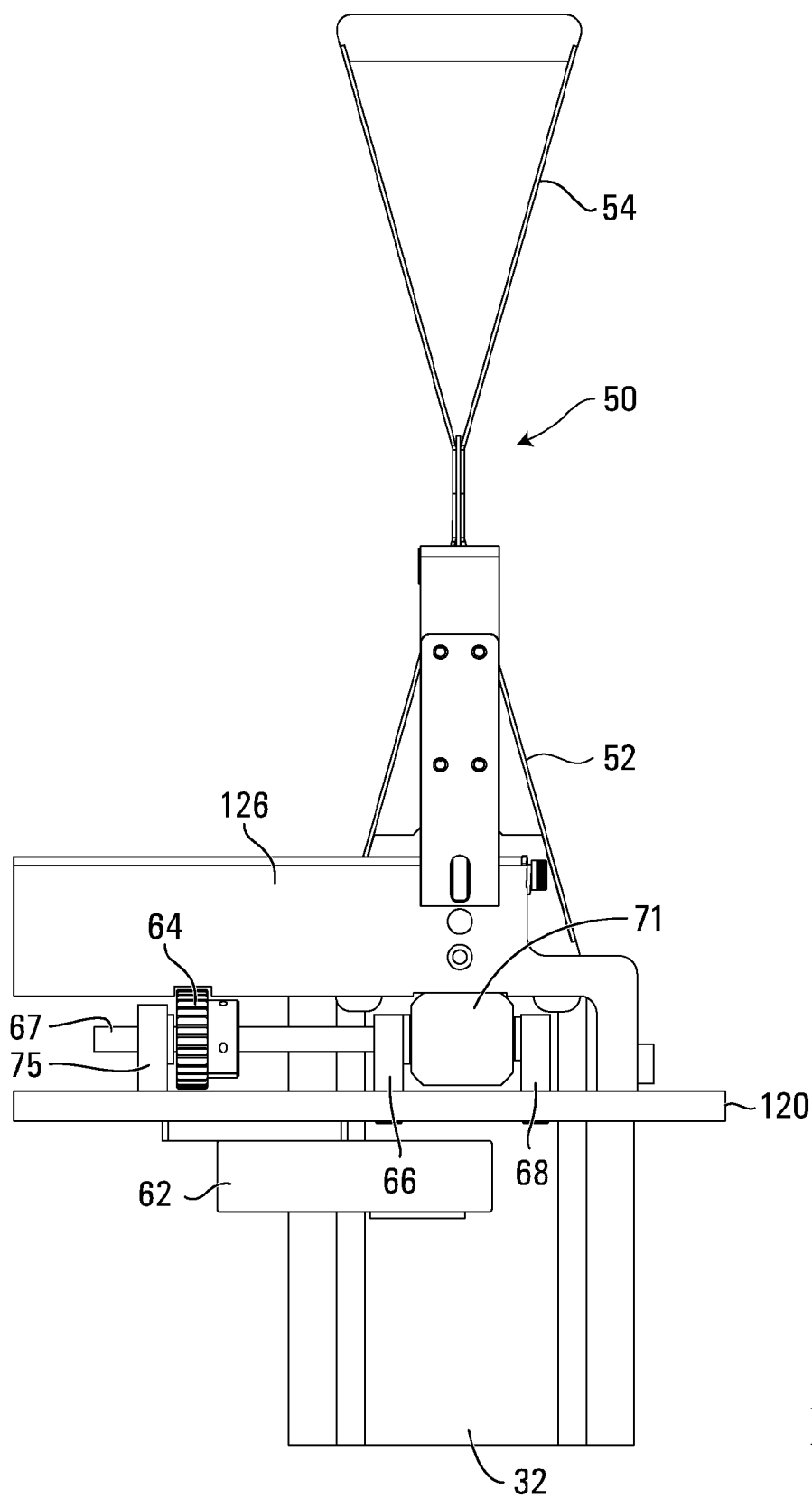
Figure 10:
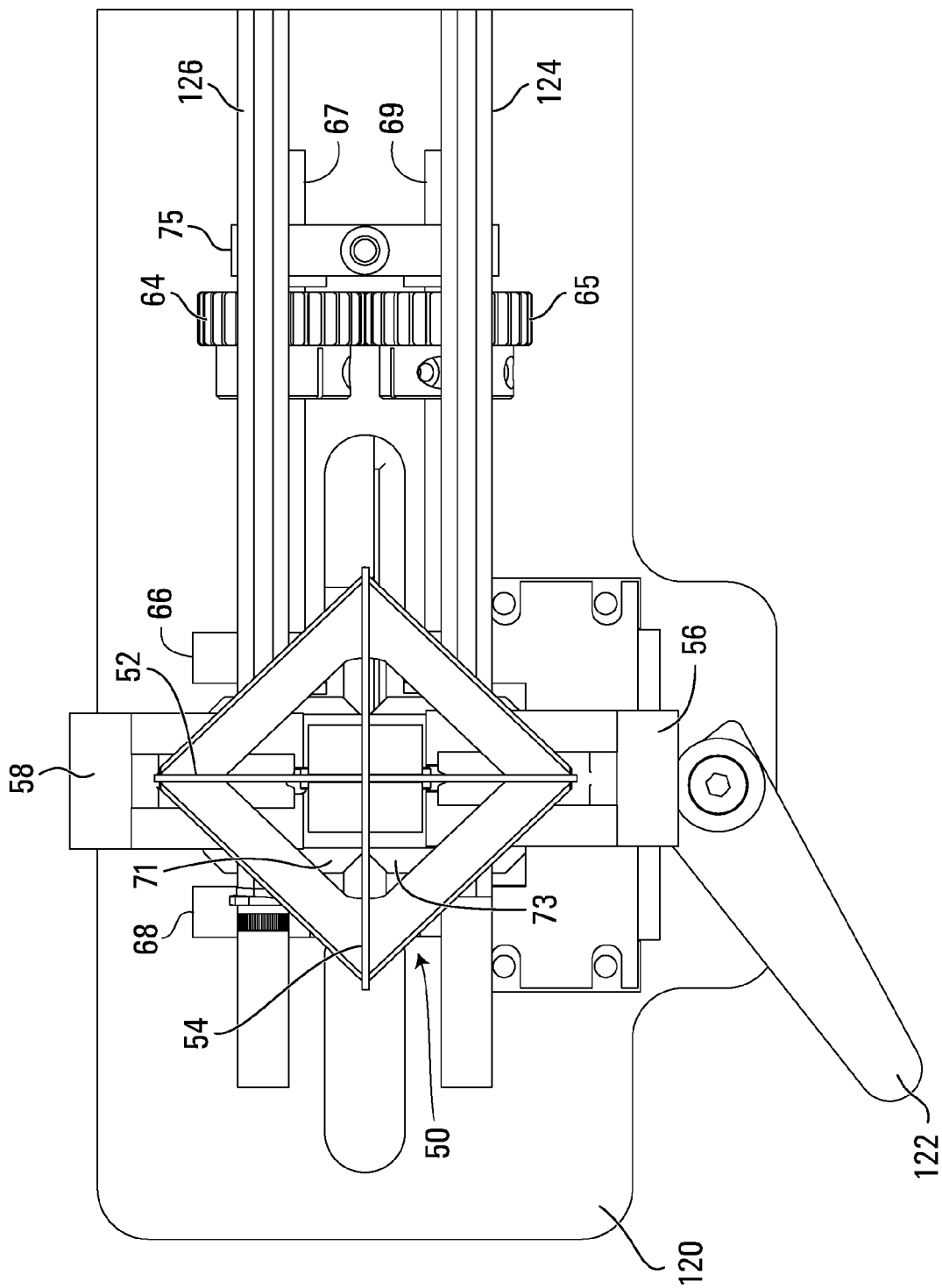
Figure 11:
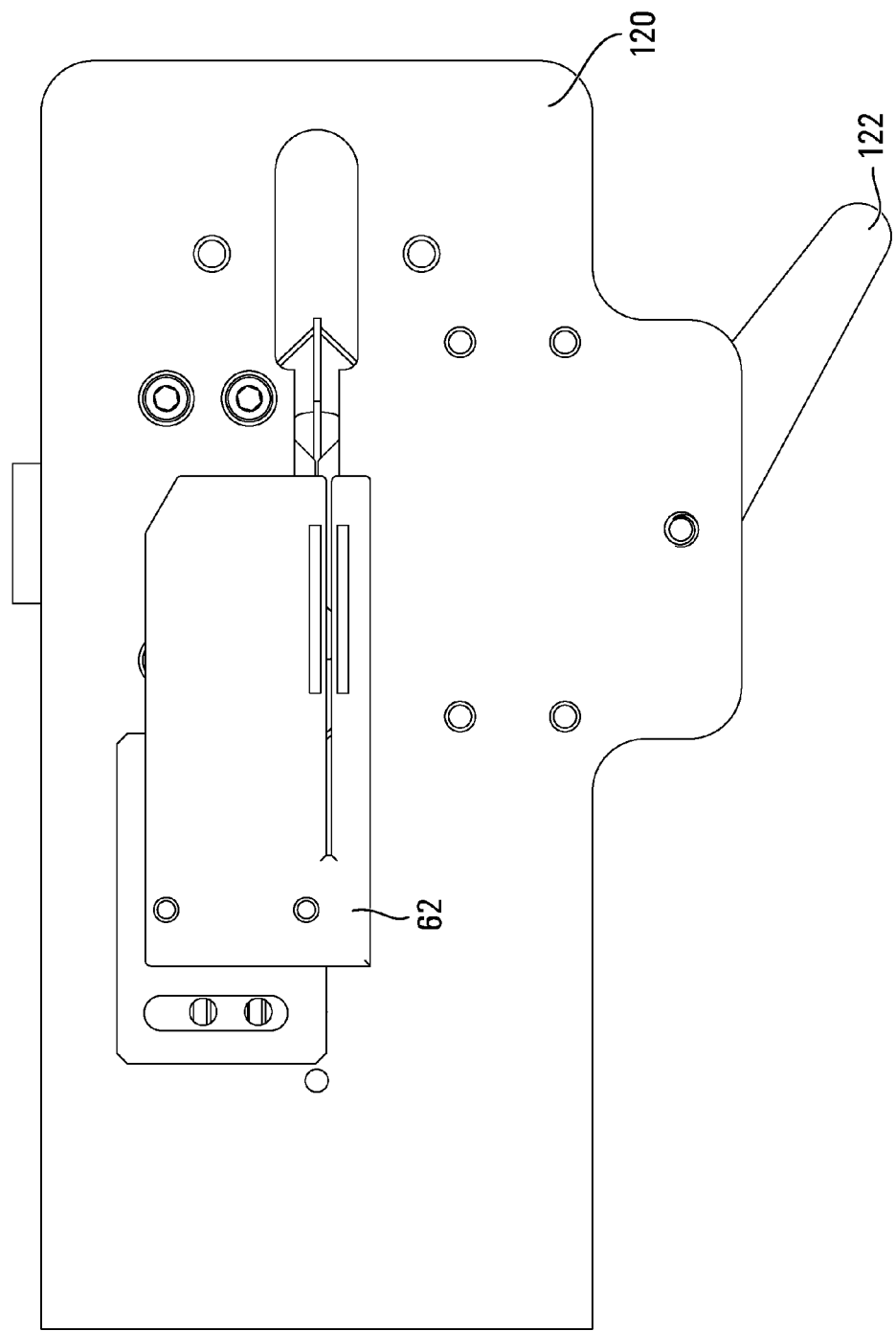

In the feeding apparatus 60, the top pinch roller 71 is driven by the gear 64 through the shaft 67 (FIGS. 9, 10). Another gear 65 and shaft 69 (FIG. 10) are provided for driving a lower pinch roller 73 which is aligned with the top pinch roller 71, and the pinch rollers engage the stock material to advance the material through the dispensing apparatus. The top shaft 67 is mounted to the plate 120 through the bushing blocks 66, 68, 75 in the example shown in FIG. 9, and that plate is mounted to the support wall 94. A cam-operated release lever 122 enables one of the pinch rollers (illustratively the lower pinch roller 73 on the shaft 69) to be released, to allow an operator to pull the sleeve stock material through the rollers when loading the machine.

In one embodiment, the bushing blocks 66, 68, 75 are attached to the plate 120. As shown in FIG. 10, for example, both shafts 67, 69 rotate in the bushing block 75 and are held on the plate 120. Lower bushing blocks, opposite the bushing blocks 66, 68, for the lower shaft 69 (one of which is shown at 77 in FIGS. 8 and 13) could be substantially identical to the bushing blocks 66, 68, but either not fastened to the plate 120 or movably fastened to the plate 120. The release lever 122 could then be operated to release an upward force that is applied to the lower bushing block 77 and the lower bushing block opposite the bushing block 66 through another plate or block (not shown), so that the lower shaft 69 can be rotated slightly, to separate the pinch rollers 71, 73 for feeding stock material during loading. The bushing block 75 still holds the shaft 69 to the plate 120 even when upward force on the lower bushing blocks is released. The lower shaft 69 could be further stabilized during operation of the feeding assembly by movably mounting the lower bushing blocks to the plate 120 using a screw and slot arrangement, for example. The lower bushing blocks could also or instead be mounted to a block or plate through which the release lever 122 applies upward force to the lower bushing blocks, with that block or plate in turn being movably mounted to the plate 120.

FIGS. 14 to 17 are views of the example cutting assembly 30, which includes plates 132, 138, 162, a cutting blade 133, and guide blocks 134, 136. The plate 132 is mounted to the support wall 94 and to a cylinder unit 130 (via the bolts 148) in one embodiment. The guide blocks 134, 136 are fastened to the plate 132 using bolts or other fasteners (not shown) which are installed through bores 150 and are received in threaded bores 152, 154, and serve as guides for the cutting blade 133. Although there are three threaded bores in each guide block 134, 136 to align with the bores 150, only one of the bores 152, 154 per guide block is visible in FIG. 14.

The plate 132 also includes a slot in which a cut sleeve holder 140 is movable. The cut sleeve holder 140 is mounted to the plate 162, which also carries the cutting blade 133 (shown in FIG. 14, and partially broken away in FIG. 15 so that other components are visible). The cut sleeve holder 140 includes a suction cup 146, which is carried by a block 142. The block 142 is attached to the plate 162 using bolts 144, which are received in threaded bores 166 in the plate 162. The multiple sets of bores 166 and slots in the block 142 provide for adjustment of the position of the block 142 and thus the suction cup 146.

Figure 16:
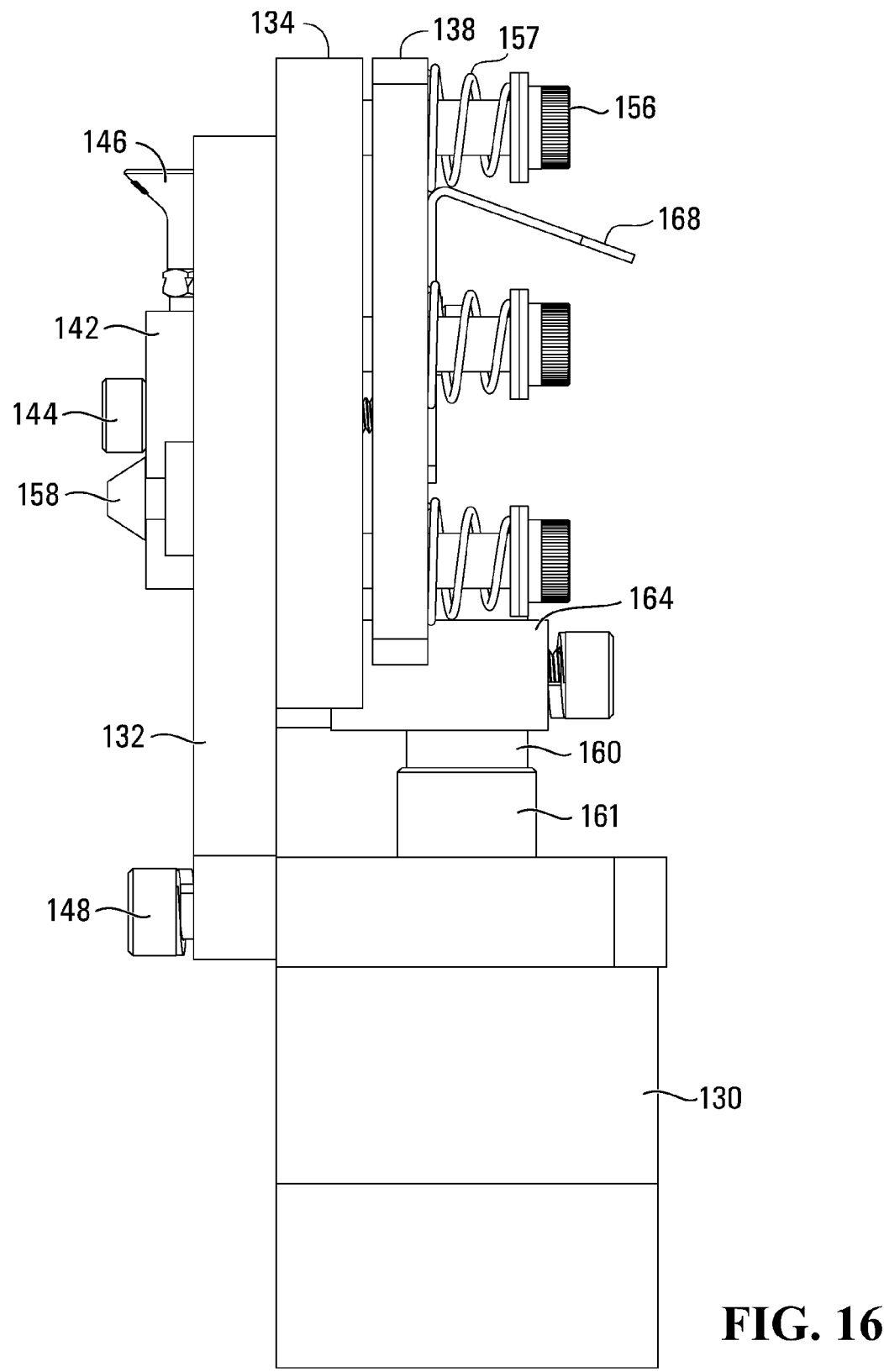

The plate 138 is mounted to the guide blocks 134, 136 using bolts 156. These bolts 156 are received in the same bores 152, 154 in the guide blocks 134, 136 as the bolts that mount the guide blocks to the plate 132, but do not protrude through the guide blocks. The same threaded bores 152, 154 in the guide blocks 134, 136 can thus serve a dual purpose. With reference to FIG. 16, a respective spring 157 is provided between the head of each bolt 156 and the surface of the plate 138. The springs 157 could be captured by the bolt heads or separate washers. This spring arrangement provides for control of the pressure that is applied by the plate 138 on the cutting blade, which would be mounted to the plate 162 and would be moved along the plate 138 during a cutting operation. The pressure could be adjusted by, for example, tightening or loosening the bolts 156 and/or changing the number of washers installed on the bolts.

A cylinder 161, which could be a hydraulic or pneumatic cylinder, inside the cylinder unit 130 drives a shaft 160, which is attached to the plate 162 by the block 164 and bolts 165. Firing of the cylinder 161 is controlled by the sensor(s) 20, 62. The sensor(s) 20, 62 and a cylinder controller could be set to fire the cylinder 161 to provide any of various lengths of cut sleeve. The length of the sleeve could be set differently for different sizes of lobster, for instance.

Figure 15:
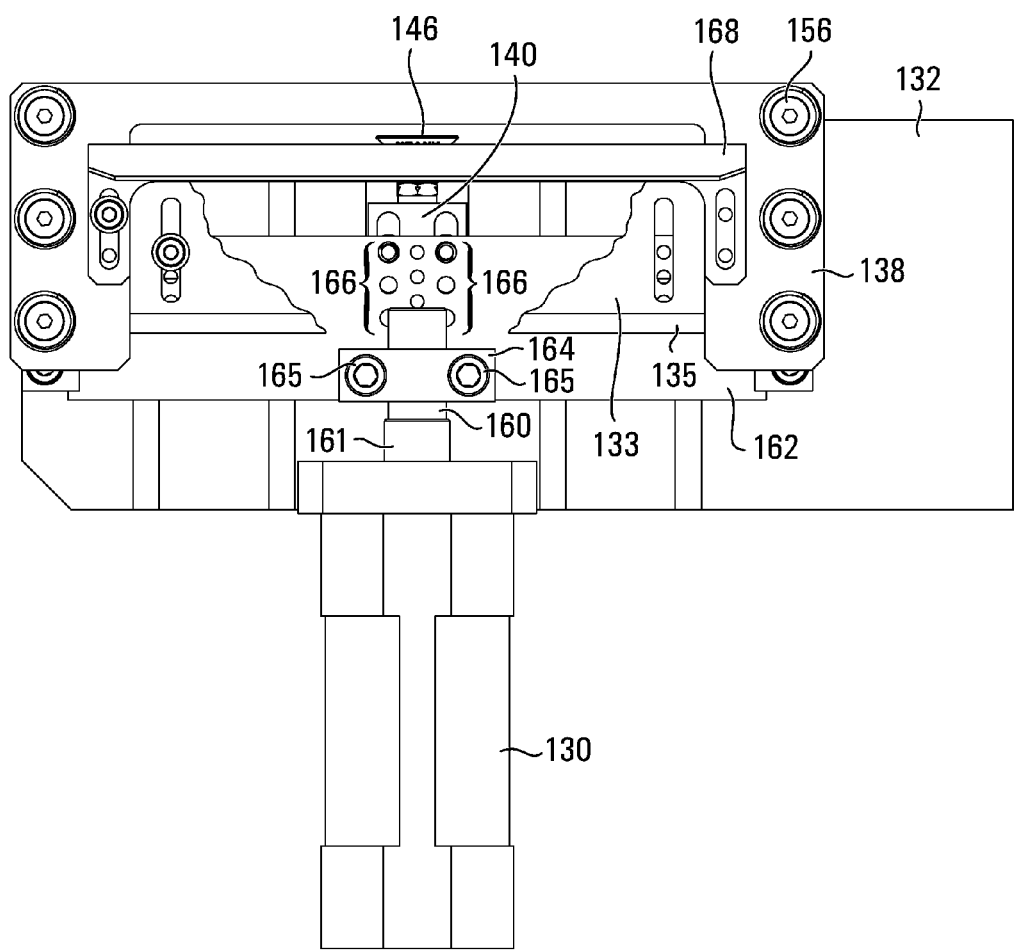
Figure 17:
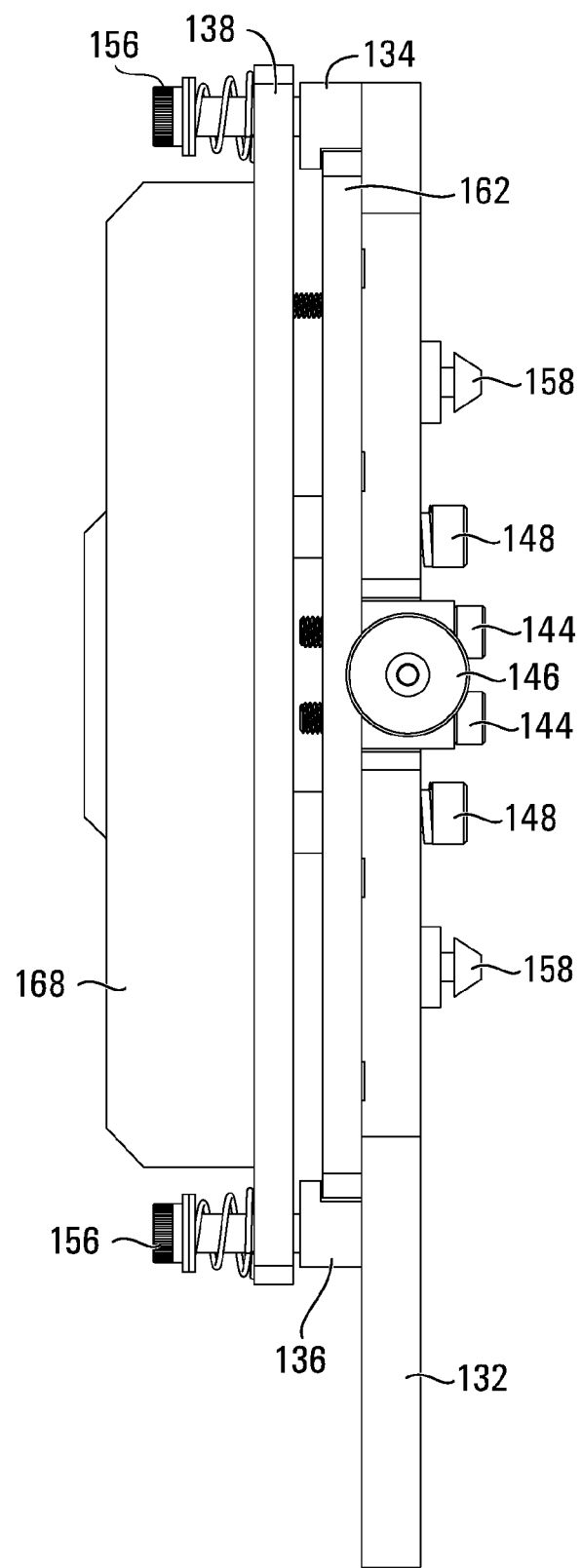

FIGS. 15 to 17 show a bent guiding plate 168 for guiding stock material into the cutting assembly 30. Grease nipples 158 provide for lubrication of the cutting assembly 30.

The cutting blade 133, which as noted above is mounted to the plate 162, is moved upward, to cut the stock material against an edge 139 of the plate 138. With reference to FIG. 15, it can be seen that slots in the cutting blade 133 provide for adjustment of the position of the blade on the plate 162. Although only two slots are shown in FIG. 15, a third slot could be provided in the cutting blade 133, to align with the central bores which are between the bores 166. Similarly, although only one screw or bolt is shown in FIG. 15 to fasten the cutting blade 133 to the plate 162, a screw, bolt, or other type of fastener could be used in each slot of the cutting blade. FIG. 15 also illustrates that the cutting blade 133 could include a second cutting edge 135, to prolong the life of the cutting blade by allowing the cutting edge to be switched by flipping the cutting blade on the plate 162 without replacing the entire cutting blade.

The cut sleeve holder 140 is mounted to the same plate 162 as the cutting blade 133, and thus moves with the cutting blade. When the stock material has been cut, a vacuum source coupled to the suction cup 146 is activated, and the cut sleeve is retained by the suction cup. The sleeve remains open, and is presented such that a lobster claw or some other product to be labelled can be placed into the open sleeve. In some embodiments, additional features could be provided to maintain the sleeve open for receipt of a product to be labelled.

When a product has been placed into the cut sleeve, the sleeve can be removed from the suction cup 146. In one embodiment, an operator inserts a lobster claw into the sleeve, holds the sleeve in place with a finger or thumb, and pulls the claw and sleeve away from the suction cup 146. The sleeve can then be shrunk around the claw.

Figure 18:
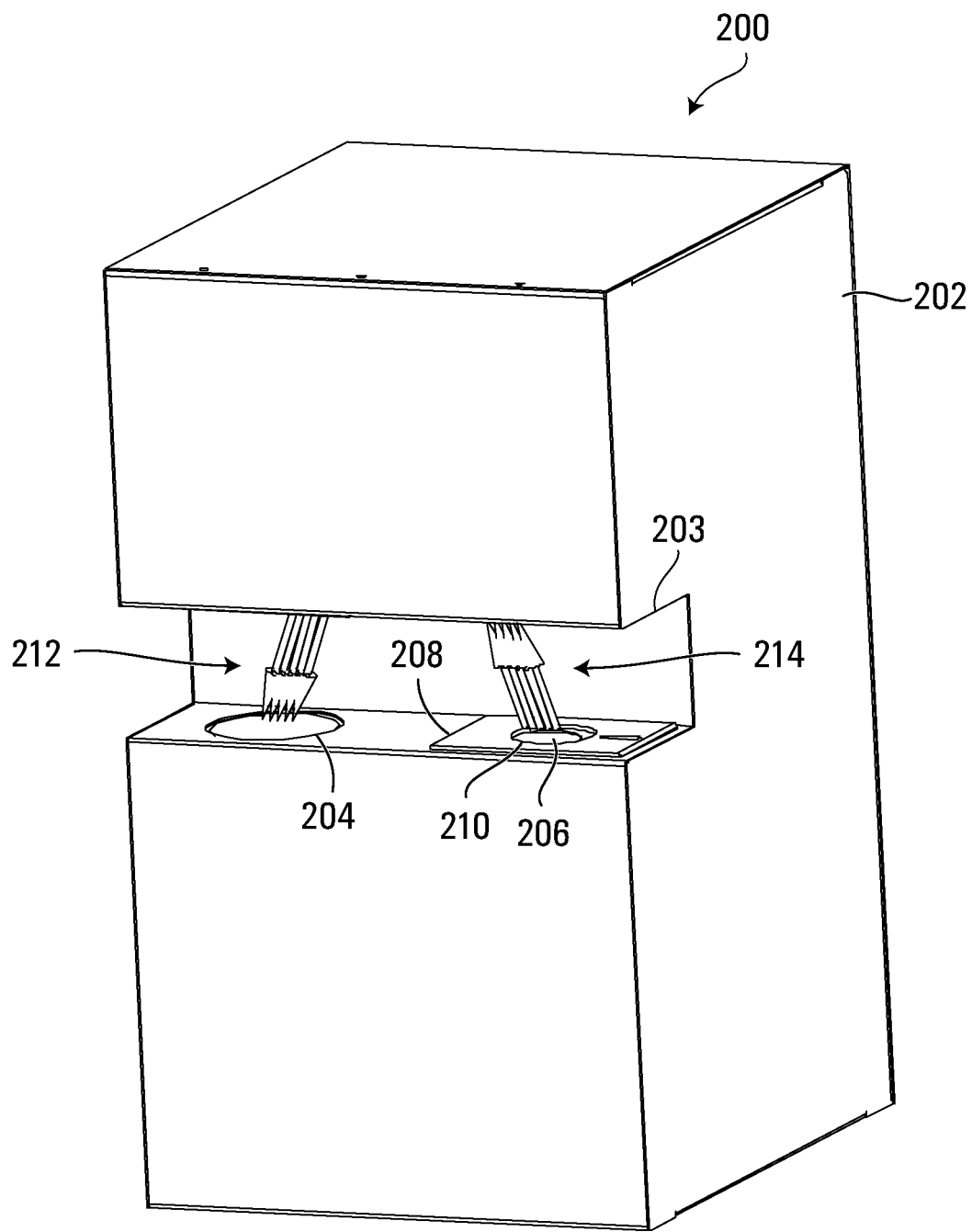
FIGS. 18 to 20 are isometric views of an example heating apparatus.
Figure 19:
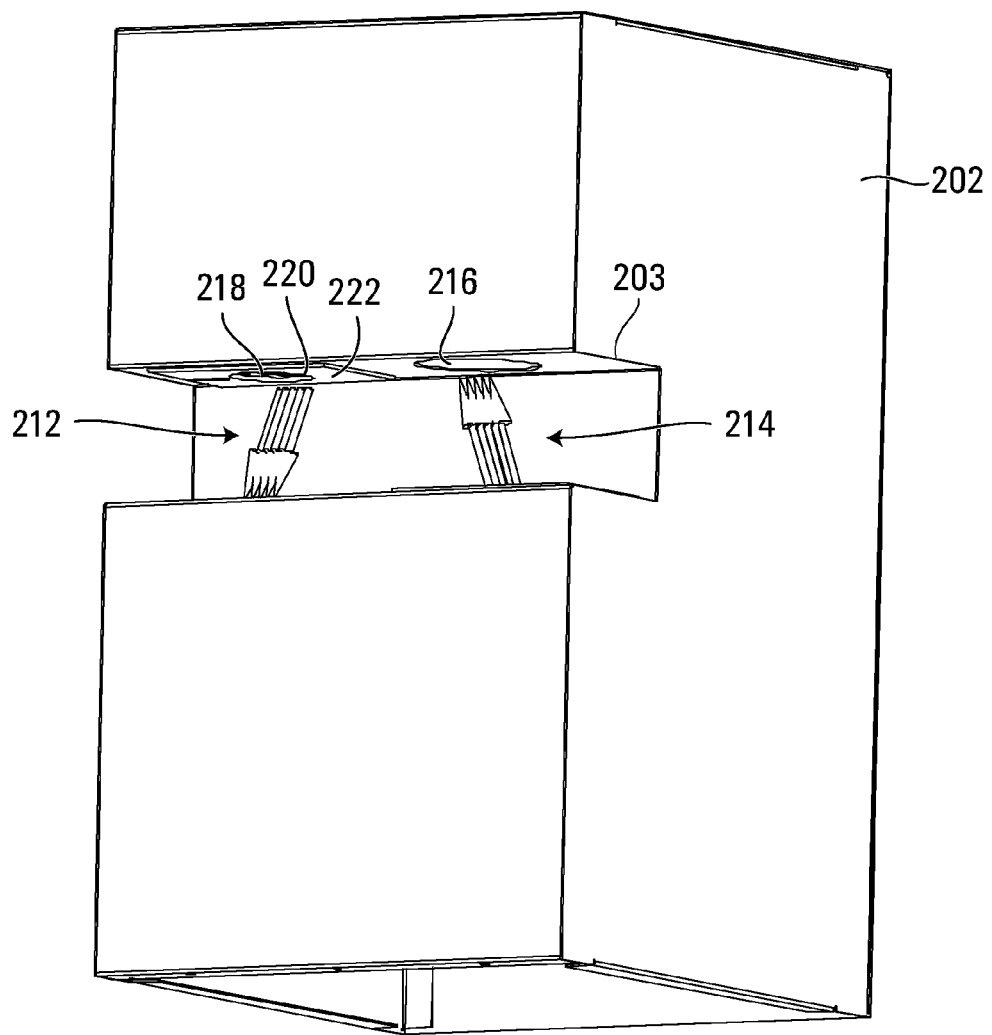
Figure 20:
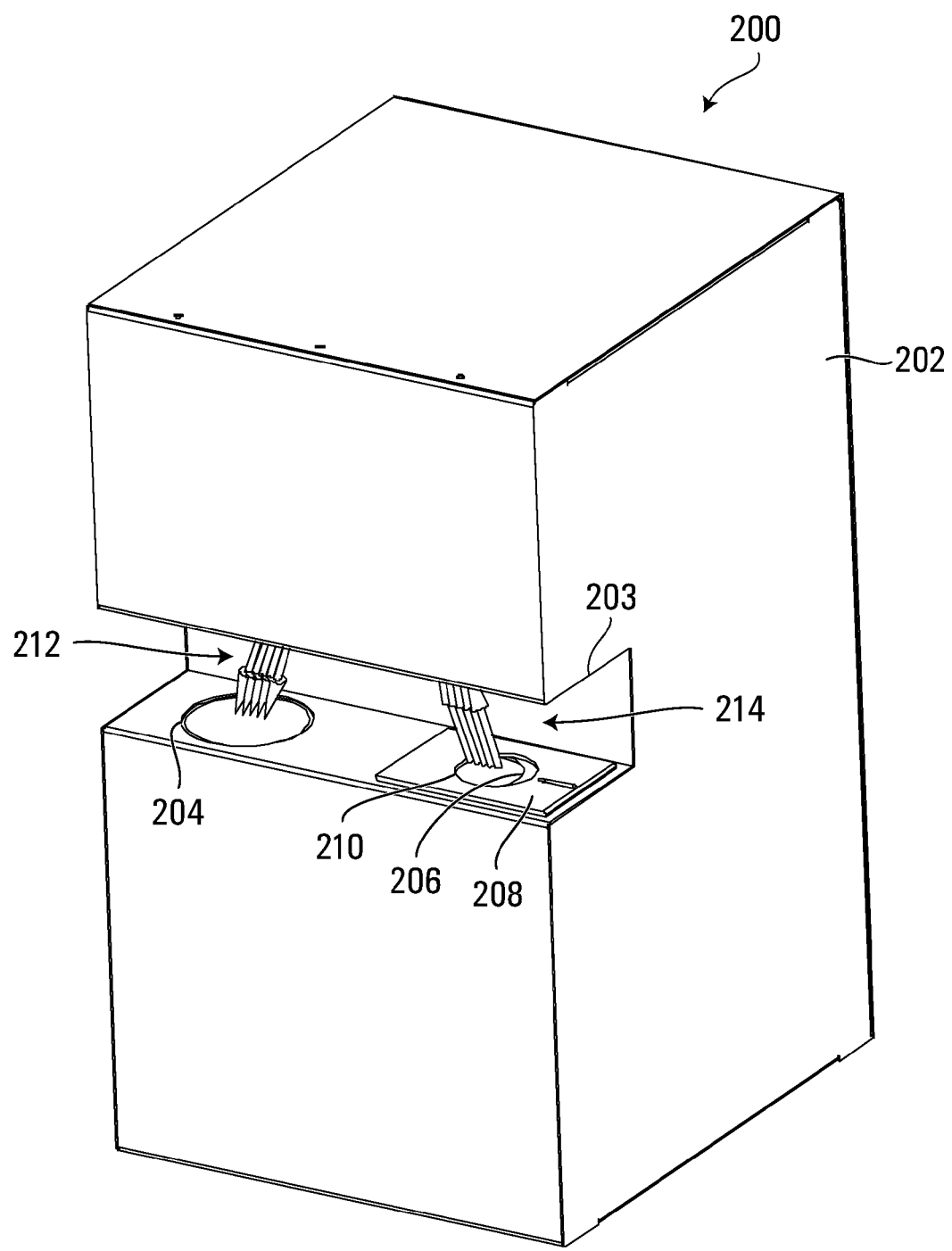

Shrinking of the sleeve involves application of heat. FIGS. 18 to 20 are isometric views of an example heating apparatus 200. In this heating apparatus 200, a housing 202 has a passage or slot 203 through which product with cut a sleeve of stock material can be moved to shrink the sleeve. Heated air flows upward through a passage 206 in the housing 202, as shown at 214. Flow of air through the passage 206 is controlled by a restrictor plate 208, which has another passage 210 therein. The passages 206, 210 may be of the same size or different sizes, and actual airflow is controlled by sliding the restrictor plate to the left or right. The upward airflow through the passages 206, 210 enters an upper passage 216 in the housing 202.

A similar arrangement is provided for downward flow of heated air, through an upper passage 218 in the housing 202 and a passage 220 in a slidable restrictor plate 222 and into a lower passage 204, as shown at 212.

In one embodiment, an operator moves a lobster claw that has been placed into a cut sleeve of stock material from left to right, through the upward flow of heated air at 214 and then through the downward flow of heated air at 212. This shrinks the stock material on the bottom of the claw first. Most of the shrinkage should then be at the bottom of the claw, and any wrinkles in the shrunk material should be at the bottom of the claw as well. Shrinkage at the top of the claw can then be minimized or at least reduced, to provide for less distortion of the top label, which would be the label most likely to be viewed by a consumer.

Figure 21:
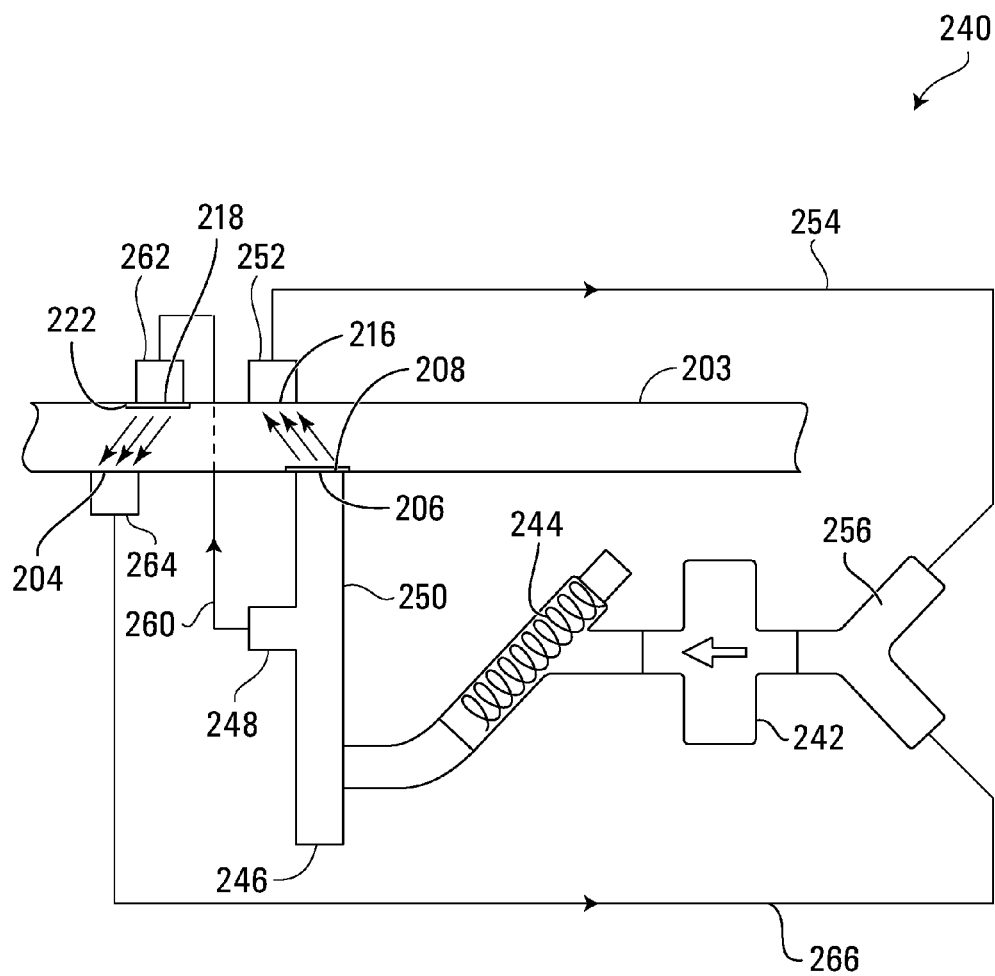
FIG. 21 is a diagram illustrating an example heating apparatus air flow arrangement.
Figure 22:
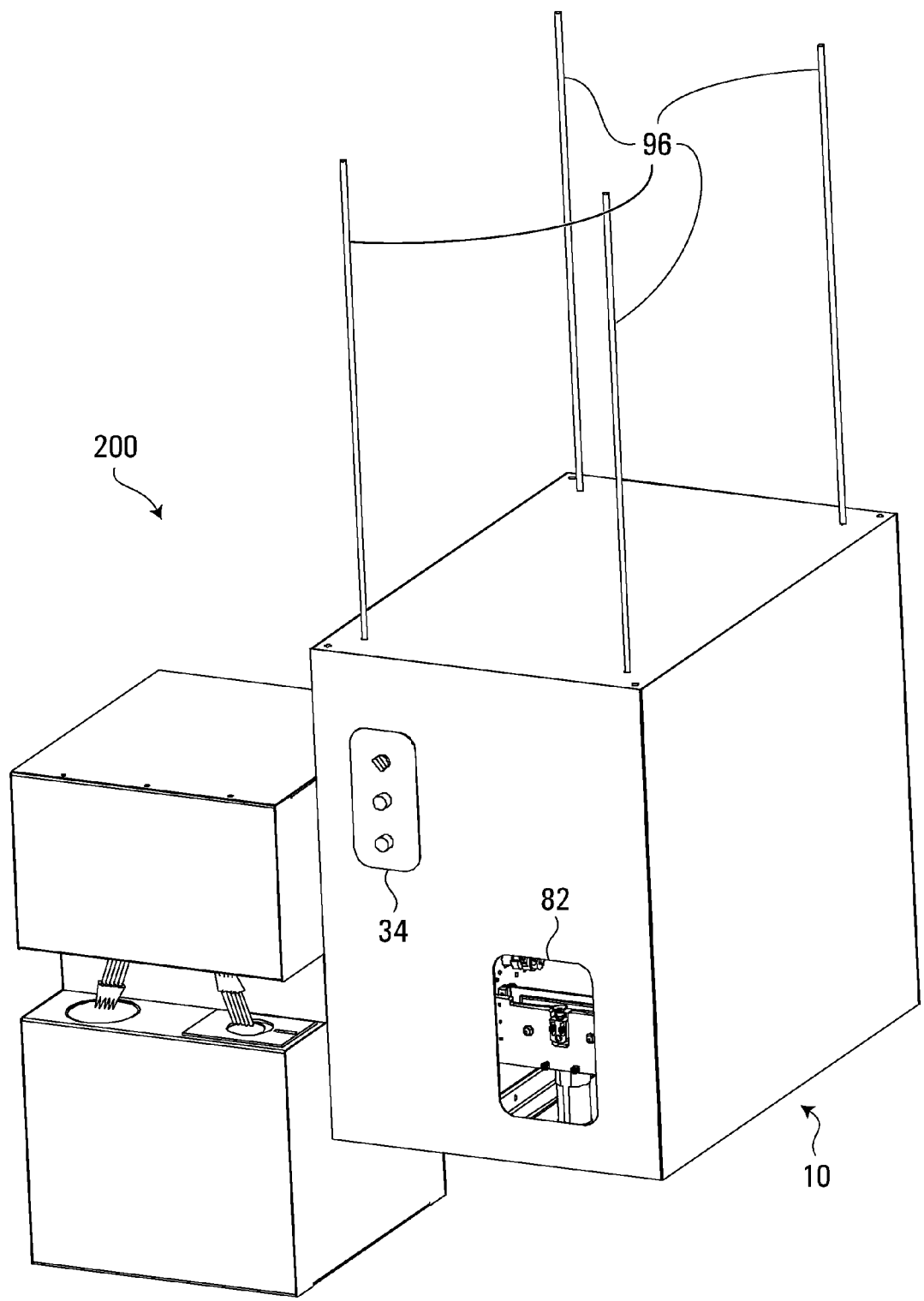
FIGS. 22 to 25 are isometric views of an example shrink-wrap labelling system comprising the example dispensing apparatus shown in FIGS. 1 to 6 and the example heating apparatus shown in FIGS. 18 to 20.
Figure 23:
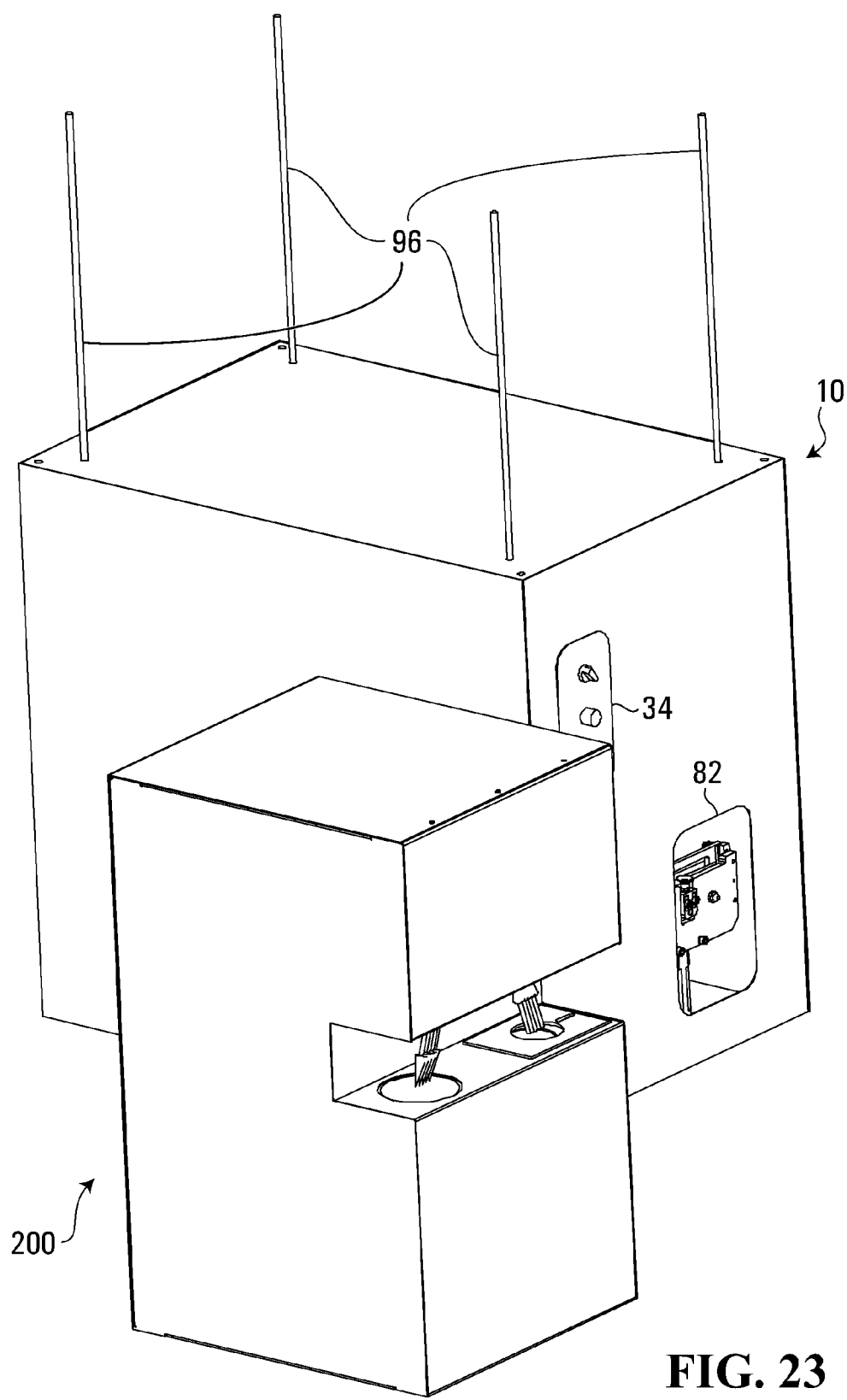
Figure 24:
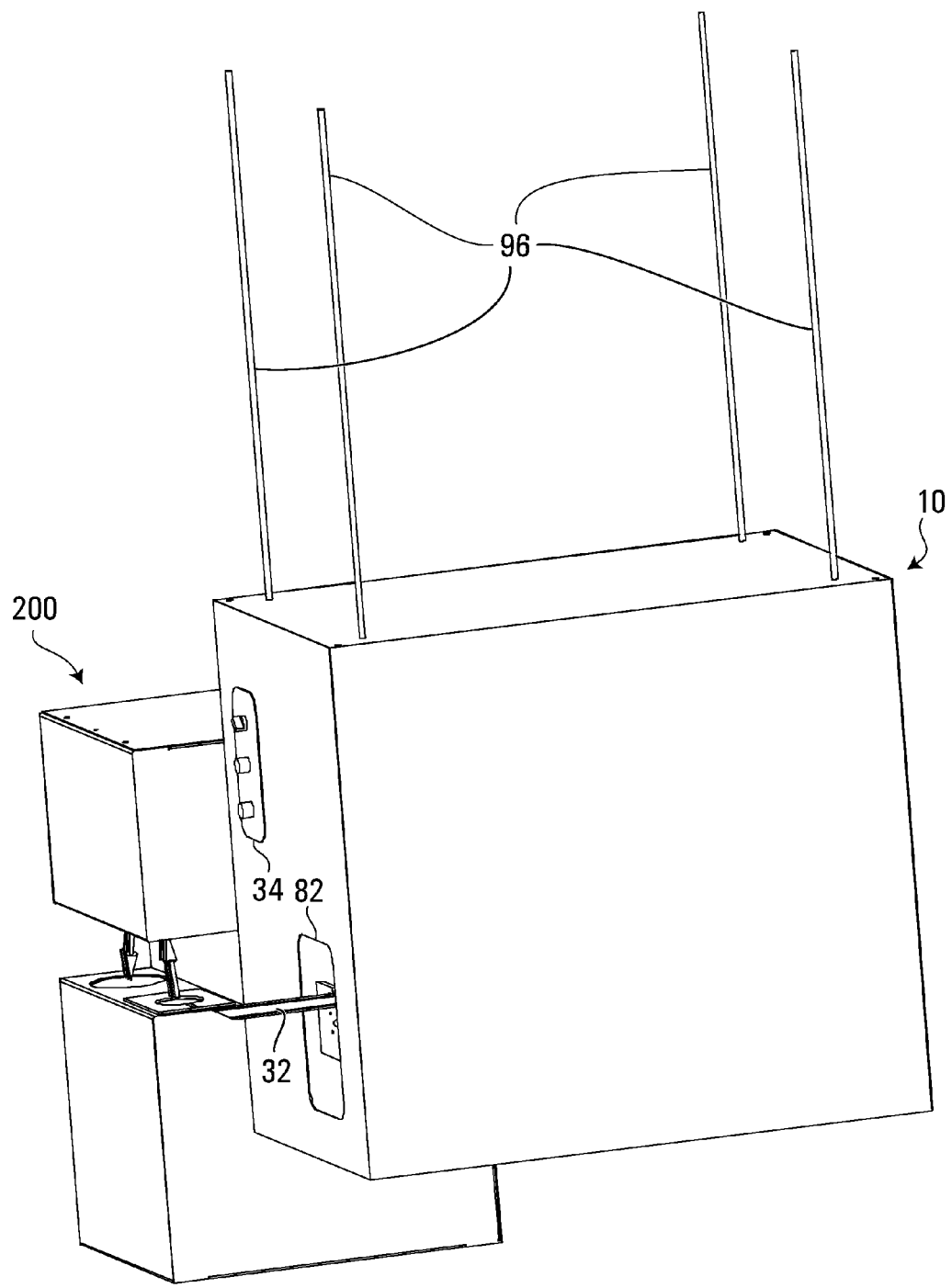

The air flow described above and shown in FIGS. 18 to 20 could be achieved in any of various ways. FIG. 21 is a diagram illustrating an example heating apparatus air flow arrangement 240 that could be used in the heating apparatus 200. An axial or centrifugal fan or blower 242 forces air toward a heater 244. The heated air flows past a cleanout 246, which allows any fallen debris to be removed from the system. A cleanout could also or instead be provided below the passage 204, to catch debris that falls into the downward air flow.

The heated air is distributed between the upward and downward flow passages 206, 218 in ducts 250, 248, respectively. For the upward air flow, the actual flow is controlled by the restrictor plate 208, and heat is applied to the underside of a cut sleeve and product when it passes between the passages 206, 216. Air is then recycled through an upper duct 252 and flexible duct 254, back to an intake 256 for the blower 242. The downward airflow path is through a flexible duct 260, a further duct 262, the passage 218 and restrictor plate 222, the lower passage 204 and duct 264, and then back to the blower intake 256 through a flexible duct 266.

Recirculation of heated air recovers heat, which can be especially important in a cooled operating environment such as a seafood processing plant, for example.

Control of the temperature of the heated air could be provided, for example, through one or more temperature sensors and a controller for the heater 244. The blower 242 could also be controlled to affect heat transfer to cut sleeve material and product. In the case of live lobster, which are sensitive to temperature, a shrink-wrap material that requires less heat to shrink might be used, in which case a lower temperature can be maintained in the air flows.

Figure 25:
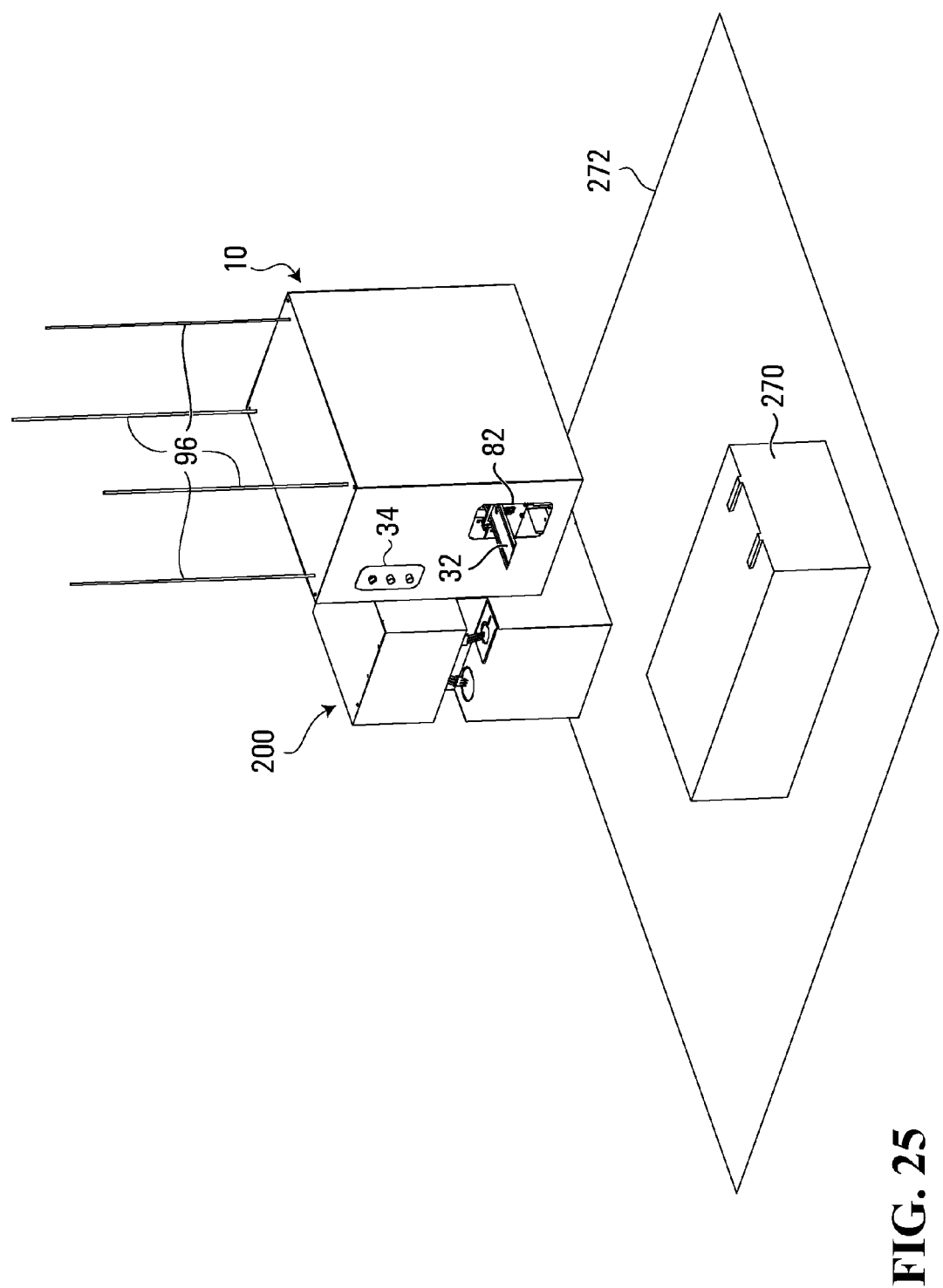

FIGS. 22 to 25 are isometric views of an example shrink-wrap labelling system comprising the dispensing apparatus 10 shown in FIGS. 1 to 6 and the heating apparatus 200 shown in FIGS. 18 to 20. The heating apparatus 200 and a platform 270 for holding a crate of lobster or other product could sit on the floor 272 of a processing plant, and the dispensing apparatus 10 could be suspended on the rods 96, as shown in FIG. 25. The control panel 34 and the opening 82 in the dispensing apparatus 10, the slot in the heating apparatus 200, and the product crate are then all accessible to an operator. In the case of labelling lobster, the operator would insert a lobster claw into a cut and open sleeve, hold the sleeve in place on the claw with a thumb or finger, remove the sleeve from the cut sleeve holder, and move the claw and sleeve through the slot of the heating apparatus 200 to shrink the sleeve.

Figure 26:
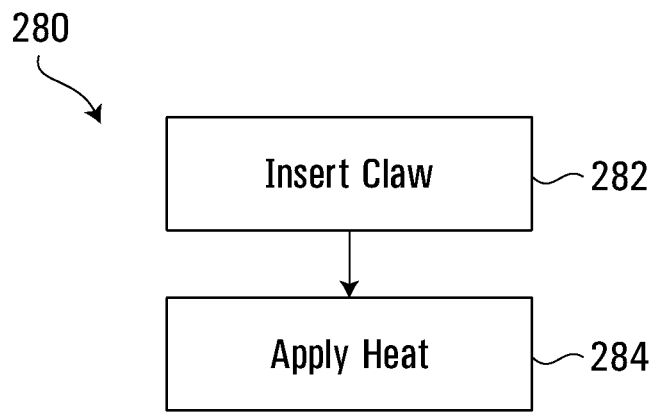
FIGS. 26 and 27 are flow diagrams illustrating example methods.

FIG. 26 is a flow diagram illustrating an example method. The method 280 relates to labelling crustaceans, and involves operations 282 of inserting a claw of a crustacean into a sleeve of shrink-wrap stock material, and 284 of applying heat to the sleeve to shrink the sleeve around the claw.

Figure 27:
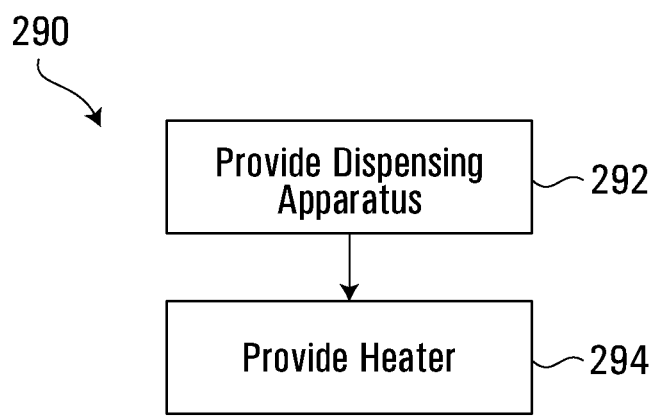

The flow diagram in FIG. 27 illustrates a method 290 of manufacturing or installing a labelling system, and involves operations 292 of providing a dispensing apparatus to present respective cut and opened sleeves of shrink-wrap stock material for insertion of claws of crustaceans, and 294 of providing a heating apparatus to apply heat to the cut sleeves to shrink the sleeves around the claws.

A shrink-wrap label might not only provide for product differentiation through controlled shrinkage and enhanced options for logos, artwork, and other content for products that tend to be difficult to label, but could also serve as an addition or an alternative to elastic bands that are traditionally used to keep lobster claws closed. These bands can be removed from one product and applied to a different producer's product. Shrink-wrap labels cannot be reused in this manner, and could thus provide a measure of protection in terms of "pirated" labelling.

The examples shown in FIGS. 1 to 27 and the description thereof are intended solely for illustrative purposes. Variations are contemplated in other embodiments.

Figure 28:
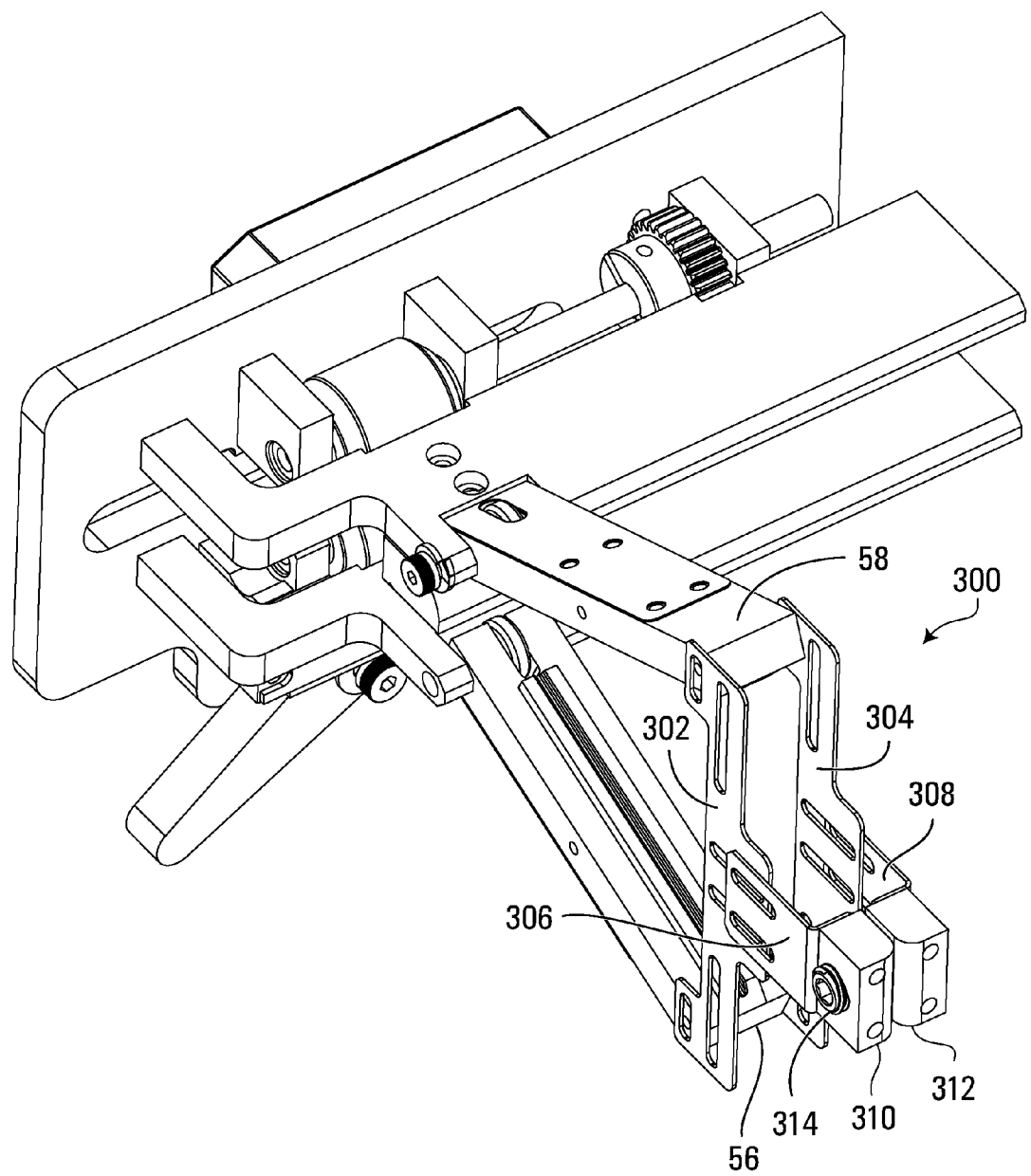
FIGS. 28 and 29 are isometric views of another example opening assembly.
Figure 29:
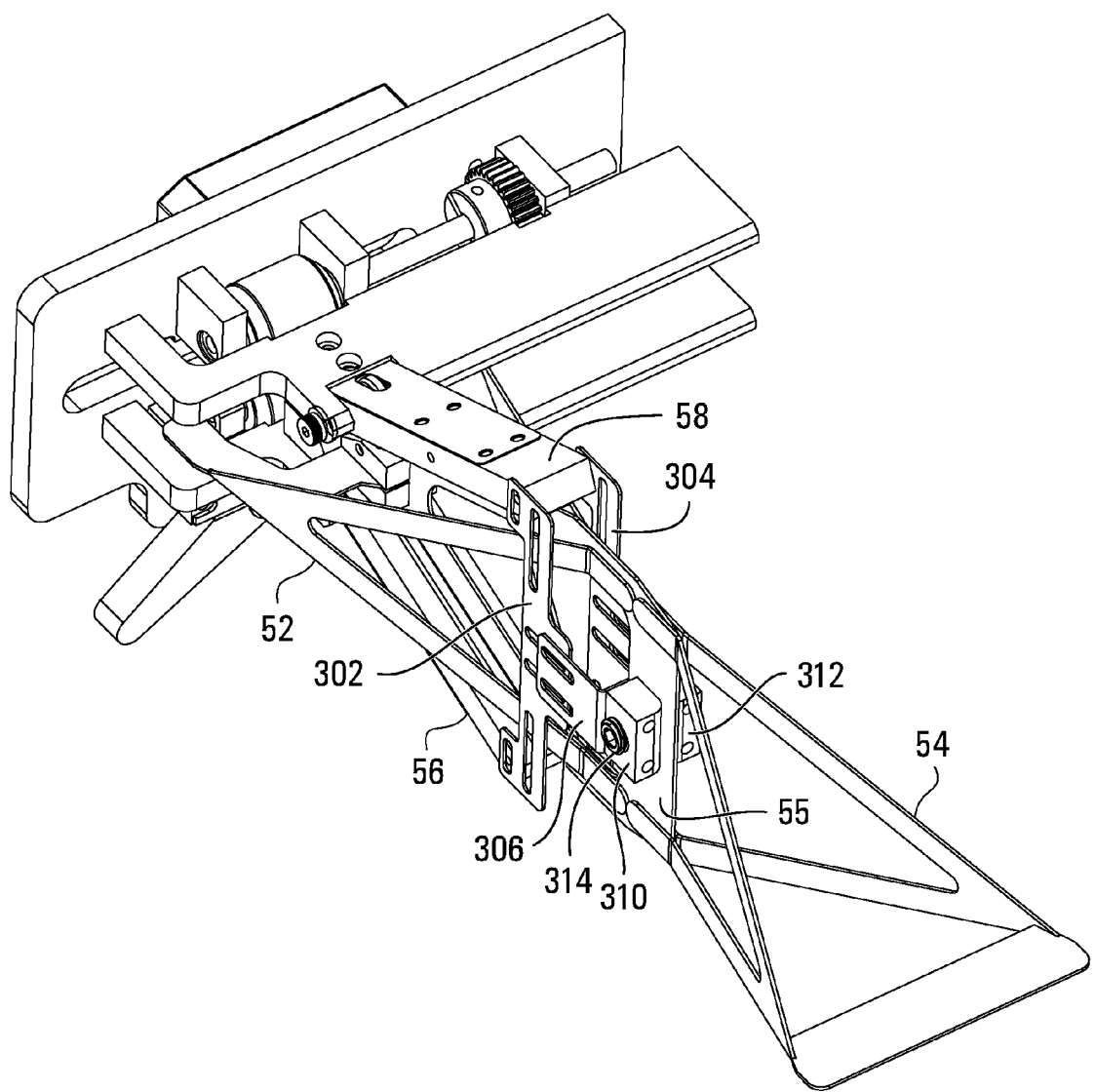

FIGS. 28 and 29, for example, are views of another example opening assembly 300. The assembly 300 includes, in addition to the two sections 52, 54 which are joined by a bracket 55 (FIG. 29), another assembly that attaches to the clamps 56, 58. The sections 52, 54 and the bracket 55 are not shown in FIG. 28 in order to better illustrate the additional assembly.

The additional assembly includes plates 302, 304 to attach to the clamps 56, 58, using screws (not shown) that pass through vertical slots in the plates and are received in threaded bores in the clamps for example. The vertical slots in the plates 302, 304 allow for adjustment of position of the plates, and the remainder of the assembly. Multiple vertical slots are provided to enable the same assembly to be used in conjunction with multiple sizes of opening assembly. As shown in FIG. 28, the clamps 56, 58 include multiple sets of bores, and different bore/slot combinations can be used depending on the size of the opening assembly. Opening assemblies for 61.5 mm, 81.5 mm, and 111.5 mm sleeve sizes (as measured across the width of flattened sleeve stock) are contemplated, and other sizes are also possible. In some embodiments, not only the width and height, but also the length, of an opening assembly is different for different sleeve sizes.

Brackets 306, 308 attach to the plates 302, 304, using bolts or other fasteners (not shown) that pass through horizontal slots in the plates and brackets. The horizontal slots, like the vertical slots in the plates 302, 304, provide for position adjustment for different sizes of opening assembly.

Blocks 310, 312 attach to the brackets 306, 308, and contain magnets, illustratively rare earth magnets, which are held in place in threaded bores by screws (one of which is visible at 314) in the example shown.

The additional assembly shown in FIGS. 28 and 29 assists in removing or at least reducing the crease in the stock material as it is opened. In operation, the stock material, which has been opened in one direction by the opening assembly section 54, is pulled between the blocks 310, 312. At this point, the stock material encloses the section 54 and the bracket 55, and the blocks 310, 312 are outside the stock material. The magnets in the blocks 310, 312 pull the blocks toward the bracket 55, to smooth the crease in the stock material on each side of the bracket 55. The strength of the magnets can be chosen so as to achieve a desired degree of smoothing without binding the stock material. The various slots in the plates 302, 304 and the brackets 306, 308, in one embodiment, provide for positioning of the blocks 310, 312 at either side of the bracket 55 for different sizes of opening assembly.

After the stock material passes the blocks 310, 312, it is pulled over the section 52, between the brackets 306, 308 and the plates 302, 304.

The additional assembly shown in FIGS. 28 and 29 represents one possible variation of a component in the example apparatus described in detail above. FIGS. 30 to 34 are views of further example stock opening and feeding assemblies, and similarly show variations from the embodiments described above.

Figure 30:
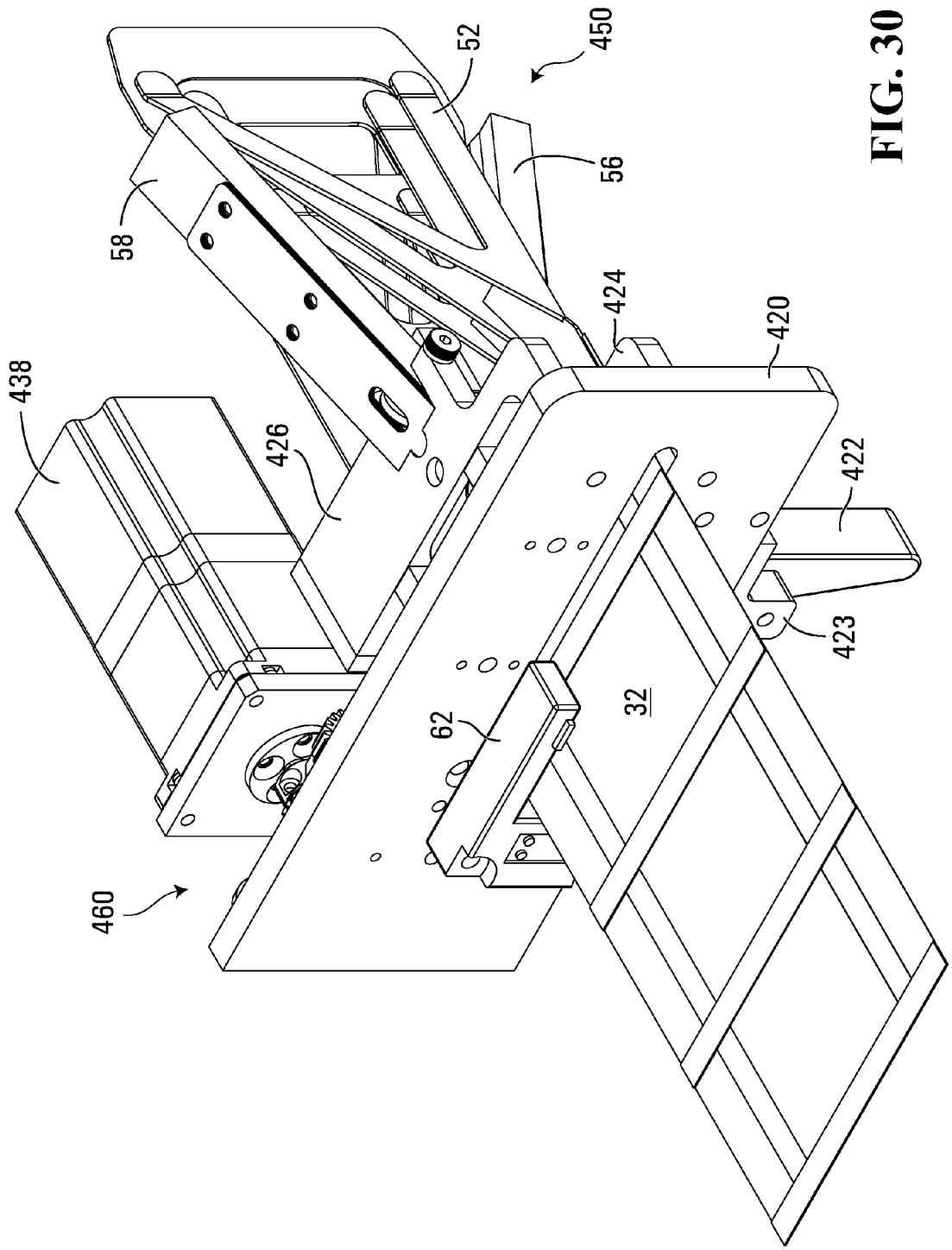
FIGS. 30 to 34 are views of further example stock opening and feeding assemblies.
Figure 32:
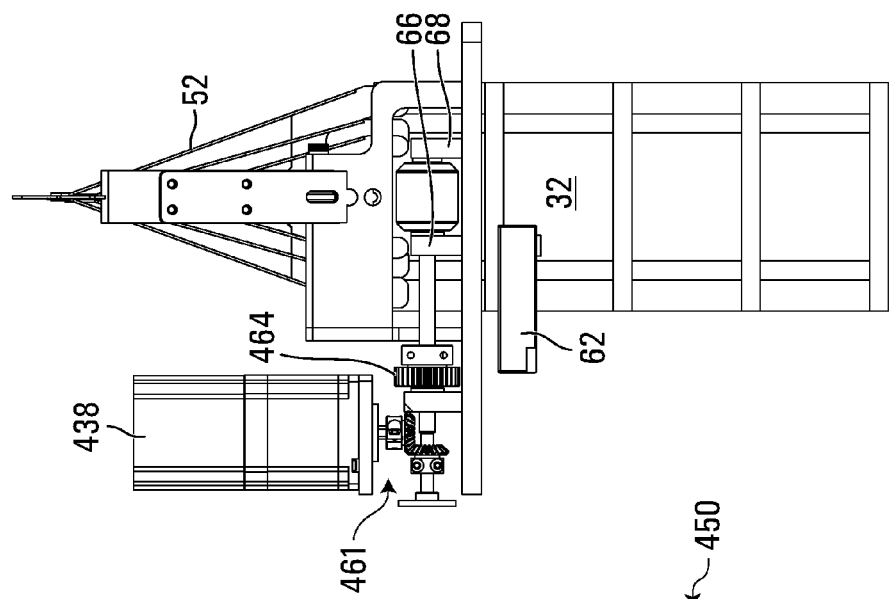
Figure 31:
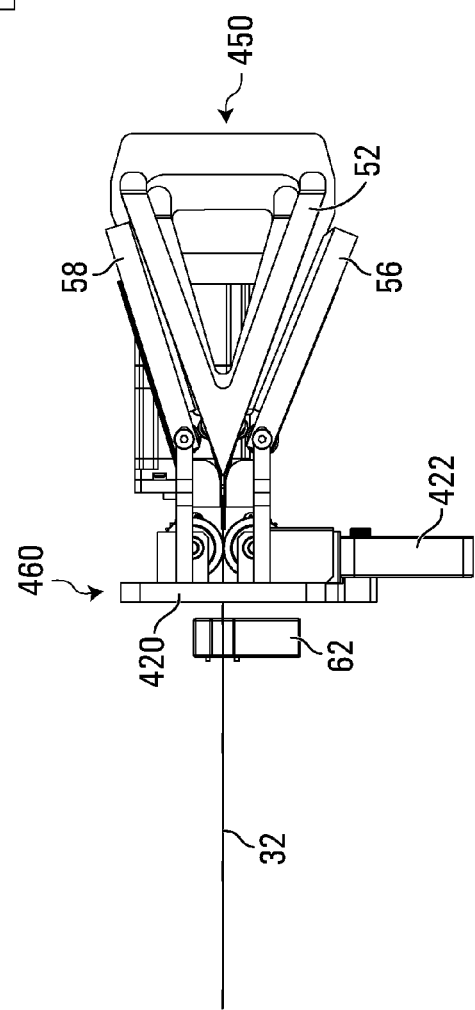
Figure 33:
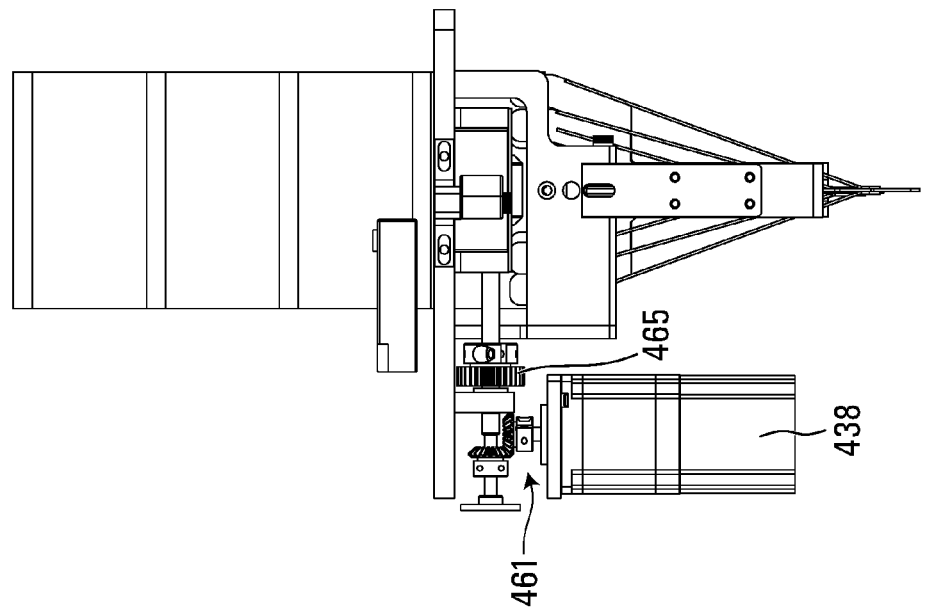
Figure 34:
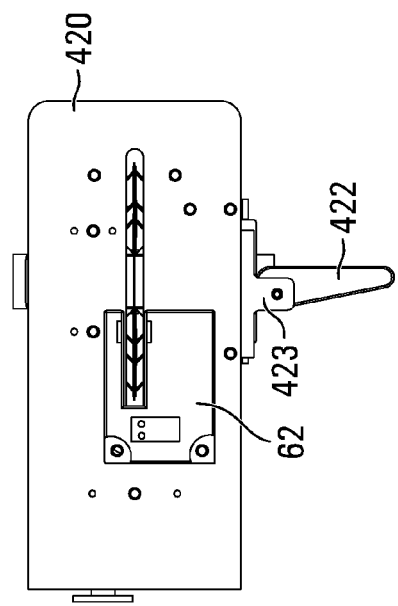
Figure 39:
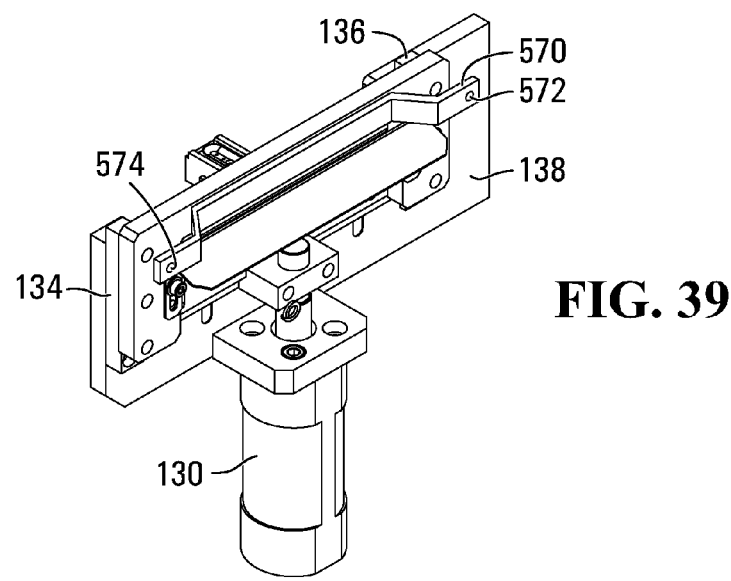
FIGS. 39 to 44 illustrate example backing plates for a cutting assembly.
Figure 40:
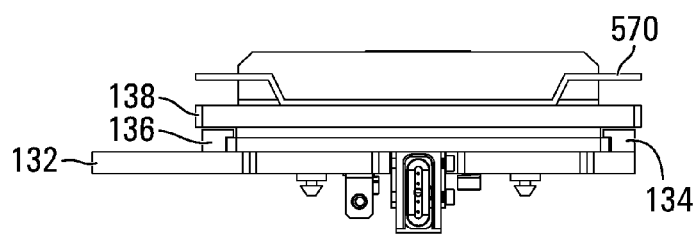
Figure 41:
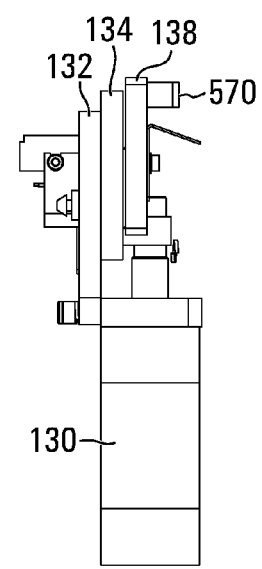

Isometric, side, top, bottom, and front views of example stock opening and feeding assemblies 450, 460 are shown in FIGS. 30 to 34, respectively. The example opening assembly 450 includes only one section 52, instead of the two sections 52, 54 in the example opening assembly 50 described above. As can be seen perhaps most clearly in FIGS. 30, 32, and 33, multiple opening assemblies 450 are shown. Although only one of these opening assemblies 450 would generally be installed at any time depending on the size of stock material 32 that is being opened and fed, FIGS. 30, 32, and 33 show how the different opening assemblies would be positioned when installed in the clamps 56, 58.

The clamps 56, 58 are mounted to plates 424, 426, which in this embodiment are in turn mounted to a plate 420. The clamps 56, 58 releasably hold the front section 52 of the opening assembly 450 in some embodiments, so that the opening assembly can be removed. During initial feeding of the stock material, the opening assembly 450 could be released from the clamps 56, 58, and the sleeve of stock material can then be opened and fed over the section 52. The releasable clamps 56, 58 also allow for the opening assembly 450 to be changed for different stock material sizes.

The plates 420, 424, 426 in the example feeding assembly 460 may be substantially similar to those in the example feeding assembly 60 described above. However, in the example feeding assembly 460, a motor 468 is located next to the plates 424, 426, and therefore those plates are not attached directly to a support wall in this embodiment. Although the plate 420 would be attached to a support wall as in previous embodiments, a release lever arrangement in the example feeding assembly 460 is different as noted below.

In the example feeding apparatus 460, a different drive mechanism is also used for driving the pinch rollers. The shaft of the motor 438 in this embodiment is not aligned with either the top or bottom pinch roller shaft. One of the pinch roller shafts is driven by a set of gears 461. The other pinch roller shaft is driven as in previous embodiments, by the driven shaft through another set of gears 464, 465.

A cam-operated release lever 422, like the release lever 122 described above, enables one of the pinch rollers (illustratively the lower pinch roller) to be released. In previous embodiments, the release lever 122 is mounted directly to the plate 120. As perhaps best shown in FIG. 34, the release lever 422 is mounted to a block 423 which is mounted to the plate 420. The block 423 is adjustable on the plate 420, through a bolt and slot arrangement, for example, to adjust the pressure applied by the pinch rollers and/or the clearance between the pinch rollers when one pinch roller has been released.

FIGS. 35 to 38 are views of another example cutting assembly 530, which includes plates 132, 138, 162, a cutting blade 133, guide blocks 134, 136, and a guiding plate 168. A cut sleeve holder 540 is mounted to the plate 162, and is movable in a slot in the plate 132. The plate 162 also carries the cutting blade 133. A sensor 561 is mounted on the plate 132. The plate 132 may be mounted to a support wall, and is also mounted to a cylinder unit 130.

The example cutting assembly 530 is similar in structure and operation to the example cutting assembly 30 described above, but includes a different cut sleeve holder 540 and an additional sensor 561. In order to avoid overly complicating the drawings, various elements such as bolts and other fasteners which are common to the example cutting assemblies 30 and 530 have not been explicitly shown in FIGS. 35 to 38. The example cutting assembly 530 is also shown in a partially exploded form. The manner in which construction of the example cutting assembly 530 could be completed is believed to be readily apparent from, for example, the previous illustrations and description of the example cutting assembly 30.

The cut sleeve holder 540 includes an oblong suction cup 546, which is carried by a block 542. The block 542 is attached to the plate 162, using bolts as described above, for example, received in threaded bores in the plate 162. As can be seen from a comparison of FIGS. 14 and 35, for example, the block 542 is similar to the block 142, but carries an additional block 547, which is referenced herein as a bending block. The bending block 547 is mounted to the block 542 and is vertically adjustable relative to the block 542, using bolts 549 which engage slots in the block 542 and threaded bores (not shown) in the bending block 547 in the example shown.

In some applications, it might be useful to present a cut sleeve with an opening that has a certain general shape. For example, a cut sleeve that is presented with an opening having a width that is greater than its height might more easily receive a lobster claw than a cut sleeve that is presented with a rounded opening, given the typical shape of a lobster claw. A roughly oval or diamond-shaped opening of a sleeve that is cut from flat stock material might also be less likely to interfere with elastic claw bands, which are placed around lobster claws to keep them closed, during insertion into the sleeve.

Depending on the opening assembly, flat stock material might have been opened to different degrees prior to being cut into sleeves. An opening assembly of the type shown in FIGS. 28 and 29 not only opens flat stock material in two directions but also reduces or removes creases in the flat stock material. The example opening assembly 450 opens flat stock material in only one direction. In either case, the shape of the opening in a cut sleeve can be affected by the cut sleeve holder.

The cut sleeve holder 540 is of similar design to the cut sleeve holder 140, apart from the bending block 547 and the shape of the suction cup 546. The bending block 547 can be adjusted in the block 542 so that its top walls bear on edges of the suction cup 546 and push them upward by an adjustable amount. Only the side edges of the suction cup 546 are engaged by the bending block 547 in some embodiments, although the bending block and suction cup could be sized so that portions of end edges are also or instead deflected. The deflected edges of the suction cup 546 are then higher than they would be without the bending block in place, which in turn changes how a cut sleeve is held. Specifically, there is a greater difference in height between a center of the suction cup 546 and its edges. This different profile effectively opens the cut sleeve into a roughly oval or diamond-shape, and the relative lengths of the axes of the oval or diamond can be adjusted by adjusting the height of the bending block 547.

This type of opening action could potentially be provided in other ways, such as by applying inward pressure at side creases of partially opened flat stock material, for example.

The example cutting assembly 530 also includes a sensor 561 for sensing whether stock material is present. The sensor 561 could be an optical or other type of proximity sensor, for example, and is used in some embodiments to prevent the cylinder 161 in the cylinder unit 130 from being fired when no stock material is in place to be cut.

Structure and operation of the example cutting assemblies 530 and 30 may otherwise be substantially the same.

FIGS. 39 to 44 illustrate example backing plates for a cutting assembly. These backing plates 570, 580 allow a force to be applied to the rear plate 138 of a cutting assembly to reduce deflection of that plate away from the cutting blade during operation.

The backing plate 570 (FIGS. 39 to 41) could be formed from spring steel, for example, and in the example shown includes bores 572, 574 so that the backing plate can be carried by the same bolts 156 (FIGS. 14 to 17) that fasten the plate 138 to the guide blocks 134, 136. The pressure applied by the backing plate 570 to the rear plate 132 could be controlled through selection of material for the backing plate, selection of the shape of the backing plate, adjustment of the bolts that carry the backing plate, adjustment of spacing between the backing plate ends and the bolt heads using washers on the bolts or separate spacers that would not affect the forces applied by the springs 157 (FIG. 16), or some combination thereof.

Figure 42:
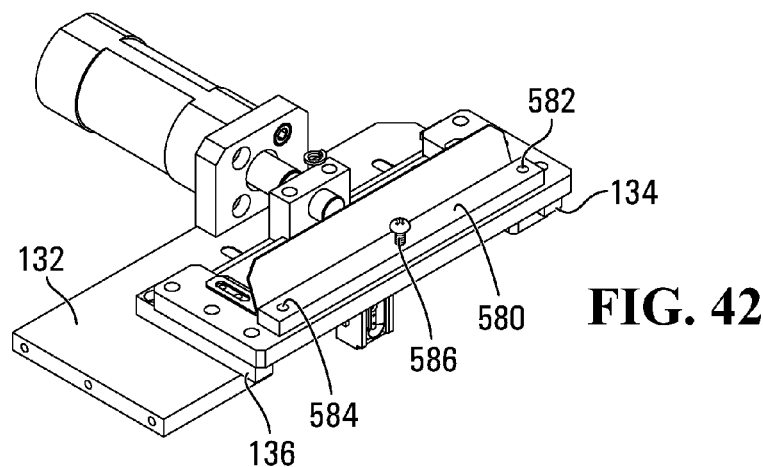
Figure 43:
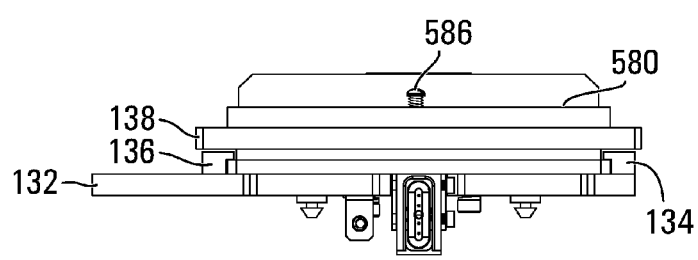
Figure 44:
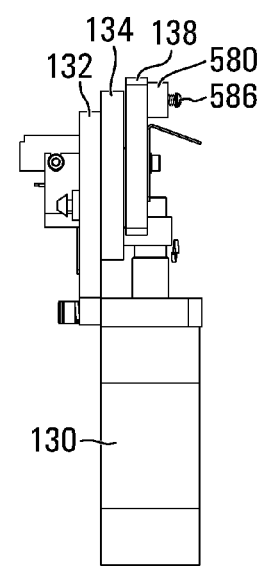

With reference to FIGS. 42 to 44, the backing plate 580 could be in the form of a narrow plate or bar, of the same material as the plate 138 or a different material. The backing plate 580 is fastened to the plate 138 using fasteners such as screws or bolts that pass through the bores 582, 584 in the example shown, into additional holes or bores in the plate 138. In another embodiment, the backing plate 580 could be longer than shown, with bores 582, 584 placed to receive the bolts 156 (FIGS. 14 to 17) that fasten the plate 138 to the guide block 134, 136. A screw or bolt 586 is provided in a further threaded bore of the backing plate 580, and can be adjusted to control the pressure that is applied to the plate 138. The bolt 586 contacts the plate 138 when it is adjusted to protrude from a front side (not shown) of the backing plate 580, and the amount by which the bolt protrudes sets the pressure applied to the plate 138.

Although the example backing plates 570, 580 are illustrated in a cutting assembly of the type shown in FIGS. 35 to 38, these backing plates could also or instead be implemented in other embodiments of a cutting assembly. It should also be noted that the backing plates 570, 580 do not impede a stock material feed path. This is perhaps most clearly visible in FIGS. 41 and 44.

Figure 45:
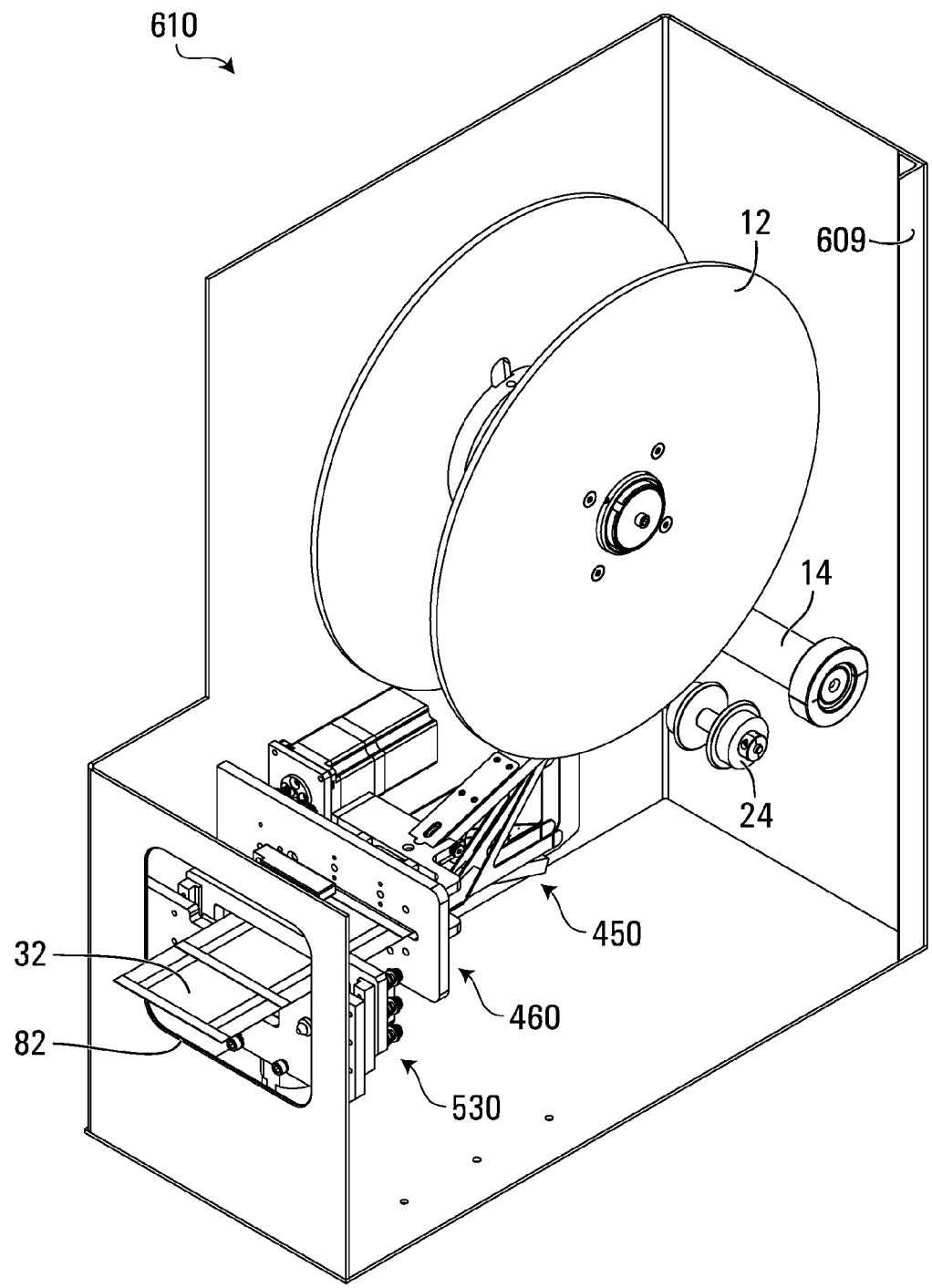
FIGS. 45 to 47 are views of another example shrink-wrap label stock dispensing apparatus.
Figure 46:
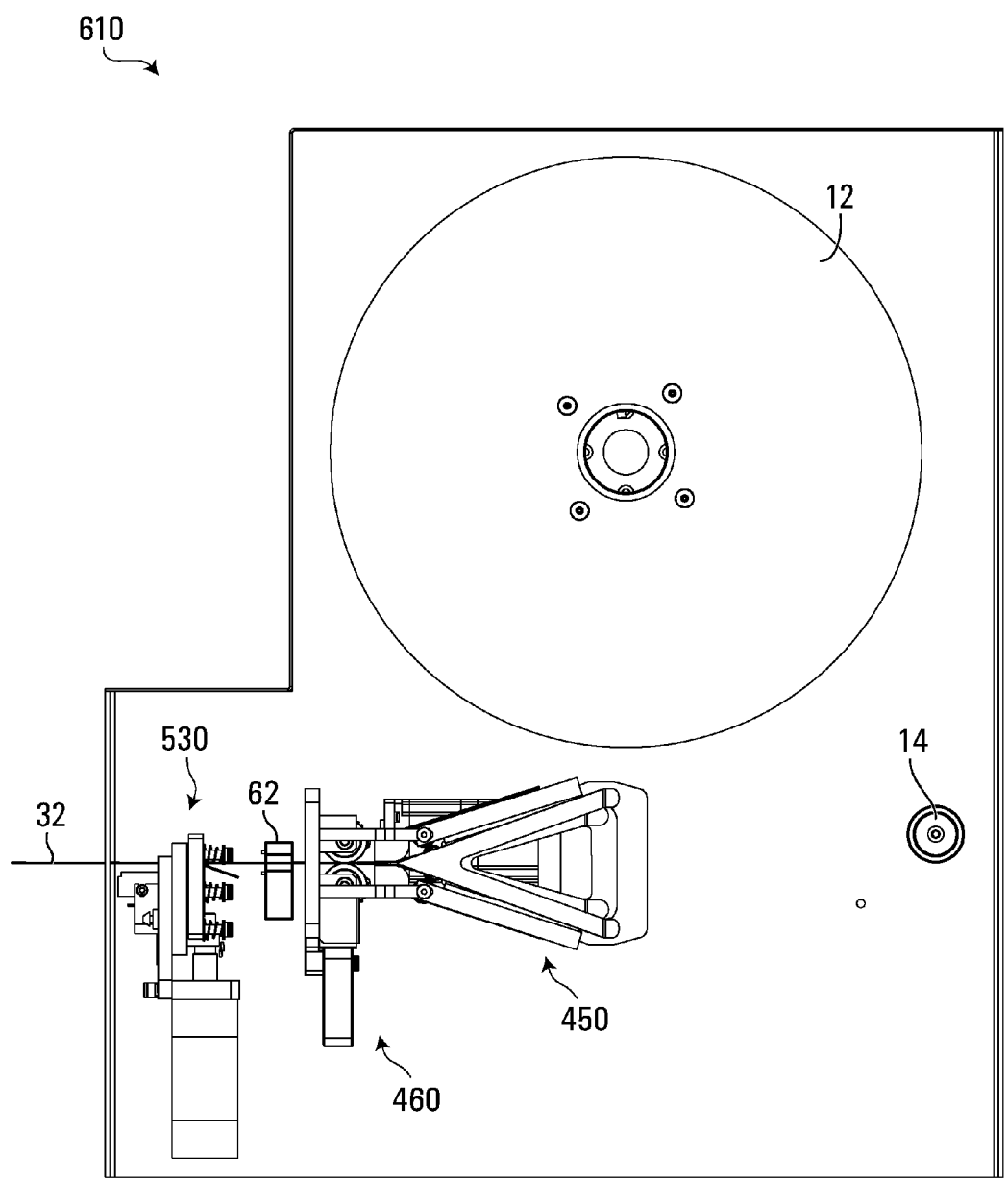
Figure 47:
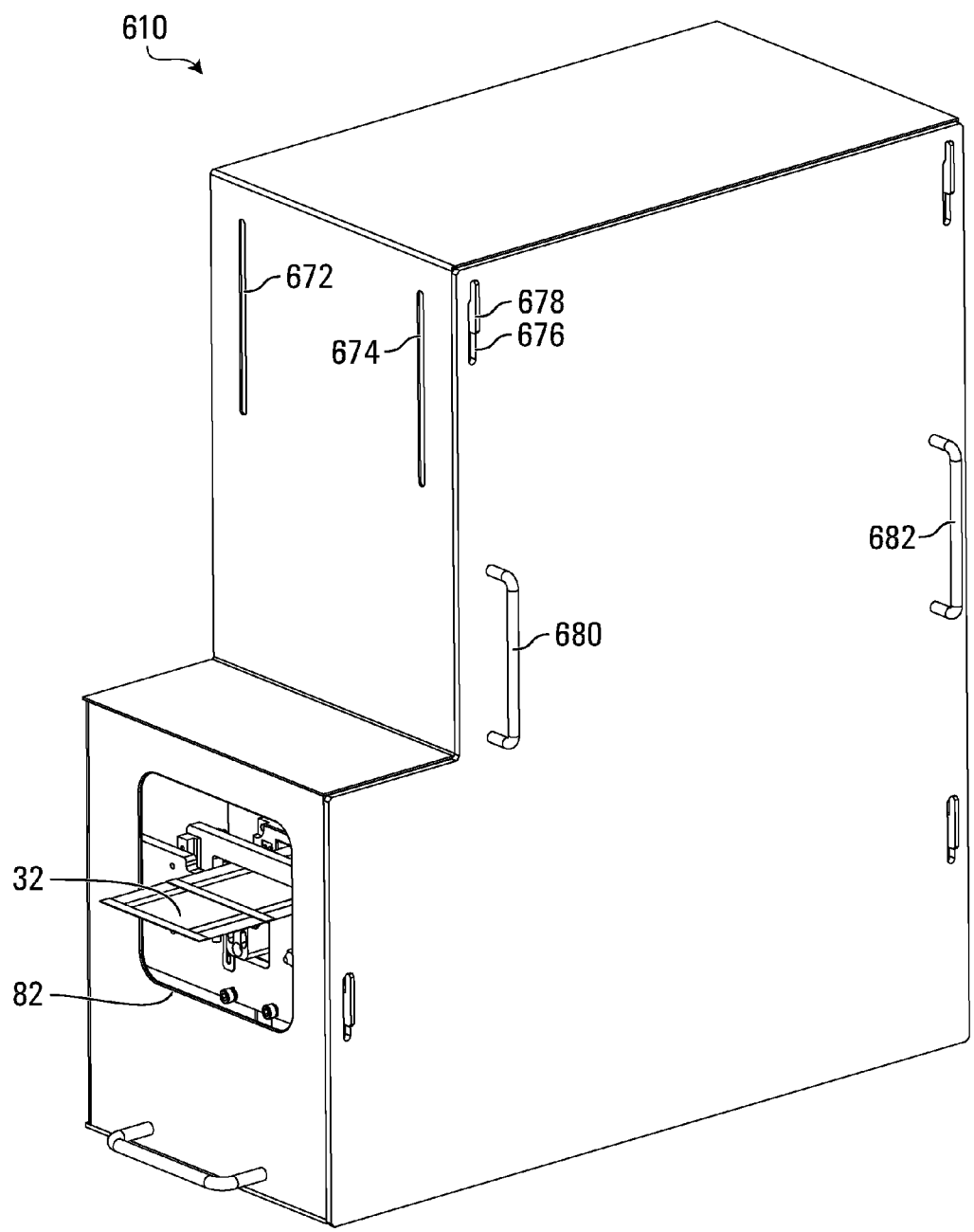

FIGS. 45 to 47 are views of another example shrink-wrap label stock dispensing apparatus 610, which includes the example opening assembly 450, feeding assembly 460, and cutting assembly 530, as well as other variations as noted below. FIGS. 45 and 46 are an isometric view and a right side plan view with a right side housing section removed, and FIG. 47 is an isometric view with the right side housing panel section installed. In the example dispensing apparatus 610, shrink-wrap label stock material is fed from the counter-clockwise rotating spool 12, around the idler roller 14, over a roller 24, through the opening and feeding assemblies 450, 460, the sensor 62, and the cutting assembly 530. In some embodiments, the roller 24 can be omitted, as shown in FIG. 46. Cut lengths of stock material 32 are presented at the opening 82.

Although operation of the example dispensing apparatus 610 may be substantially to that of the example dispensing apparatus 10 described above, the example dispensing apparatus 610 embodies several variations in structure. For example, the front surface of the dispensing apparatus 610 is not flat. This profile, as well as the slots 672, 674 (FIG. 47), facilitate mounting of a heating apparatus in one embodiment as described below.

The right side housing section in the example dispensing apparatus 610 also attaches to the remainder of the housing in a different manner than described above. As shown in FIG. 47, hooks or brackets 678 protrude through slots 676 in the right side housing section. The brackets 678 may be attached to or integrated with other housing sections, and/or support members such as 609 (FIG. 45). Using handles 680, 682, and operator can install and remove the right side housing section to close or access the internal components of the example dispensing apparatus 610.

Figure 48:
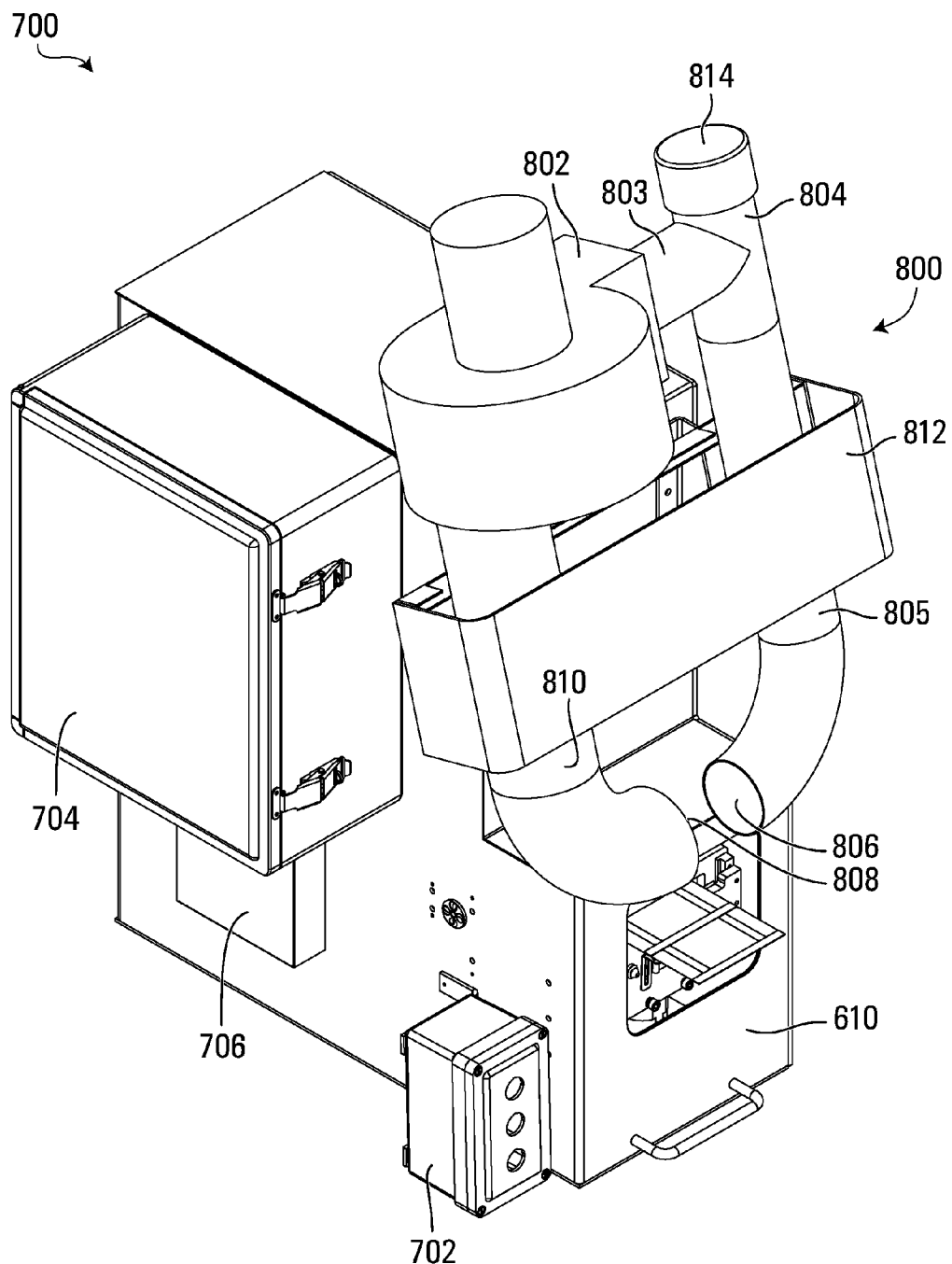
FIGS. 48 to 60 are views of another example shrink-wrap labelling system comprising the example dispensing apparatus shown in FIGS. 45 to 47 and a further example heating apparatus.
Figure 49:
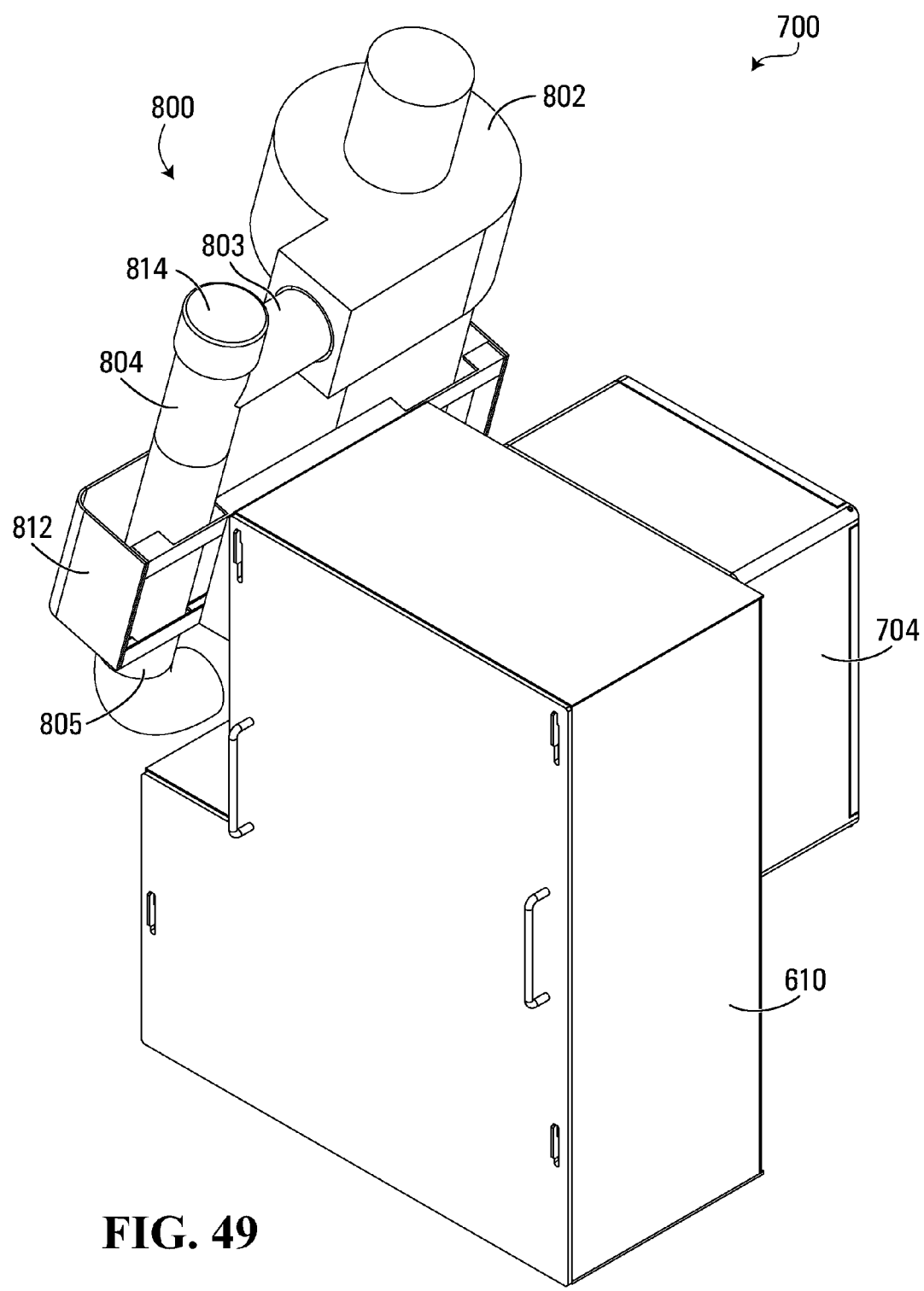
Figure 50:
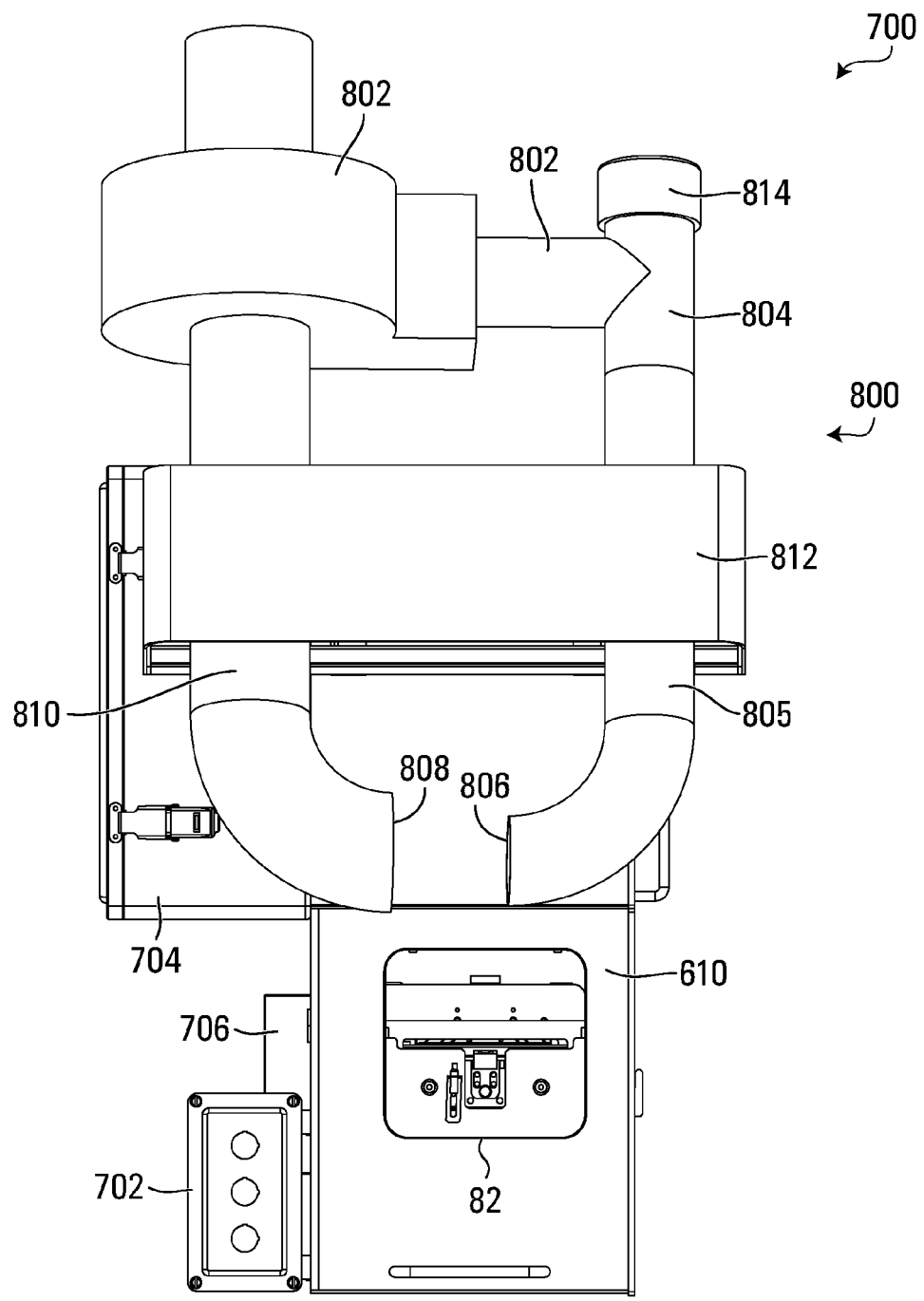
Figure 51:
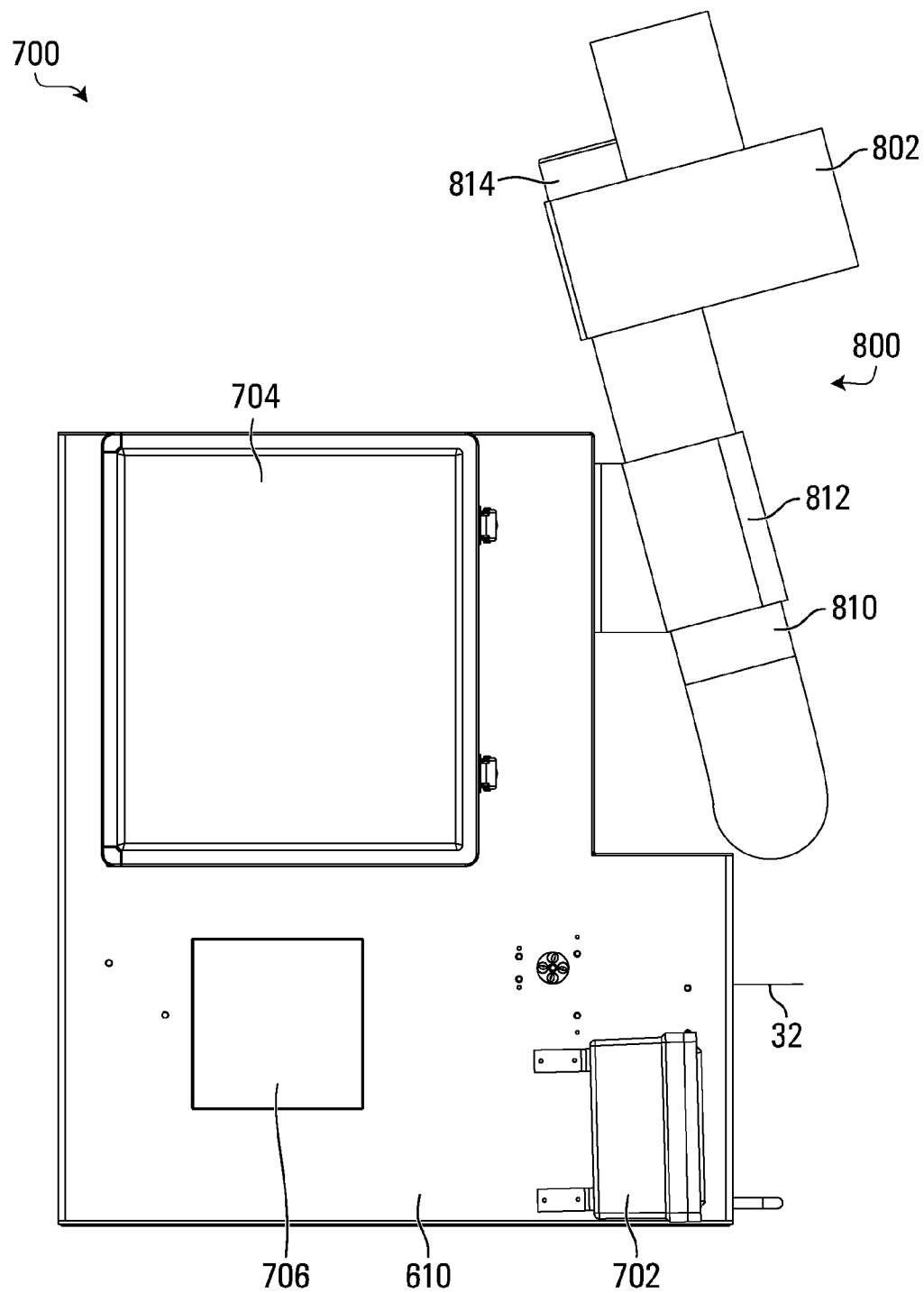
Figure 52:
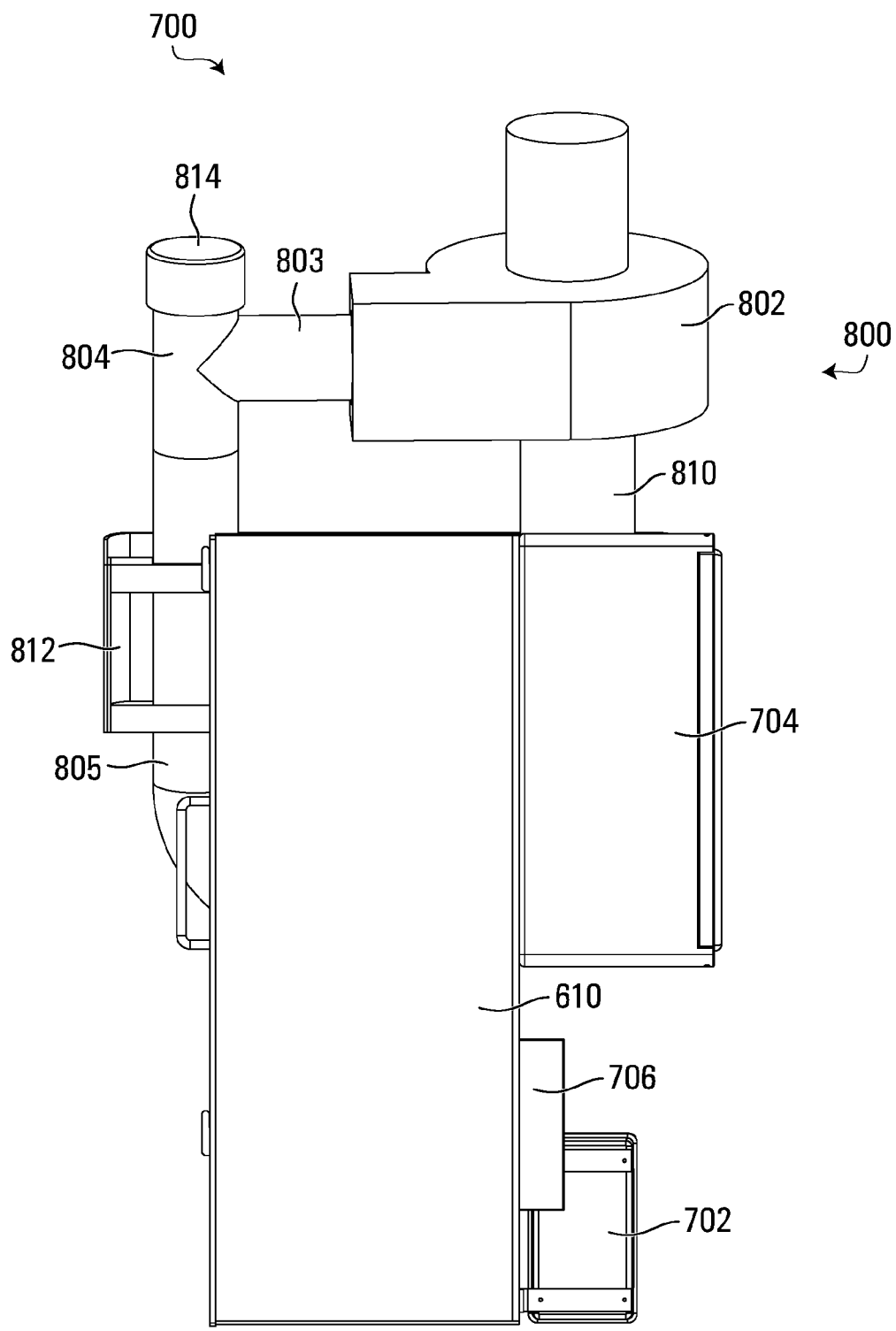
Figure 53:
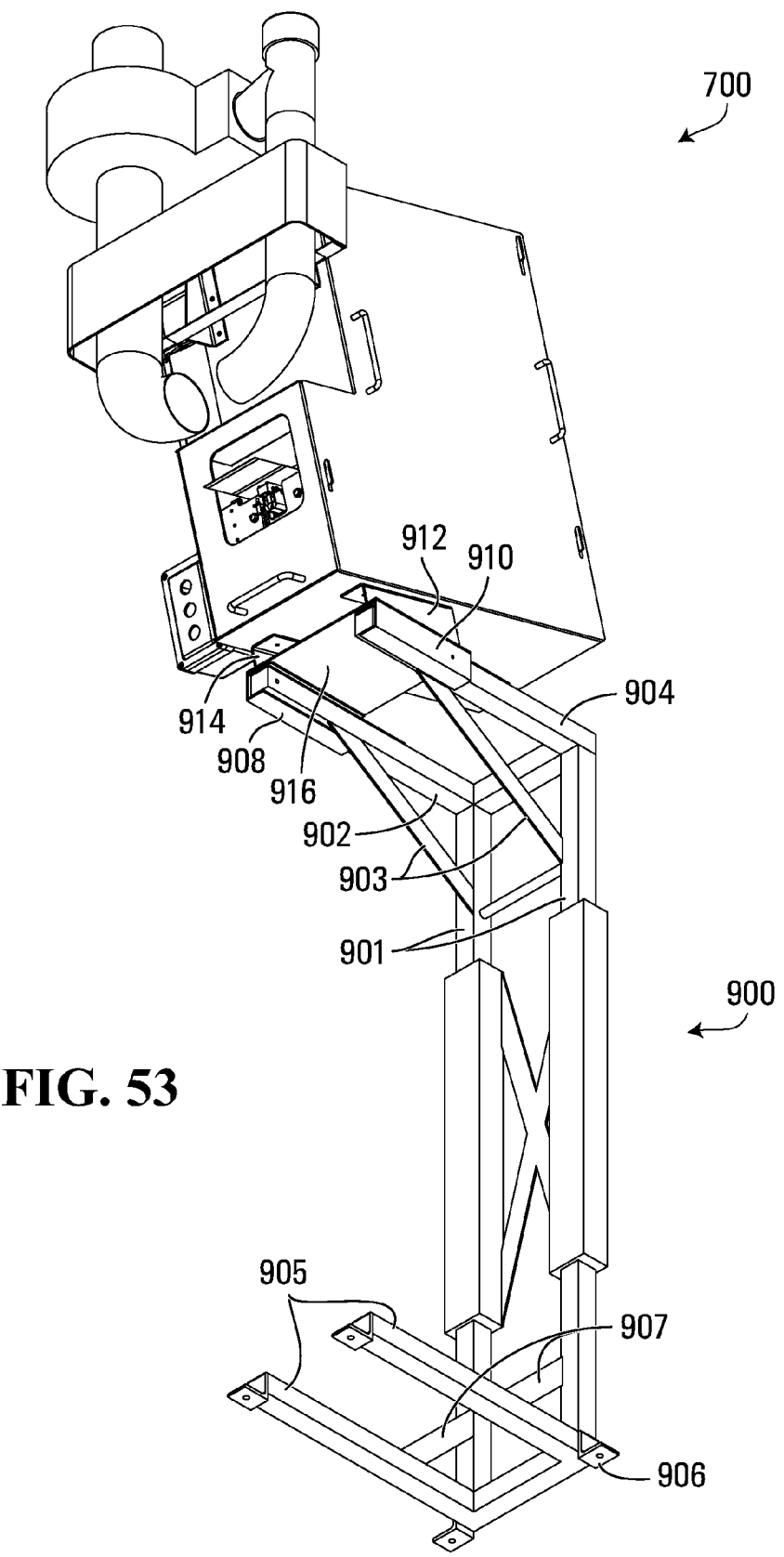
Figure 54:
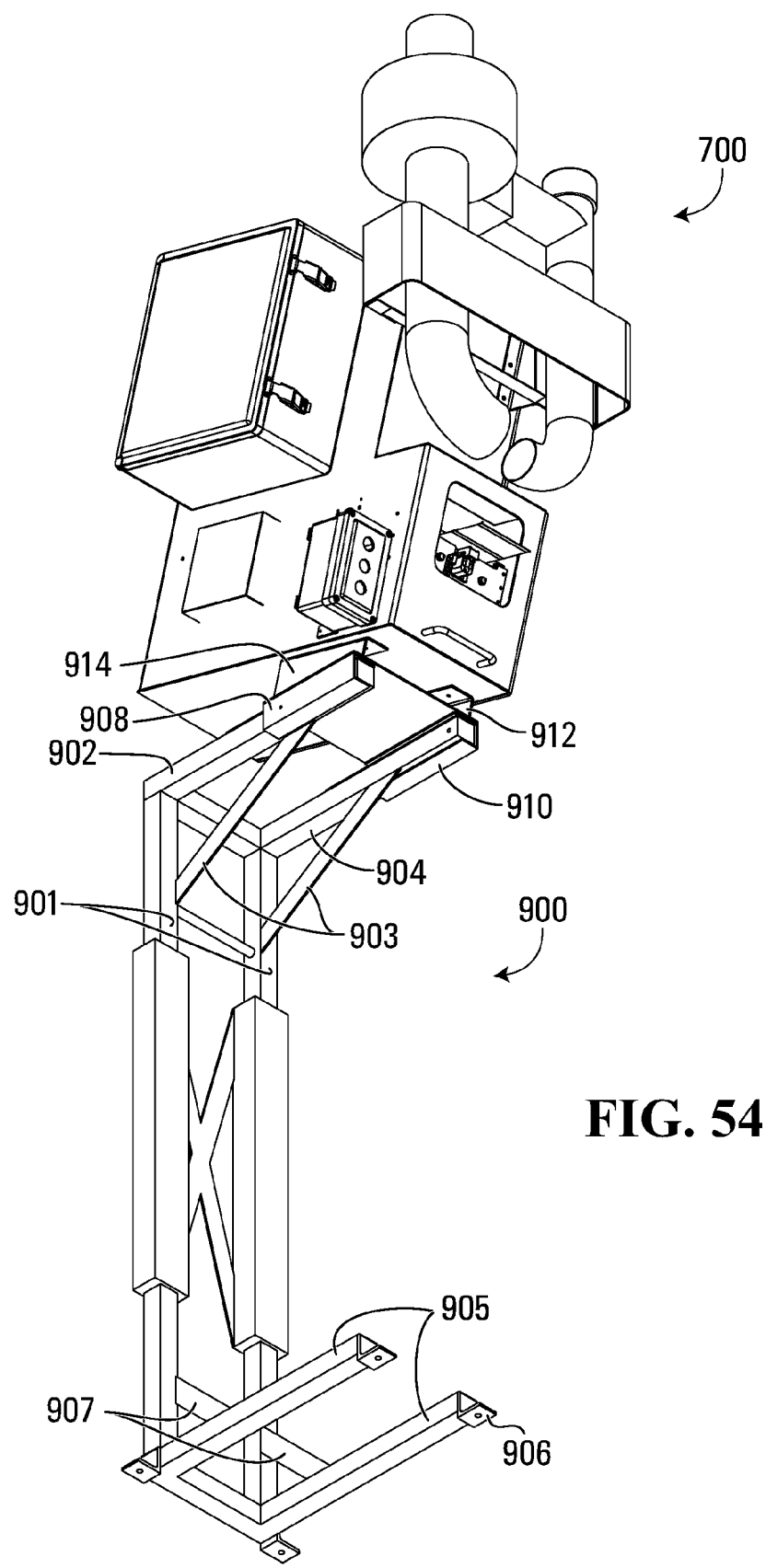
Figure 55:
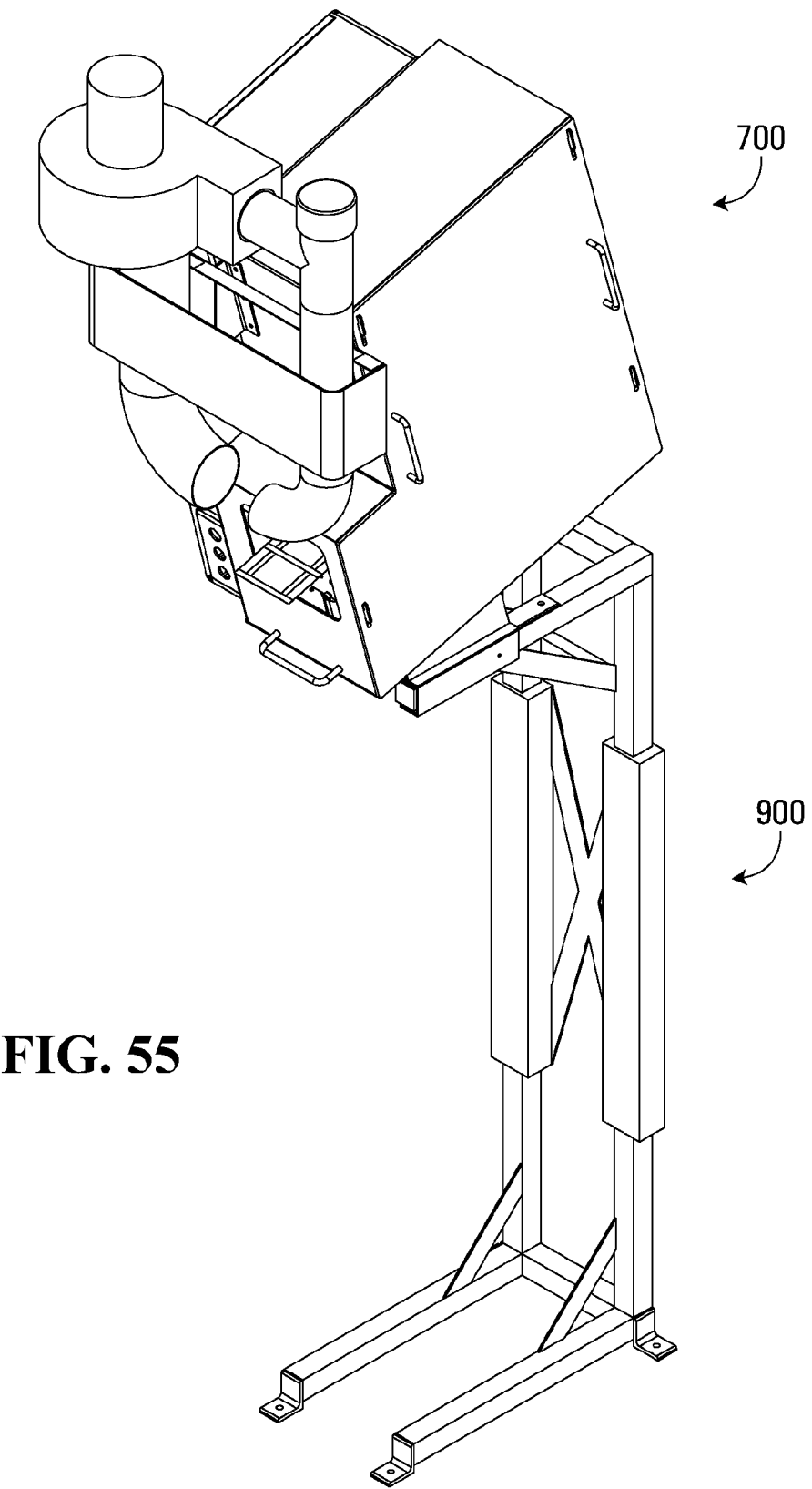
Figure 56:
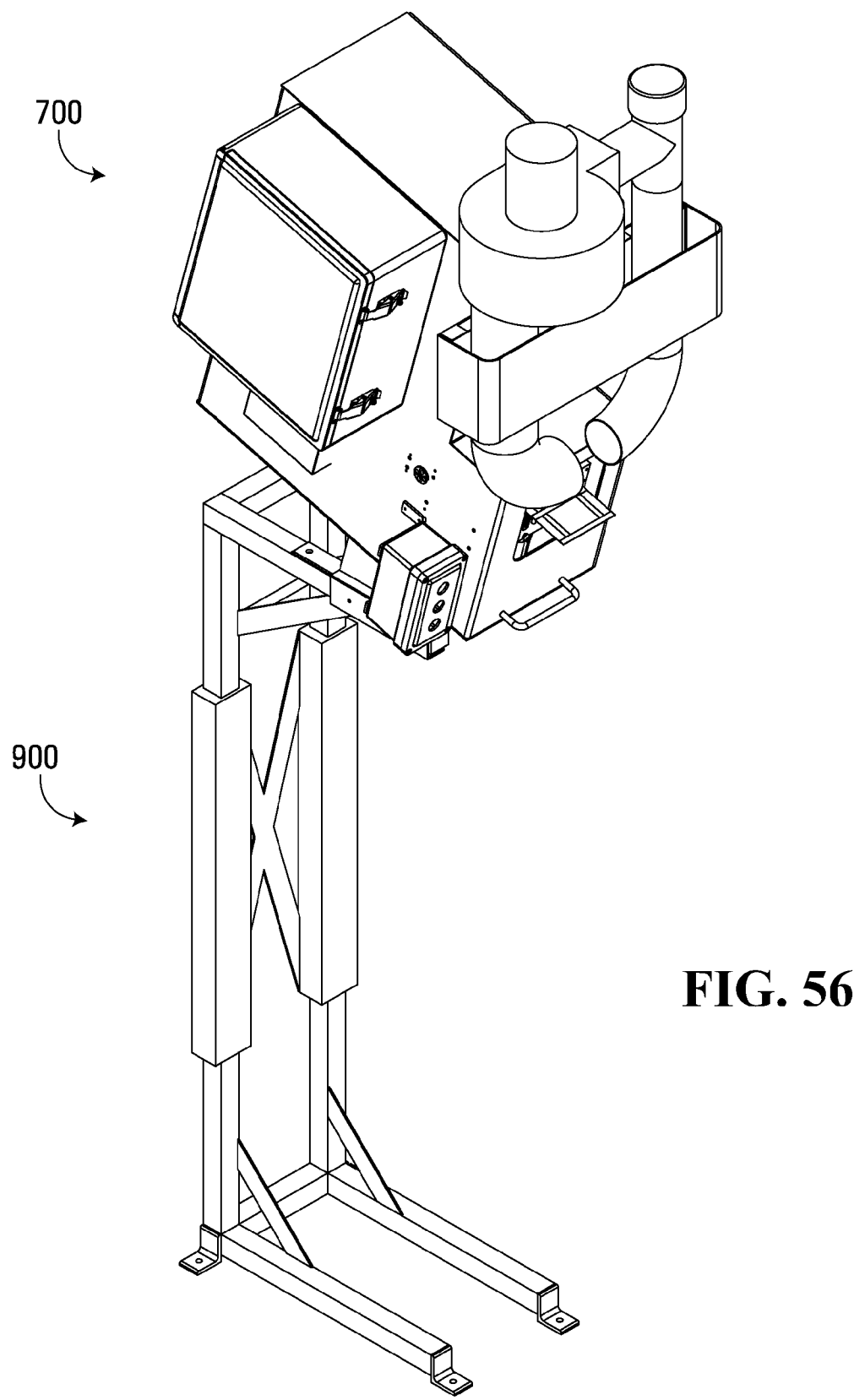
Figure 57:
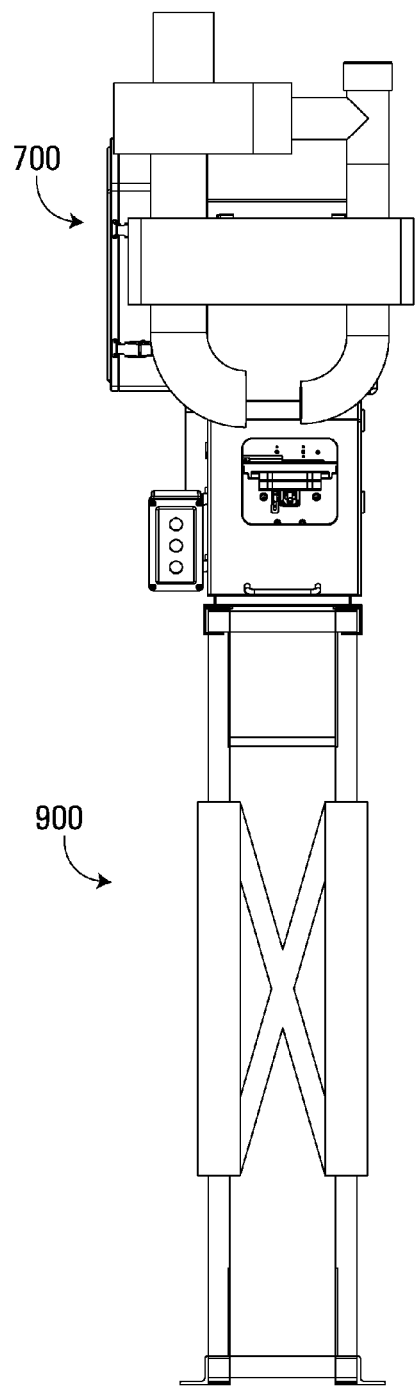
Figure 58:
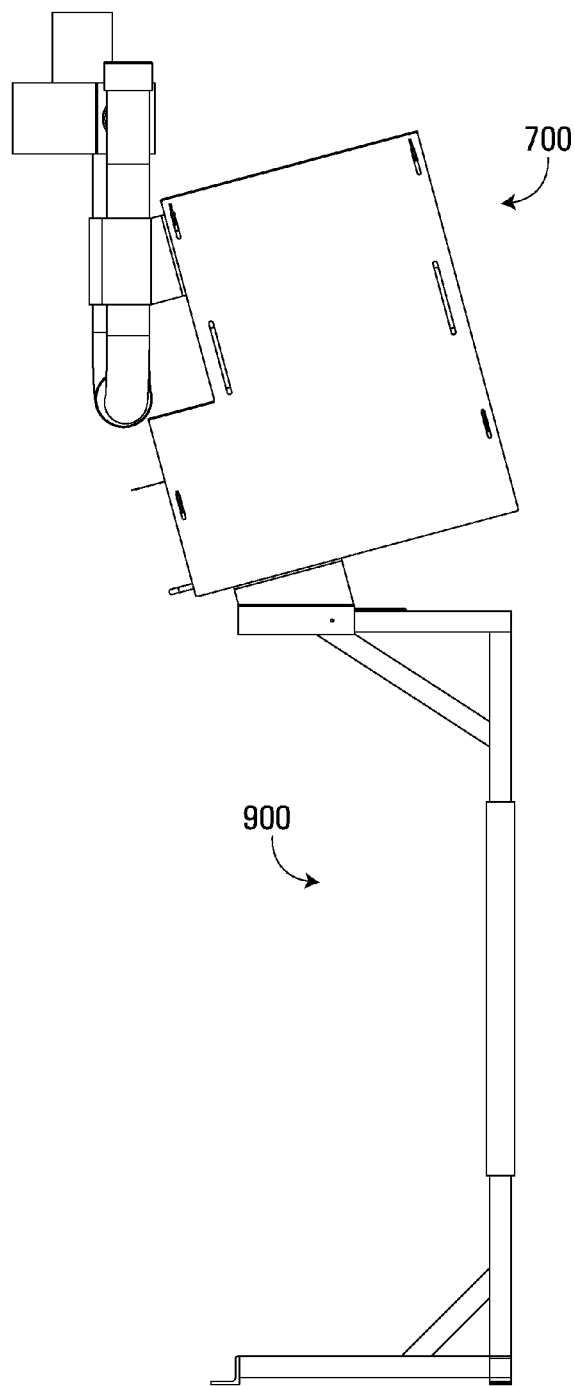
Figure 59:
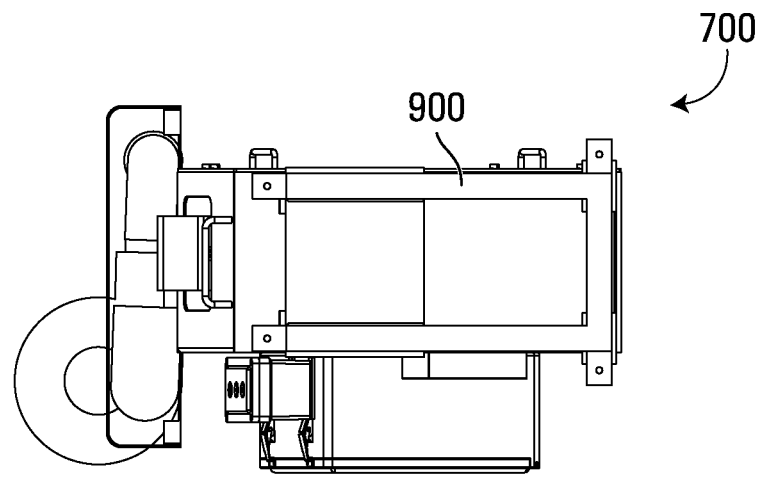
Figure 60:
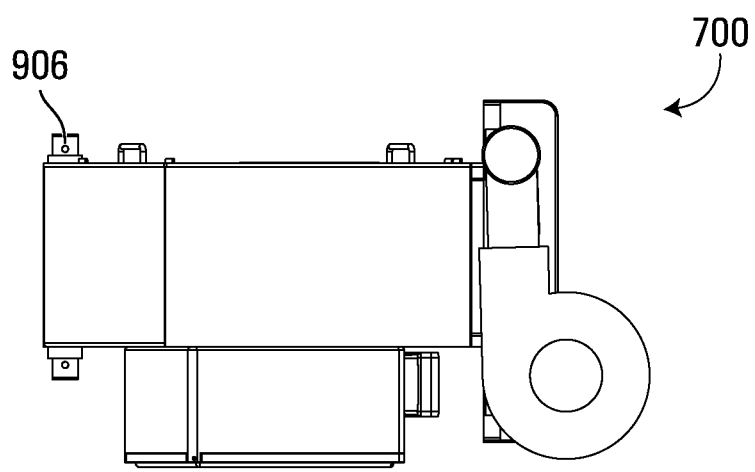

FIGS. 48 to 60 are views of another example shrink-wrap labelling system 700 comprising the example dispensing apparatus 610 shown in FIGS. 45 to 47 and a further example heating apparatus 800. FIGS. 48 and 49 are front and rear isometric views; FIGS. 50 to 52 are front, left side, and rear plan views; FIGS. 53 to 56 are lower right front, lower left front, upper right front, and upper left front isometric views of the example shrink-wrap labelling system 700 mounted on a frame 900; and FIGS. 57 to 60 are front, right, bottom, and top plan views of the mounted example labelling system.

Several additional features of the example dispensing apparatus 610 are visible in FIG. 48. Manual controls 702 can be mounted outside the main housing of the dispensing apparatus 610, in their own separate protective housing instead of in a compartment inside the main housing as in previous embodiments. Another separate housing 704 may also be mounted to the main housing for enclosing electrical and pneumatic components such as a power supply, controllers, air valves, etc. Other components could be separately enclosed inside the housing or shield 706 in some embodiments.

The example heating apparatus 800 includes a blower 802 which blows air through a duct 803 toward a heater 804. The heater 804 could be installed in the duct 803 or, as shown, inline with a further duct 805. An end cap or cover 814 may be removable to provide access to the heater 804. Heated air flows from the heater 804 through the duct 805 and the passage 806, toward the passage 808, into the duct 810, and back to the blower 802. A bracket assembly 812 mounts the heater 800 to a front housing section of the dispensing apparatus 610. The bracket assembly 812, in one embodiment, includes hooks or brackets that pass through the slots 672, 674 (FIG. 47) and engage a portion of the front housing section. This type of arrangement allows for the heating apparatus 800 to be removed. The heating apparatus 800 could be secured to the dispensing apparatus in other ways, using fasteners for example, in addition to or instead of a bracket and slot arrangement. In some embodiments, the vertical position of the heating apparatus 800 on the dispensing apparatus 610 is adjustable. The bracket assembly 812 could potentially also or instead allow for the angle of the heating apparatus 800 relative to the front housing of the dispensing apparatus 610 to be adjusted. This could be implemented with some sort of hinged or multi-part bracket arrangement, for example.

Relative to the example heating apparatus 200 described above, the example heating apparatus 800 is much more compact. When a product has been placed into a cut sleeve, the product with the surrounding sleeve can be moved upward in the example labelling system 700, into a stream of heated air flowing between the passages 806, 808. In the case of a lobster claw, its shape results in a wing-like airflow profile, and heat is applied to both the top and bottom of the claw simultaneously.

Control of the temperature of the heated air, as described above, could be provided through one or more temperature sensors and a controller for the heater 804, for example. The blower 802 could also or instead be controlled to affect heat transfer to cut sleeve material and product.

Heat recovery can be particularly important in a cooled operating environment such as a seafood processing plant, for example, as noted above. As can be seen perhaps most clearly in FIG. 50, an inlet or recirculation passage at 808 is larger than an outlet passage at 806 in some embodiments. Since a product to which heat is being applied disrupts airflow between the passages 806, 808, the larger recirculation passage at 808 might be useful in recovering more heated air than would be recovered by a recirculation passage that is the same size as the outlet passage 806.

FIGS. 53 to 60 represent a possible alternative installation option for a labelling system. In the example shown in FIGS. 22 to 25, a dispensing apparatus 10 is suspended and a heating apparatus is placed on a processing plant floor. In the example labelling system 700, the heating apparatus is mounted to the dispensing apparatus, and the entire system can be mounted on a frame 900. The frame includes members 902, 904 for carrying the labelling system 700, cross-braced uprights 901 and angular support members 903 that support the members 902, 904, and base members 905 that are attached to the uprights, to further angular support members 907, and to integrated or separate brackets 906 that can be secured to a production plant floor in some embodiments.

The labelling system 700 is attached to brackets 912, 914, illustratively using screws, bolts, and/or other fasteners. The brackets 912, 914 are in turn attached to or integral with another bracket that includes sections 908, 910 that engage the frame members 908, 910 and an intermediate section 916 that spans between the sections 908, 910. In some embodiments, the position of the labelling system 700 on the frame members 902, 904 can be adjusted by sliding the brackets 908, 910 along those members. The labelling system could then be releasably locked into position using a set screw or other fastener. The angular position or tilt of the labelling system 700 could also or instead be adjustable. Vertical adjustment of the frame members 902, 904 is also contemplated, and could be implemented by providing adjustable-length uprights 901 and/or an arrangement that would allow the frame members 902, 904 to attach to different positions along the uprights.

Figure 61:
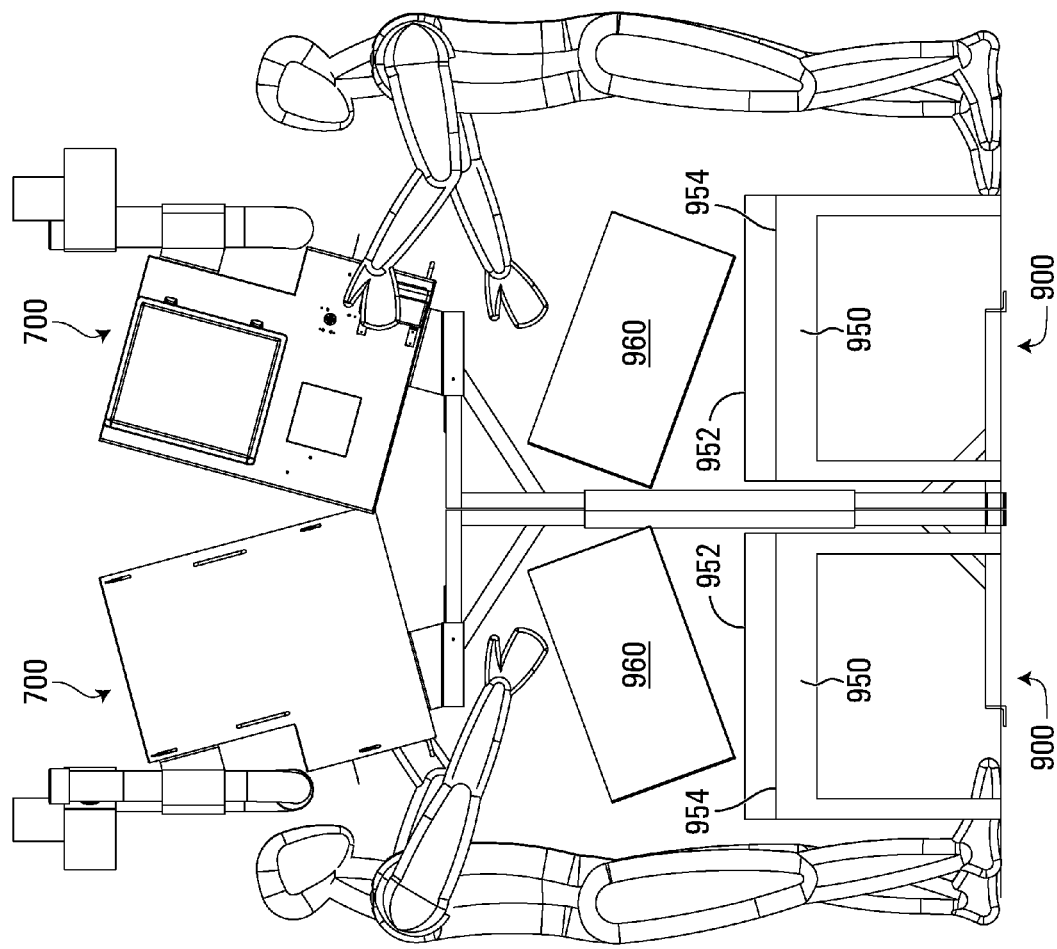
FIGS. 61 to 63 are views of an example equipment installation including multiple shrink-wrap labelling systems.
Figure 62:
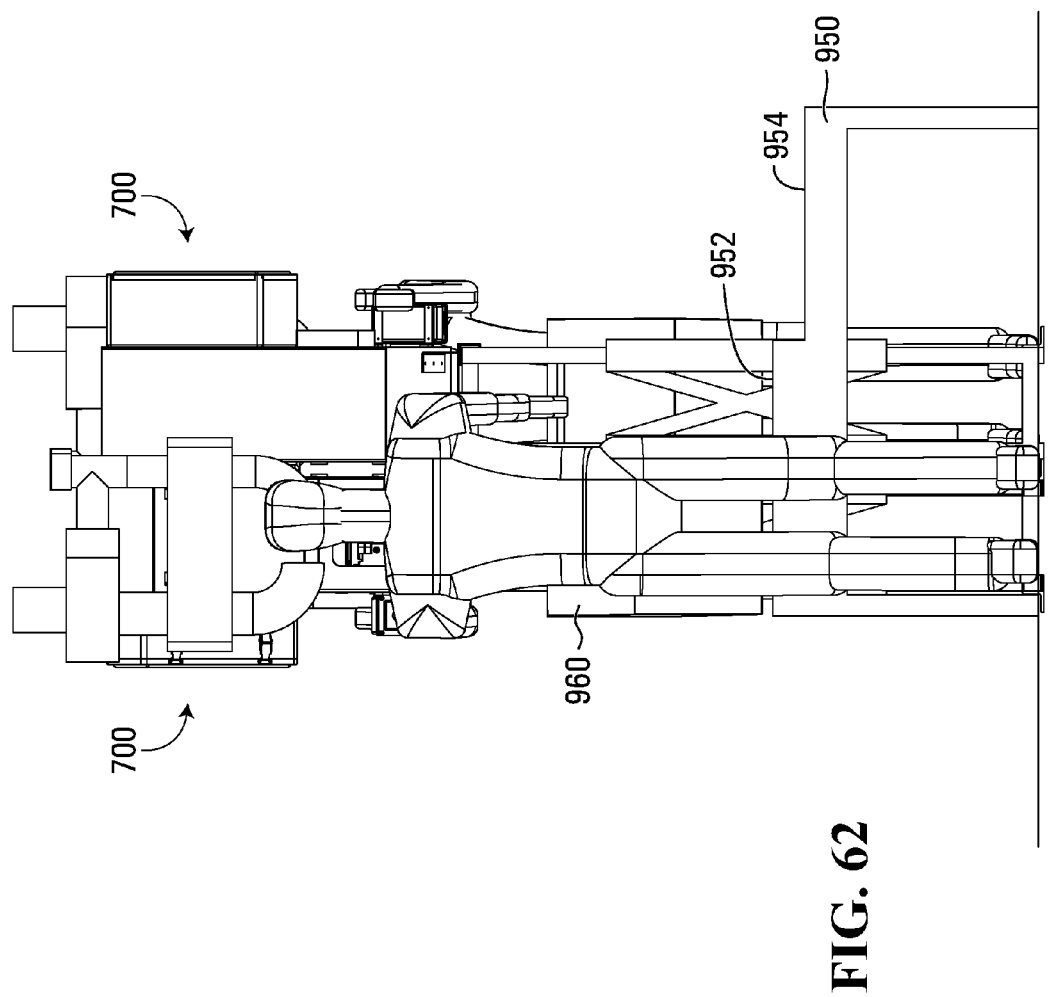
Figure 63:
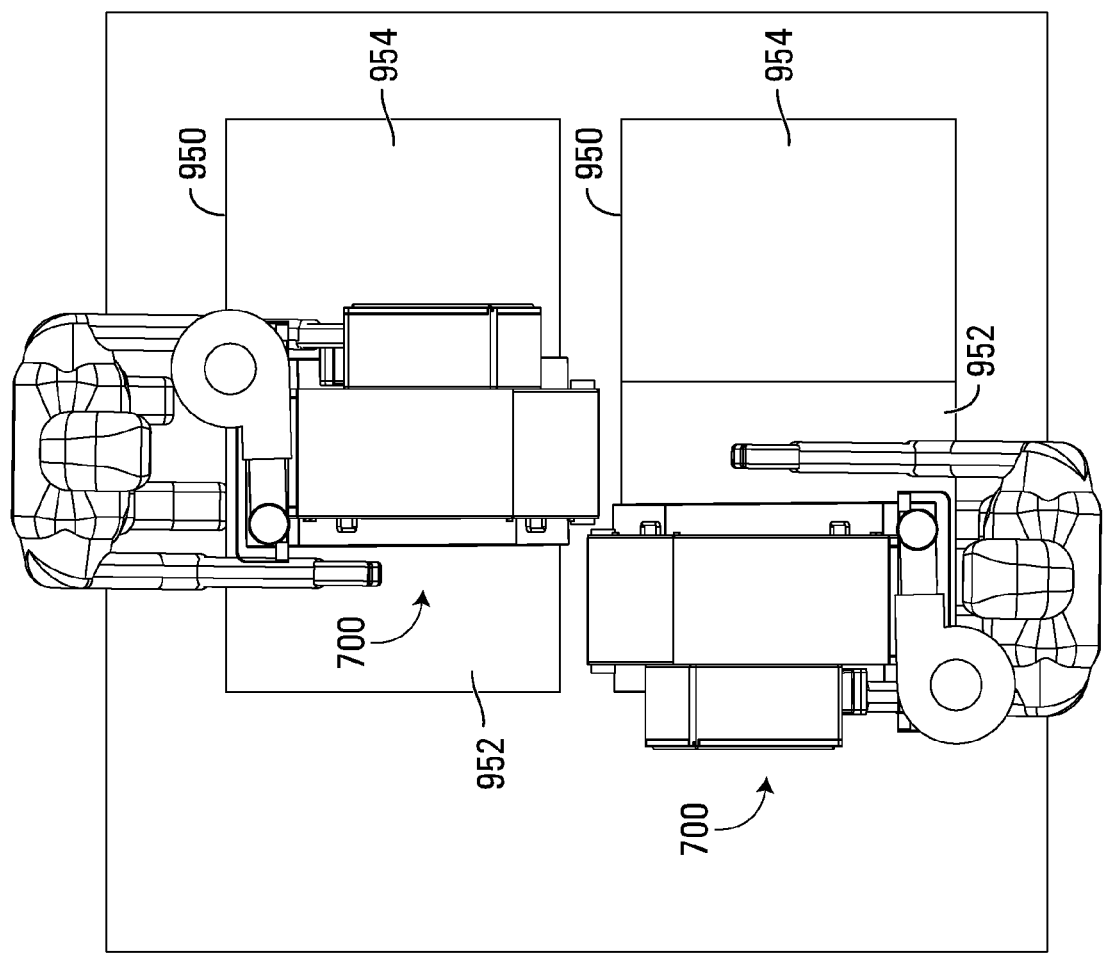

FIGS. 61 to 63 are views of an example equipment installation including multiple shrink-wrap labelling systems 700 mounted on frames 900. As shown, multiple labelling systems 700 could be installed at adjacent back-to-back offset positions as shown. Other arrangements are also contemplated, and could be adapted to different environments. Platforms 950, possibly with multiple surfaces 952, 954 at different heights, could be provided for holding crates 960 of products to be labelled. An operator could then lift a product from a crate 960, apply a label, and place the labelled product either back in the same crate or in a different location, such as a conveyor or another crate (not shown) on the surface 954, for shipping and/or other processing.

What has been described is merely illustrative of the application of principles of embodiments of the invention. Other arrangements and methods can be implemented by those skilled in the art without departing from the scope of the present invention.

For example, a heating apparatus could include fewer or further airflow paths to direct heated air in similar or different directions than shown in the drawings.

Variations in the internal airflow structure of the heating apparatus are also possible.

It is also contemplated that the techniques disclosed herein could be applied to automated processing, in which products are sleeved and moved through or past a heating apparatus without active involvement of an operator.

In the case of labelling crustacean claws, there could be productivity gains in enabling multiple claws to be labelled at substantially the same time. This could be achieved, for example, by installing labelling systems in adjacent pairs. Another possible option might be to provide a dispensing apparatus that can present cut and open stock material in pairs. Internal components of a dispensing apparatus could be duplicated to provide for separate stock material paths, or multiple movable cut sleeve holders could be provided to move sleeve material from a single cutting assembly into separate dispensing positions, such as side-by-side positions for receiving both claws of a lobster at the same time, for instance. A single air flow path or multiple paths and/or heating apparatus could then be used to shrink the cut sleeves around the claws.

We claim:

1. A labelling system comprising:
    a dispensing apparatus to present respective cut and opened sleeves of shrink-wrap label stock material for insertion of claws of crustaceans; and
    a heating apparatus comprising a heater and a blower to apply heat to the sleeves to shrink the sleeves around the claws,
    the dispensing apparatus comprising a cutting assembly to cut the sleeves of shrink-wrap label stock material, the cutting assembly comprising:
    a movable plate;
    a cutting blade, mounted to a first surface of the movable plate, to cut the sleeves from the shrink-wrap label stock material;
    a cut sleeve holder to hold and open the cut sleeves, the cut sleeve holder comprising:
    a block mounted to a second surface of the movable plate opposite the first surface;
    a suction cup, carried by the block, to hold the sleeves; and
    a bending block mounted to the block, the bending block being adjustable to deflect edges of the suction cup.

2. The labelling system of claim 1, the dispensing apparatus further comprising:
    a spool to hold a roll of flattened shrink-wrap label stock material; and
    an opening assembly to open the flattened shrink-wrap label stock material.

3. The labelling system of claim 1, the cutting assembly further comprising:
    a plate along which the cutting blade travels; and
    a variable pressure mount to provide a variable pressure between the plate and the cutting blade.

4. The labelling system of claim 1, the cutting assembly further comprising:
    a plate along which the cutting blade travels; and
    a backing plate mounted to the plate, to apply a force to the plate to reduce deflection of the plate away from the cutting blade.

5. The labelling system of claim 1, the heating apparatus further comprising an outlet passage and an inlet passage, the blower and the heater being coupled together to direct a heated air stream between the outlet passage and the inlet passage.

6. The labelling system of claim 5, the inlet passage being larger than the outlet passage.

7. The labelling system of claim 1, the heating apparatus being mounted to the dispensing apparatus.

8. A labelling system comprising:
    a dispensing apparatus to present respective cut and opened sleeves of shrink-wrap label stock material for insertion of claws of crustaceans; and
    a heating apparatus comprising a blower and a heater to apply heat to the sleeves to shrink the sleeves around the claws,
    the dispensing apparatus comprising a housing having an opening in which the sleeves are presented, the heating apparatus being mounted to the dispensing apparatus to position an air flow path for heated air above the opening.

9. The labelling system of claim 8, further comprising:
    a spool to hold a roll of flattened shrink-wrap label stock material; and
    an opening assembly to open the flattened shrink-wrap label stock material.

10. The labelling system of claim 8, further comprising a cutting assembly to cut the sleeves of shrink-wrap label stock material, the cutting assembly comprising:
    a cutting blade;
    a plate along which the cutting blade travels; and
    a variable pressure mount to provide a variable pressure between the plate and the cutting blade.

11. The labelling system of claim 8, further comprising a cutting assembly to cut the sleeves of shrink-wrap label stock material, the cutting assembly comprising:
    a cutting blade to cut the sleeves from the shrink-wrap label stock material; and
    a cut sleeve holder to hold and open the cut sleeves.

12. The labelling system of claim 11,
the cutting assembly further comprising:
a movable plate, the cutting blade being mounted to a first surface of the movable plate, and
the cut sleeve holder comprising:
a block mounted to a second surface of the movable plate opposite the first surface;
a suction cup, carried by the block, to hold the sleeves; and
a bending block mounted to the block, the bending block being adjustable to deflect edges of the suction cup.

13. The labelling system of claim 8, further comprising a cutting assembly to cut the sleeves of shrink-wrap label stock material, the cutting assembly further comprising:
a cutting blade;
a plate along which the cutting blade travels; and
a backing plate mounted to the plate, to apply a force to the plate to reduce deflection of the plate away from the cutting blade.

14. The labelling system of claim 8, the heating apparatus further comprising an outlet passage and an inlet passage, the blower and the heater being coupled together to direct a heated air stream between the outlet passage and the inlet passage.

15. The labelling system of claim 14, the inlet passage being larger than the outlet passage.

16. A method comprising:
providing a dispensing apparatus to present respective cut and opened sleeves of shrink-wrap label stock material for insertion of claws of crustaceans; and
providing a heating apparatus comprising a heater and a blower to apply heat to the sleeves to shrink the sleeves around the claws,
the dispensing apparatus comprising a cutting assembly to cut the sleeves of shrink-wrap label stock material, the cutting assembly comprising:
a movable plate;
a cutting blade, mounted to a first surface of the movable plate, to cut the sleeves from the shrink-wrap label stock material;
a cut sleeve holder to hold and open the cut sleeves, the cut sleeve holder comprising:
a block mounted to a second surface of the movable plate opposite the first surface;
a suction cup, carried by the block, to hold the sleeves; and
a bending block mounted to the block, the bending block being adjustable to deflect edges of the suction cup.

17. A shrink-wrap label dispensing apparatus comprising:
an opening assembly to open flattened shrink-wrap label stock material;
a feeding assembly to feed the opened shrink-wrap label stock material from the opening assembly;
a cutting assembly to receive and cut the opened shrink-wrap label stock material from the feeding assembly into sleeves, and to present the sleeves for insertion of respective claws of crustaceans,
the cutting assembly comprising:
a movable plate;
a cutting blade, mounted to a first surface of the movable plate, to cut the sleeves from the shrink-wrap label stock material;
a cut sleeve holder to hold and open the cut sleeves, the cut sleeve holder comprising:
a block mounted to a second surface of the movable plate opposite the first surface;
a suction cup, carried by the block, to hold the sleeves; and
a bending block mounted to the block, the bending block being adjustable to deflect edges of the suction cup.

18. The dispensing apparatus of claim 17, the cutting assembly further comprising:
a plate along which the cutting blade travels; and
a variable pressure mount to provide a variable pressure between the plate and the cutting blade.

19. The dispensing apparatus of claim 17, the cutting assembly further comprising:
a plate along which the cutting blade travels; and
a backing plate mounted to the plate, to apply a force to the plate to reduce deflection of the plate away from the cutting blade.

20. A shrink-wrap label heating apparatus comprising:
a blower;
a duct to direct air from the blower to a heater;
a duct to direct air from the heater to an air outlet passage and toward an air inlet passage; and
a duct to direct air from the air inlet passage to the heater,
airflow between the air outlet passage and the air inlet passage providing a heated air stream for applying heat to shrink sleeves of shrink-wrap label material around claws of crustaceans,
the heating apparatus further comprising a bracket assembly to mount the heating apparatus, to a dispensing apparatus that comprises a housing having an opening in which the sleeves are presented, to position an air flow path between the air outlet passage and the air inlet passage above the opening.

21. The heating apparatus of claim 20, the air inlet passage being larger than the air outlet passage.

22. A method comprising:
providing a dispensing apparatus to present respective cut and opened sleeves of shrink-wrap label stock material for insertion of claws of crustaceans; and
providing a heating apparatus comprising a heater and a blower to apply heat to the sleeves to shrink the sleeves around the claws,
the dispensing apparatus comprising a housing having an opening in which the sleeves are presented, the heating apparatus being mounted to the dispensing apparatus to position an air flow path for heated air above the opening.

* * * * *